(12) United States Patent
Fox et al.

(10) Patent No.: US 10,107,347 B2
(45) Date of Patent: Oct. 23, 2018

(54) DUAL RACK AND PINION ROTATIONAL INERTER SYSTEM AND METHOD FOR DAMPING MOVEMENT OF A FLIGHT CONTROL SURFACE OF AN AIRCRAFT

(71) Applicant: The Boeing Company, Chicago, IL (US)

(72) Inventors: Michael T. Fox, Saint Charles, MO (US); Jeffrey M. Roach, Saint Charles, MO (US); Eric A. Howell, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/867,988

(22) Filed: Jan. 11, 2018

(65) Prior Publication Data

US 2018/0156293 A1     Jun. 7, 2018

Related U.S. Application Data

(63) Continuation-in-part of application No. 15/159,706, filed on May 19, 2016.

(51) Int. Cl.
*B64C 5/10* (2006.01)
*F16F 7/10* (2006.01)
(Continued)

(52) U.S. Cl.
CPC .............. *F16F 7/1022* (2013.01); *B64C 9/02* (2013.01); *B64C 13/34* (2013.01); *F16F 15/02* (2013.01);
(Continued)

(58) Field of Classification Search
CPC ........ F16F 7/1022; F16F 15/02; F16F 7/1034; F16F 2222/08; F16F 2232/06;
(Continued)

(56) References Cited

U.S. PATENT DOCUMENTS

| | | | | |
|---|---|---|---|---|
| 1,291,664 A | * | 1/1919 | Von Schrenk | ......... G05G 1/405 |
| | | | | 292/36 |
| 1,584,931 A | * | 5/1926 | Handy | ....................... F02D 9/00 |
| | | | | 137/483 |

(Continued)

FOREIGN PATENT DOCUMENTS

| DE | 102012215614 A1 | 5/2014 |
|---|---|---|
| EP | 1001184 A2 | 5/2000 |
| WO | WO2012054774 A2 | 4/2012 |

OTHER PUBLICATIONS

Extended European Search Report, Appl. No. EP17161213.8, dated Oct. 10, 2017, 6 pages.

(Continued)

*Primary Examiner* — Medhat Badawi

(57) ABSTRACT

There is provided a dual rack and pinion rotational inerter system for damping movement of a flight control surface of an aircraft. The system has a flexible holding structure disposed between the flight control surface and a support structure of the aircraft. The system has a dual rack and pinion assembly held by and between the flexible holding structure. The dual rack and pinion assembly has a first rack, a second rack, and a pinion engaged to and between the racks. The system has a first terminal coupled to the first rack and coupled to the flight control surface, via a pivot element, and a second terminal coupled to the second rack, and coupled to the support structure. The system has a pair of inertia wheels adjacent the flexible holding structure. The system has an axle element inserted through the inertial wheels, the flexible holding structure, and the pinion.

20 Claims, 23 Drawing Sheets

(51) Int. Cl.
    *B64C 13/34*         (2006.01)
    *F16F 15/02*         (2006.01)
    *F16H 19/04*        (2006.01)
    *B64C 9/02*          (2006.01)
    *F16H 25/20*        (2006.01)
    *F16H 25/22*        (2006.01)

(52) U.S. Cl.
    CPC .......... *F16H 19/04* (2013.01); *F16F 2222/08* (2013.01); *F16F 2232/02* (2013.01); *F16F 2232/06* (2013.01); *F16H 25/2233* (2013.01); *F16H 2025/2075* (2013.01)

(58) Field of Classification Search
    CPC .. F16F 2232/02; F16H 19/04; F16H 25/2233; F16H 2025/2075; B64C 9/02; B64C 13/36; B60G 13/16; Y02T 50/44
    See application file for complete search history.

(56) References Cited

U.S. PATENT DOCUMENTS

| | | | | |
|---|---|---|---|---|
| 1,928,961 A * | 10/1933 | Brown | A01B 63/06 | 172/492 |
| 2,611,282 A * | 9/1952 | Buck | F16H 21/10 | 74/518 |
| 2,620,772 A * | 12/1952 | McLane | B64C 13/24 | 244/226 |
| 2,669,401 A * | 2/1954 | Bosserman | B64C 13/00 | 244/82 |
| 2,679,827 A * | 6/1954 | Perdue | F01B 17/00 | 188/317 |
| 2,720,368 A * | 10/1955 | Payne, Jr. | B64C 13/00 | 244/223 |
| 2,721,446 A * | 10/1955 | Bumb | F15B 1/24 | 138/31 |
| 2,796,774 A * | 6/1957 | Peed, Jr. | B64C 13/24 | 244/230 |
| 2,817,483 A * | 12/1957 | Hill | B64C 13/40 | 244/76 R |
| 2,856,179 A * | 10/1958 | Hogan | B64C 25/60 | 188/129 |
| 2,916,205 A * | 12/1959 | Litz | F15B 11/02 | 116/DIG. 42 |
| 2,974,908 A * | 3/1961 | Platt | B64C 13/24 | 244/178 |
| 3,205,728 A * | 9/1965 | Morris | B64C 29/0091 | 74/491 |
| 3,303,714 A * | 2/1967 | Fontaine | B64C 13/46 | 244/223 |
| 3,369,779 A * | 2/1968 | Frederiksen | B64C 13/24 | 244/226 |
| 3,603,577 A * | 9/1971 | DeRaad | F16F 7/06 | 188/129 |
| 3,625,005 A * | 12/1971 | Saunders et al. | B60T 13/162 | 60/548 |
| 3,633,366 A * | 1/1972 | Cripe | B60T 13/10 | 60/550 |
| 3,693,474 A * | 9/1972 | Trick | E02F 9/2004 | 251/233 |
| 3,707,075 A * | 12/1972 | Cripe | B60T 7/04 | 60/550 |
| 3,709,522 A * | 1/1973 | Olson | B60D 1/155 | 180/904 |
| 4,005,617 A * | 2/1977 | Sourbel | B60T 7/06 | 74/516 |
| 4,054,186 A * | 10/1977 | Banks, Jr. | F16F 7/1022 | 188/184 |
| 4,177,882 A * | 12/1979 | Dowell | F16L 3/202 | 188/185 |
| 4,241,814 A * | 12/1980 | Masclet | F16D 57/06 | 188/266 |
| 4,276,967 A * | 7/1981 | Dowell | F16F 7/1022 | 188/134 |
| 4,474,273 A * | 10/1984 | Le Pierres | F16F 7/04 | 188/129 |
| 4,525,126 A * | 6/1985 | Laumont | F04C 11/008 | 417/310 |
| 4,595,158 A * | 6/1986 | Robinson | B64C 9/02 | 244/223 |
| 4,722,238 A * | 2/1988 | Navarro | B23F 1/06 | 74/422 |
| 4,739,962 A * | 4/1988 | Morita | F16F 9/34 | 267/140.13 |
| 4,773,620 A * | 9/1988 | Seidel | B64C 3/50 | 244/99.2 |
| 4,865,269 A * | 9/1989 | Metcalf | B64C 13/14 | 244/224 |
| 4,898,257 A * | 2/1990 | Brandstadter | B60G 17/0152 | 180/22 |
| 5,307,892 A * | 5/1994 | Phillips | B62D 5/09 | 180/422 |
| 5,337,864 A * | 8/1994 | Sjostrom | B60G 13/18 | 188/266.2 |
| 5,431,015 A * | 7/1995 | Hein | F15B 15/068 | 244/99.5 |
| 5,435,531 A * | 7/1995 | Smith | F16F 15/02 | 188/378 |
| 5,593,109 A * | 1/1997 | Williams | B64C 13/50 | 244/3.21 |
| 5,620,168 A * | 4/1997 | Ohtake | F16F 13/26 | 267/140.13 |
| 5,704,596 A * | 1/1998 | Smith | F16F 7/1005 | 188/285 |
| 5,788,029 A * | 8/1998 | Smith | F16F 7/1005 | 188/267 |
| 5,992,582 A * | 11/1999 | Lou | F16F 9/12 | 188/267.1 |
| 6,230,450 B1 * | 5/2001 | Kuroda | E04H 9/02 | 188/322.5 |
| 6,253,888 B1 * | 7/2001 | Bell | F16F 9/504 | 188/275 |
| 6,352,143 B1 * | 3/2002 | Niaura | F16F 9/532 | 188/267.1 |
| 6,412,616 B1 * | 7/2002 | Allen | B60G 11/56 | 188/301 |
| 6,622,972 B2 * | 9/2003 | Urnes, Sr. | G05D 1/0055 | 244/194 |
| 6,679,185 B2 * | 1/2004 | Sullivan | B61B 10/046 | 104/172.1 |
| 6,698,688 B1 * | 3/2004 | Jones | B64C 1/26 | 244/99.3 |
| 6,983,832 B2 * | 1/2006 | Namuduri | F16F 9/36 | 188/267.2 |
| 7,051,849 B2 * | 5/2006 | Browne | F16F 9/535 | 188/266.4 |
| 7,225,905 B2 * | 6/2007 | Namuduri | F16F 9/535 | 188/267.1 |
| 7,285,933 B2 * | 10/2007 | A'Harrah | B64C 13/10 | 244/175 |
| 7,316,303 B2 | 1/2008 | Smith | | |
| 7,484,743 B2 * | 2/2009 | Gorodisher | B60G 17/04 | 280/89.13 |
| 7,503,523 B2 * | 3/2009 | Perez-Sanchez | B64C 1/36 | 220/810 |
| 7,510,150 B2 * | 3/2009 | Williams | B64C 9/02 | 244/211 |
| 7,631,736 B2 * | 12/2009 | Thies | B60G 17/0272 | 188/380 |
| 8,567,714 B2 * | 10/2013 | Sheahan, Jr. | B64C 13/24 | 244/213 |
| 8,611,201 B2 * | 12/2013 | Desjardins | G11B 19/2018 | 369/263.1 |
| 8,725,321 B2 * | 5/2014 | Hagerott | B64C 9/04 | 701/10 |
| 9,103,466 B2 * | 8/2015 | McNeely | F16K 1/126 | |
| 9,127,507 B2 * | 9/2015 | Jensen | E21B 4/006 | |
| 9,315,256 B2 * | 4/2016 | Maenz | B64C 9/02 | |
| 9,316,297 B2 * | 4/2016 | Watanabe | F16H 25/12 | |
| 9,334,914 B2 * | 5/2016 | Gartner | F16F 7/1022 | |

(56) References Cited

U.S. PATENT DOCUMENTS

| | | | | |
|---|---|---|---|---|
| 9,340,278 B2* | 5/2016 | Hagerott | | B64C 9/04 |
| 9,702,349 B2* | 7/2017 | Anderson | | F03G 7/08 |
| 2003/0005142 A1* | 1/2003 | Elzur | | H04L 69/22 |
| | | | | 709/232 |
| 2004/0079839 A1* | 4/2004 | Bath | | B64C 1/26 |
| | | | | 244/131 |
| 2005/0034943 A1* | 2/2005 | Smith | | F16F 7/1022 |
| | | | | 188/301 |
| 2005/0217906 A1* | 10/2005 | Spark | | B60T 8/24 |
| | | | | 180/22 |
| 2007/0045918 A1* | 3/2007 | Thornhill | | F16F 13/1463 |
| | | | | 267/140.12 |
| 2009/0108510 A1* | 4/2009 | Wang | | F16F 7/1022 |
| | | | | 267/75 |
| 2009/0139225 A1* | 6/2009 | Wang | | F15B 7/008 |
| | | | | 60/469 |
| 2010/0148463 A1* | 6/2010 | Wang | | B60G 13/14 |
| | | | | 280/124.101 |
| 2012/0199428 A1* | 8/2012 | Smith | | F16F 7/1034 |
| | | | | 188/280 |
| 2012/0227485 A1* | 9/2012 | Gregory | | G01M 1/36 |
| | | | | 73/460 |
| 2013/0030648 A1* | 1/2013 | Matsumoto | | B60W 10/06 |
| | | | | 701/37 |
| 2013/0032442 A1* | 2/2013 | Tuluie | | B60G 13/16 |
| | | | | 188/378 |
| 2013/0037362 A1* | 2/2013 | Gartner | | F16F 7/1034 |
| | | | | 188/378 |
| 2014/0156143 A1* | 6/2014 | Evangelou | | B60G 17/0157 |
| | | | | 701/37 |
| 2014/0246820 A1* | 9/2014 | Chen | | F16F 15/02 |
| | | | | 267/140.11 |
| 2015/0123467 A1* | 5/2015 | Yasui | | H02J 4/00 |
| | | | | 307/9.1 |
| 2015/0224845 A1* | 8/2015 | Anderson | | B60G 17/019 |
| | | | | 701/37 |
| 2016/0229443 A1* | 8/2016 | Takei | | B62D 3/126 |
| 2017/0182859 A1* | 6/2017 | Anderson | | B60G 17/052 |
| 2017/0297748 A1* | 10/2017 | Zondervan | | B64C 17/02 |
| 2017/0314584 A1* | 11/2017 | Holtgraver | | F16H 19/04 |
| 2017/0335916 A1* | 11/2017 | Fox | | F16F 7/1028 |
| 2018/0065151 A1* | 3/2018 | Houston | | H02K 7/061 |
| 2018/0135717 A1* | 5/2018 | Fox | | F16F 7/065 |
| 2018/0156293 A1* | 6/2018 | Fox | | F16F 7/1022 |

OTHER PUBLICATIONS

Notification of European Publication Number, Appl. No. EP17161213.8, dated Oct. 25, 2017, 2 pages.

* cited by examiner

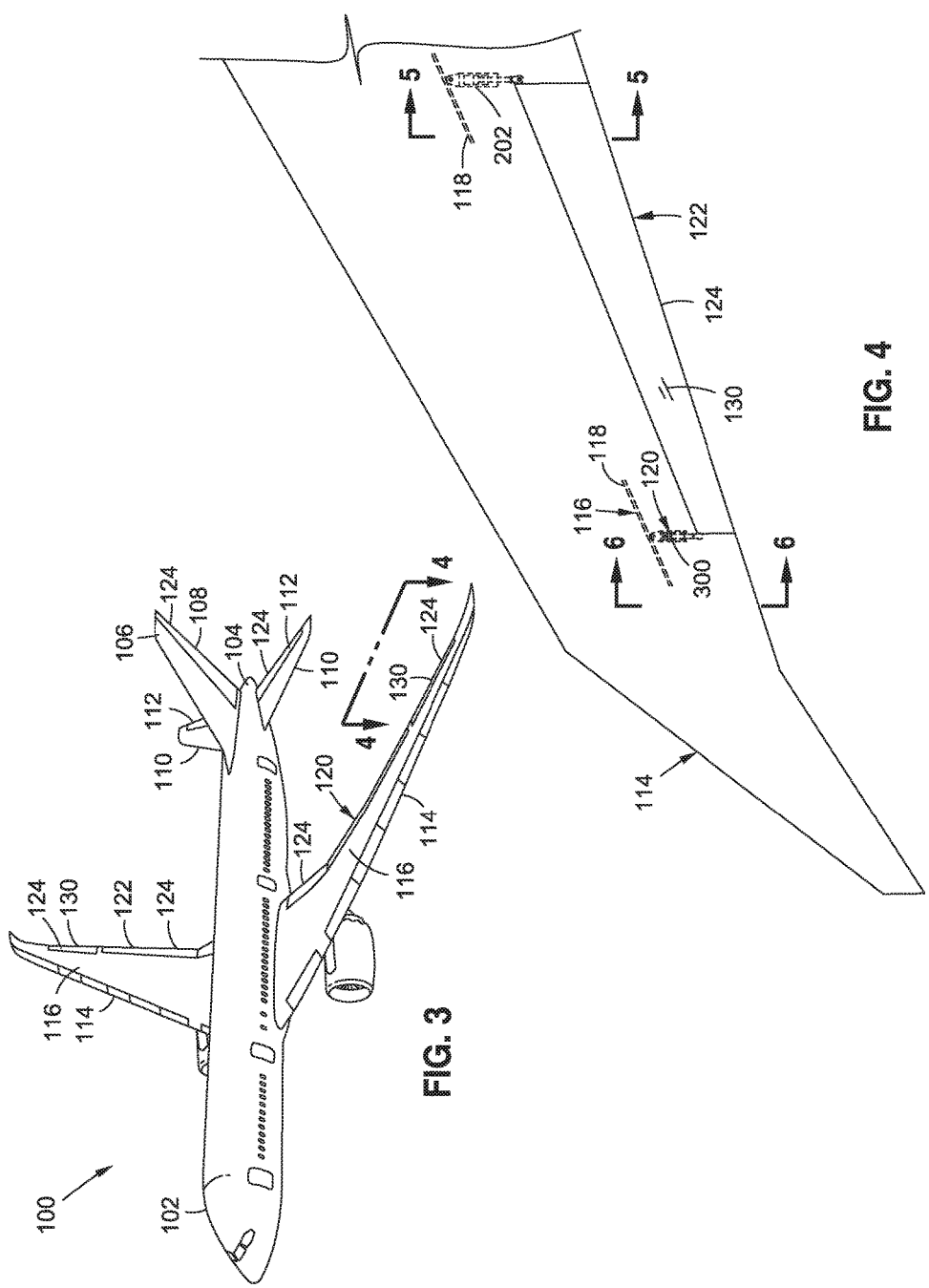

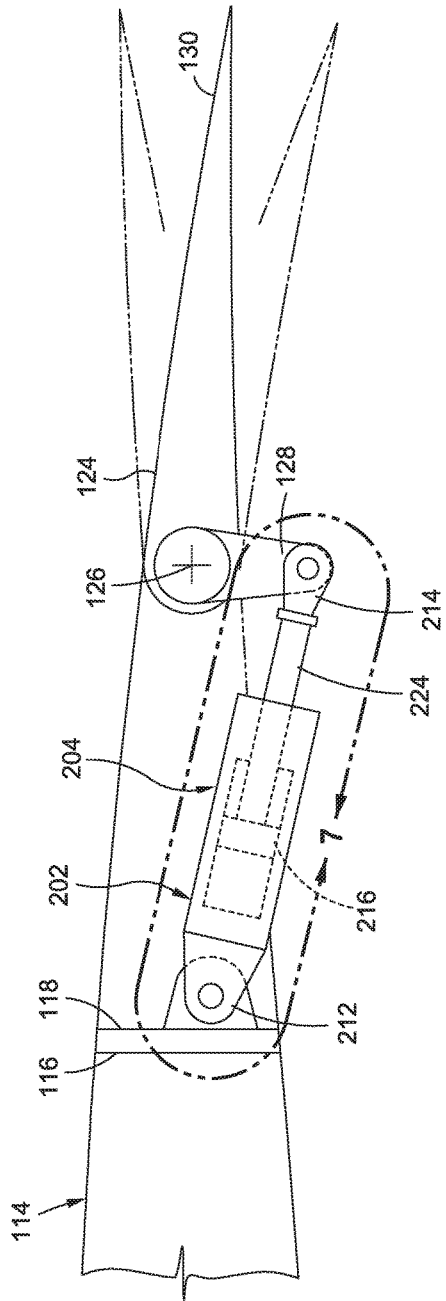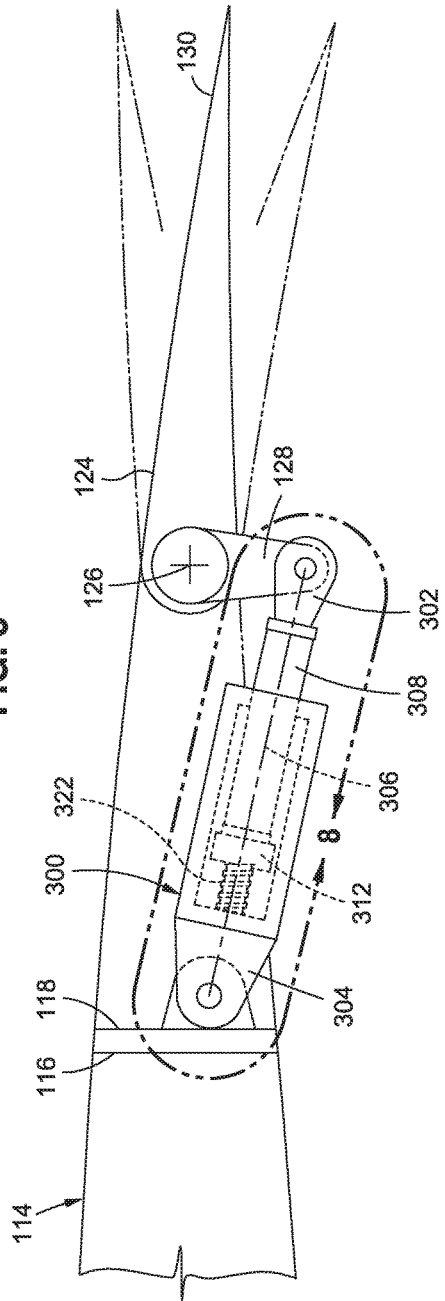

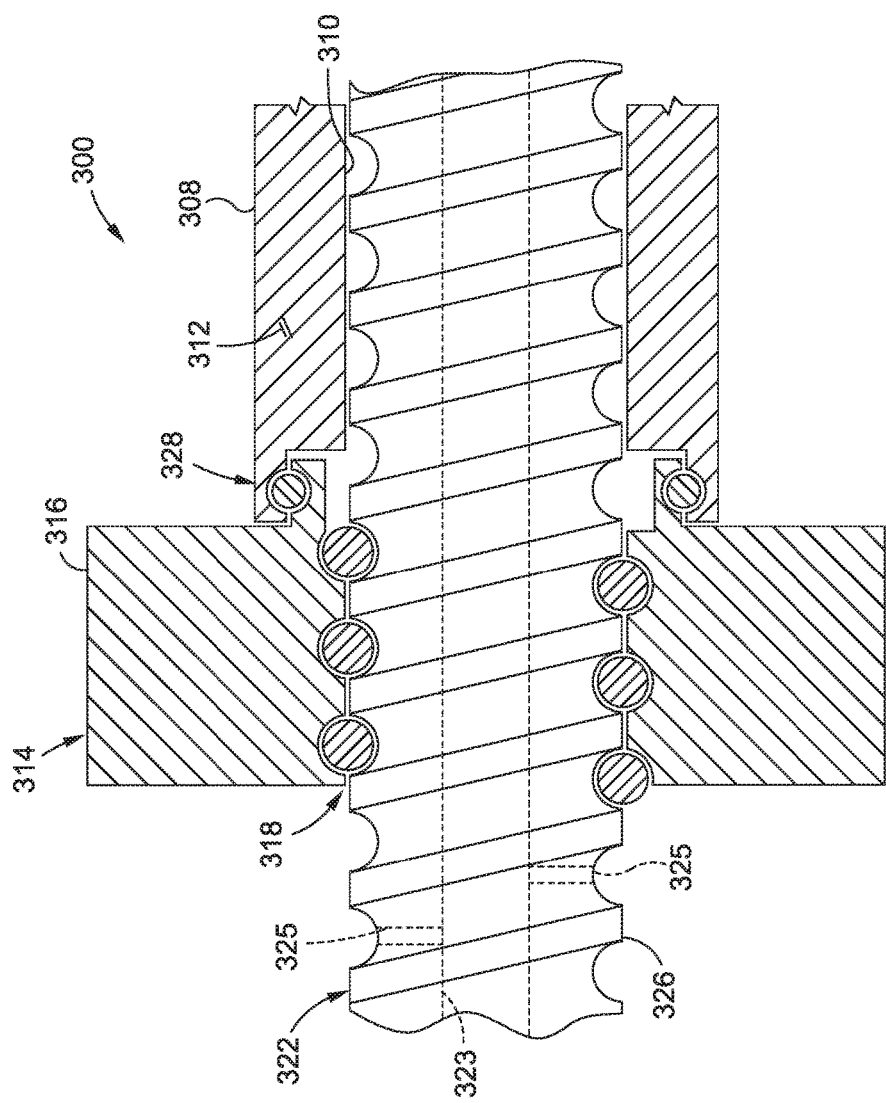

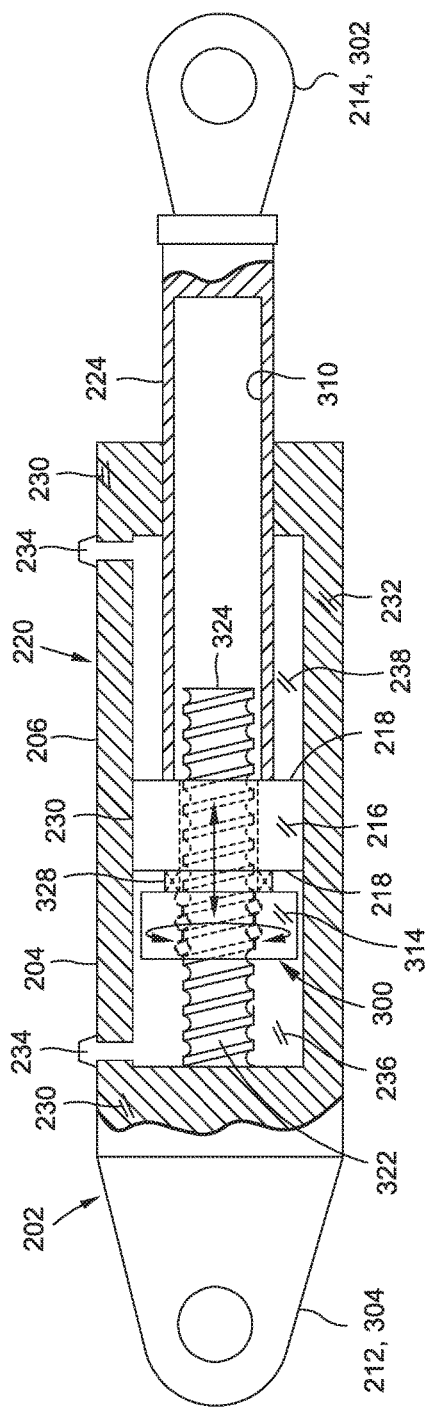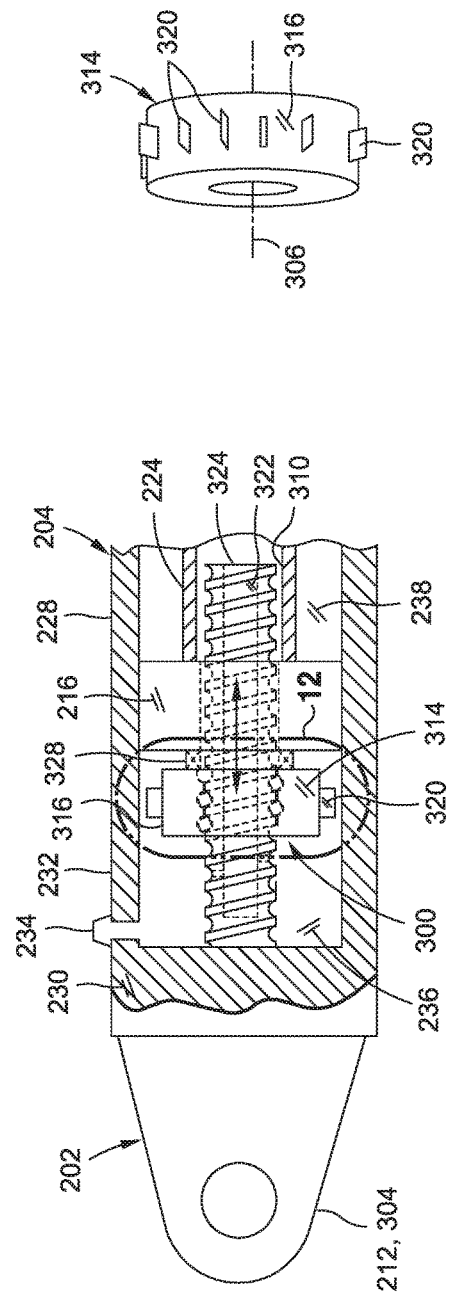

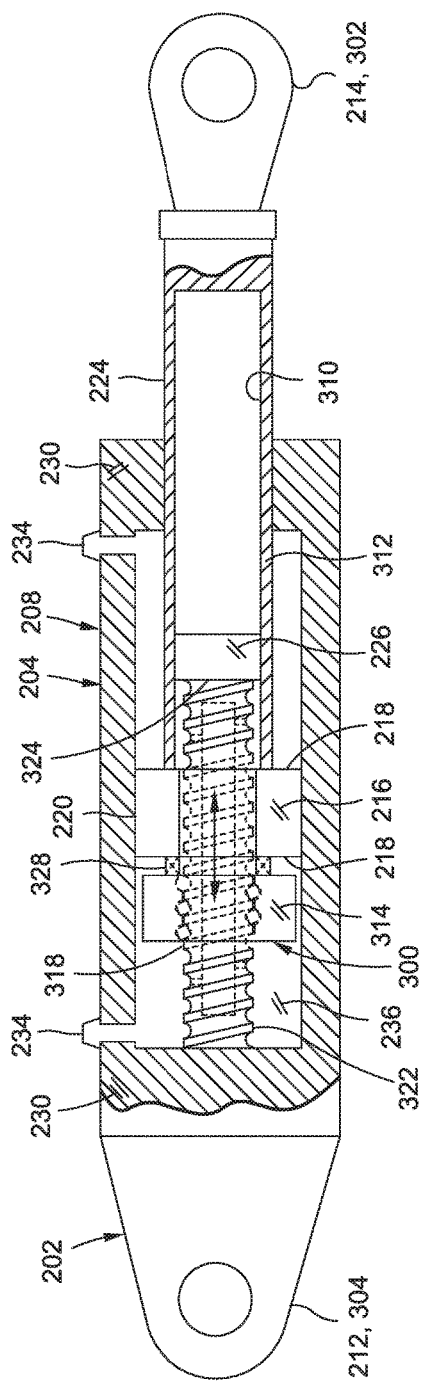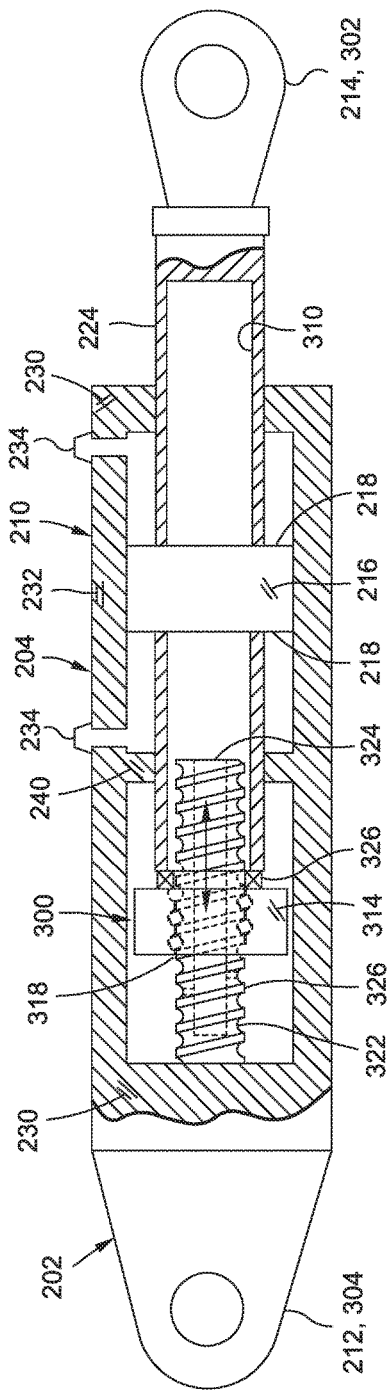

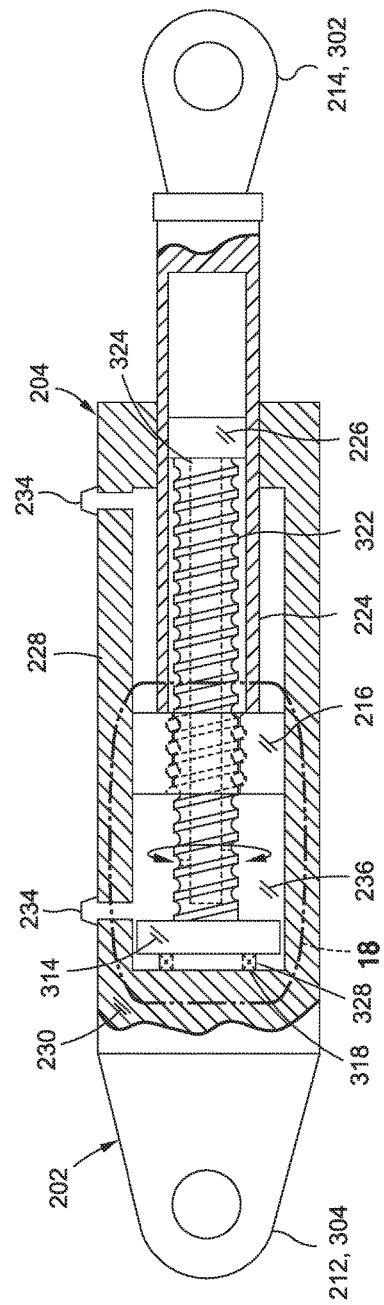
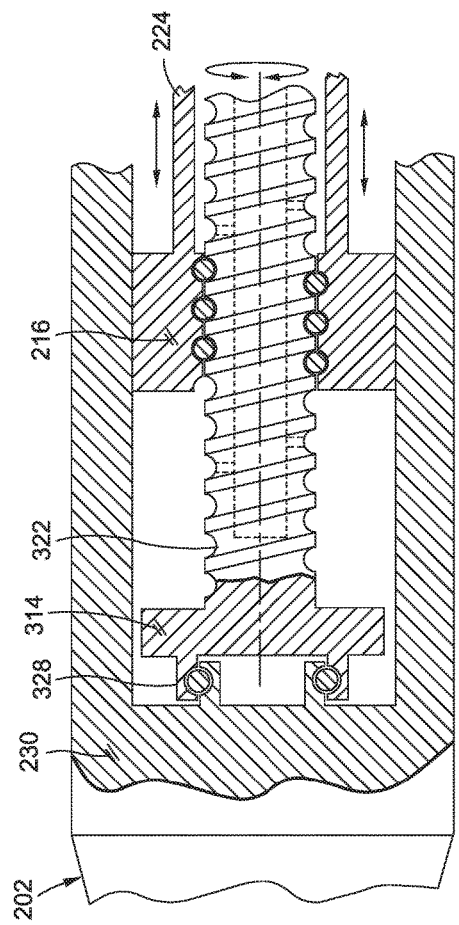

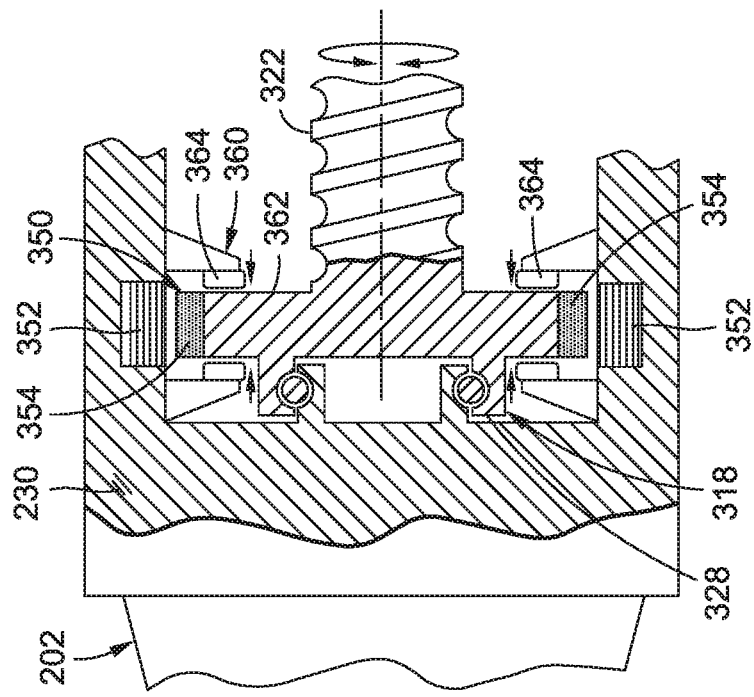
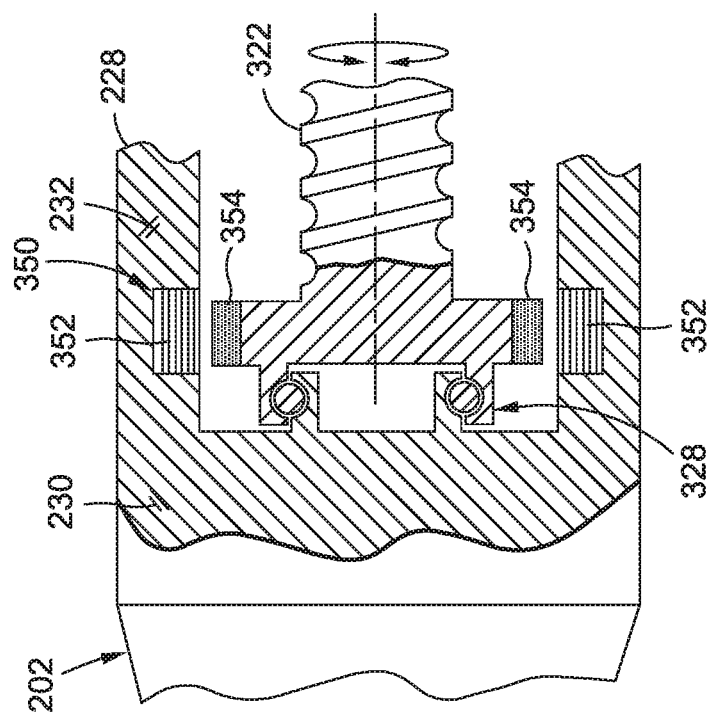
FIG. 20
FIG. 19

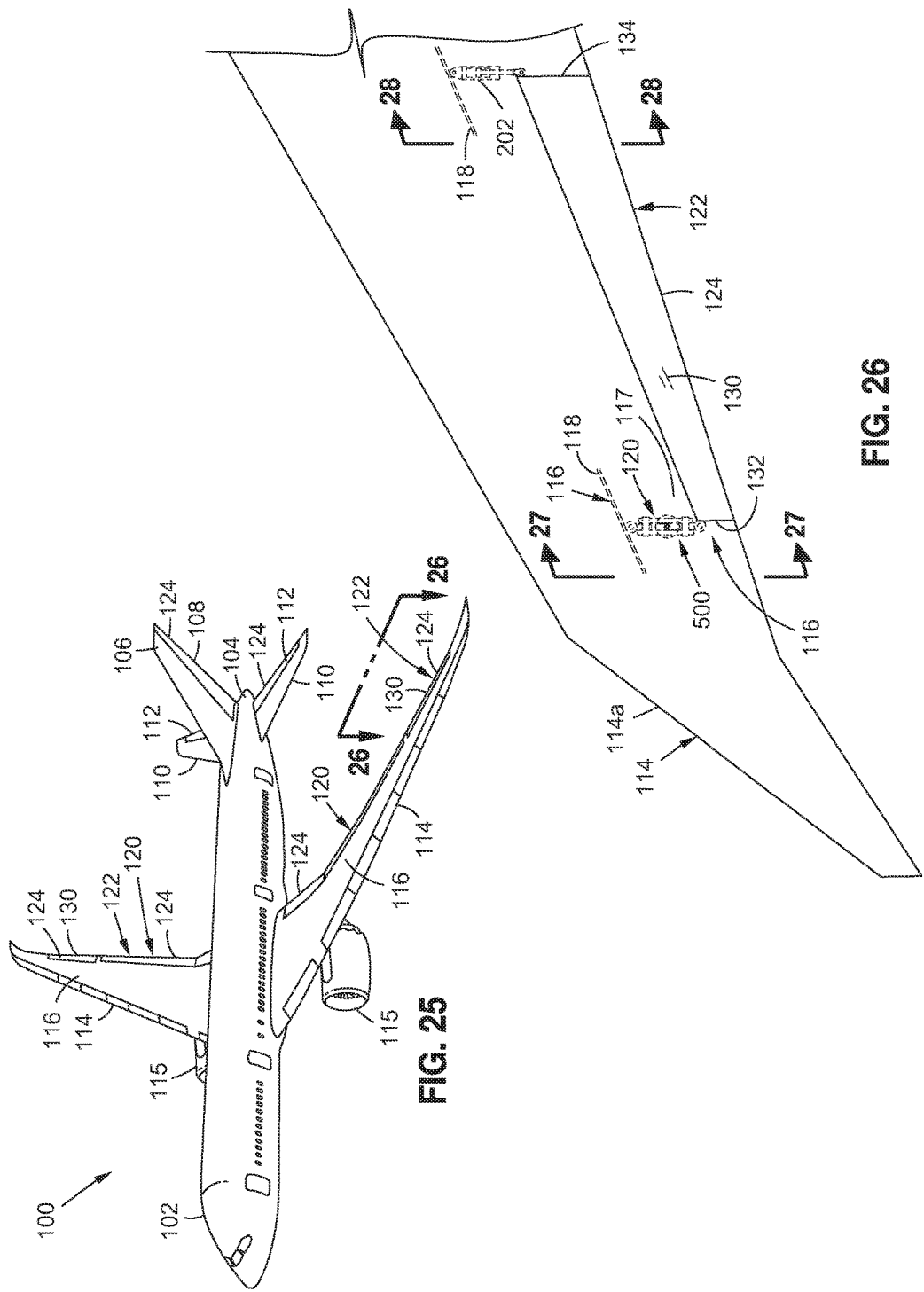

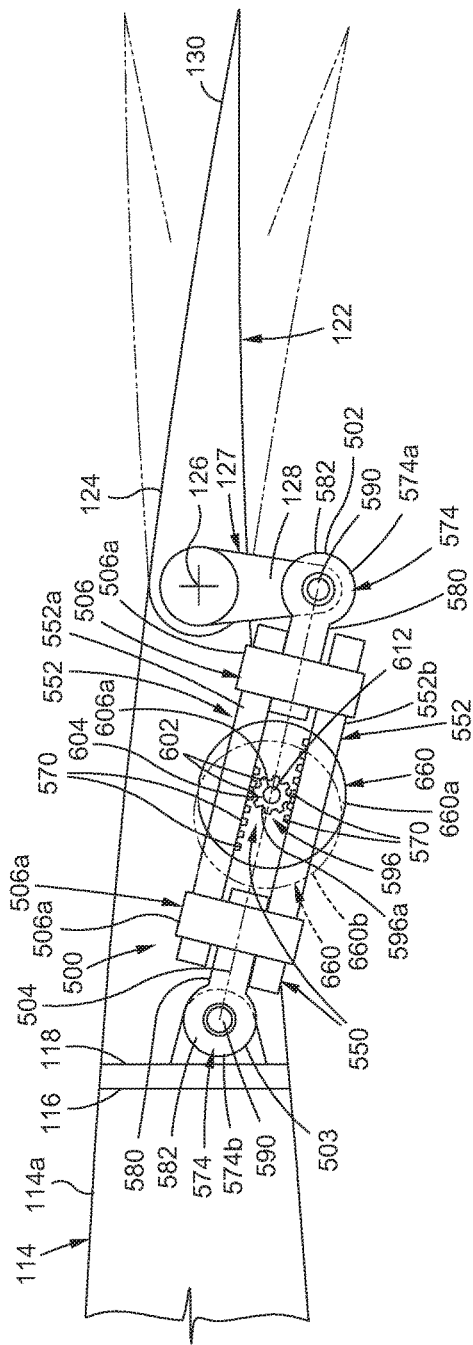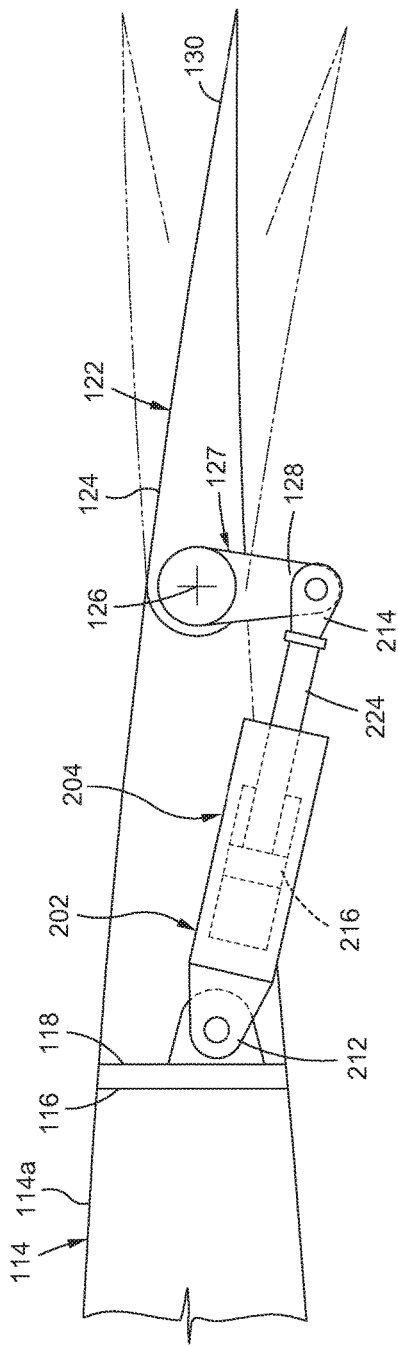
FIG. 27
FIG. 28

```
┌─────────────────────────────────────────────────────────────────────────────┐
│                              AIRCRAFT 100                                    │
│ ┌─────────────┬──────────┬─────────────────────────────┬──────────────────┐ │
│ │ SUPPORT     │ WING 114 │ WING PORTION SUPPORT        │ WING SPAR 118    │ │
│ │ STRUCTURE 116│          │ STRUCTURE 117               │                  │ │
│ └─────────────┴──────────┴─────────────────────────────┴──────────────────┘ │
│ ┌─────────────────────────────────────────────────────────────────────────┐ │
│ │                       FLIGHT CONTROL SYSTEM 120                          │ │
│ │ ┌────────────┬──────────┬──────────┬──────────────┬──────────────────┐ │ │
│ │ │ACTUATOR 202│CAP END 212│PISTON 216│PISTON ROD 224│ROD END 214       │ │ │
│ │ └────────────┴──────────┴──────────┴──────────────┴──────────────────┘ │ │
│ │ ┌────────────────┬──────────────┬──────────────┬────────────────────┐ │ │
│ │ │PIVOT ELEMENT 127│BELLCRANK 128│HORN ELEMENT 136│BEARING ELEMENT 138│ │ │
│ │ └────────────────┴──────────────┴──────────────┴────────────────────┘ │ │
│ │ ┌──────────────────┬─────────────────────────┬────────────┬─────────┐ │ │
│ │ │MOVABLE DEVICE 124│FLIGHT CONTROL SURFACE 122│AILERON 130 │HINGE AXIS 126│
│ │ └──────────────────┴─────────────────────────┴────────────┴─────────┘ │ │
│ │ ┌─────────────────────────────────────────────────────────────────────┐ │ │
│ │ │         DUAL RACK AND PINION ROTATIONAL INERTER SYSTEM 500           │ │ │
│ │ │ ┌────────────────────────────────┬──────────────────────────────┐ │ │ │
│ │ │ │ FLEXIBLE HOLDING STRUCTURE 506 │ ROD BEARINGS 540             │ │ │ │
│ │ │ └────────────────────────────────┴──────────────────────────────┘ │ │ │
│ │ │ ┌──────────────────────────────┬────────────────────────────────┐ │ │ │
│ │ │ │CLAMPING HOLDING STRUCTURE 506a│THIN SECTION FLEXURE HOLDING STRUCTURE 506b│
│ │ │ └──────────────────────────────┴────────────────────────────────┘ │ │ │
│ │ │ ┌──────────────────┬───────────┬──────────────┬────────────────┐ │ │ │
│ │ │ │TWO-PIECE FLEXIBLE│PIECES 508 │FIRST PIECE 508a│SECOND PIECE 508b│ │ │ │
│ │ │ │HOLDING STRUCT. 506c│         │              │                │ │ │ │
│ │ │ └──────────────────┴───────────┴──────────────┴────────────────┘ │ │ │
│ │ │ ┌──────────┬──────────┬──────────────────┬────────────────────┐ │ │ │
│ │ │ │MIRROR IMAGE│MIRROR IMAGE│FORGED PLATES 510a│EXTRUDED PLATES 510b│ │ │ │
│ │ │ │    509    │PLATES 510 │                  │                    │ │ │ │
│ │ │ └──────────┴──────────┴──────────────────┴────────────────────┘ │ │ │
│ │ │ ┌──────────────────────────────┬────────────────────────────────┐ │ │ │
│ │ │ │PRIMARY THROUGH OPENING 518   │END THROUGH OPENING 538         │ │ │ │
│ │ │ └──────────────────────────────┴────────────────────────────────┘ │ │ │
│ │ │ ┌──────────────────┬─────────────────────────┬─────────────────┐ │ │ │
│ │ │ │DUAL RACK AND PINION│TRANSLATIONAL MOVEMENT 610│ROTATIONAL MOVEMENT 611│
│ │ │ │ASSEMBLY 550       │                         │                 │ │ │ │
│ │ │ └──────────────────┴─────────────────────────┴─────────────────┘ │ │ │
│ │ │ ┌────────────┬────────────────────────┬────────────────────────┐ │ │ │
│ │ │ │RACKS 552   │FIRST RACK 552a         │SECOND RACK 552b        │ │ │ │
│ │ │ └────────────┴────────────────────────┴────────────────────────┘ │ │ │
│ │ │ ┌────────────────────────────────────┬─────────────────┬──────┐ │ │ │
│ │ │ │SPHERICAL BEARING ATTACHMENT PORTION 558│LINEAR GEAR PORTION 560│TEETH 570│
│ │ │ └────────────────────────────────────┴─────────────────┴──────┘ │ │ │
│ │ │ ┌──────────────────────┬──────────────────────────────────────┐ │ │ │
│ │ │ │SPHERICAL BEARING 574 │SPHERICAL BALL BEARING ROD 575        │ │ │ │
│ │ │ └──────────────────────┴──────────────────────────────────────┘ │ │ │
│ │ │ ┌──────────┬──────────────┬──────────────┬────────────┬──────┐ │ │ │
│ │ │ │PINION 596│PINION GEAR 596a│GEAR TEETH 602│THICKNESS 607│DIAMETER 608│
│ │ │ └──────────┴──────────────┴──────────────┴────────────┴──────┘ │ │ │
│ │ │ ┌────────────────┬────────────────────────────┬──────────────┐ │ │ │
│ │ │ │AXLE ELEMENT 612│CENTRAL RECTANGULAR PORTION 618│SLEEVE ELEMENT 646│
│ │ │ └────────────────┴────────────────────────────┴──────────────┘ │ │ │
│ │ │ ┌──────────┬──────────────────┬──────────────────┬──────────┐ │ │ │
│ │ │ │LENGTH 622│SQUARE SHAPED CS. 626, 636│CIRCLE SHAPED CS. 631, 644│LENGTH 658│
│ │ │ └──────────┴──────────────────┴──────────────────┴──────────┘ │ │ │
│ │ │ ┌──────────────────┬────────────────────┬──────────────────┬─────┐ │ │ │
│ │ │ │INERTIA WHEELS 660│SQUARE SHAPED CS. 668a│CIRCLE SHAPED CS. 668b│SPLINE INT. 670│
│ │ │ └──────────────────┴────────────────────┴──────────────────┴─────┘ │ │ │
│ │ │ ┌──────────────────────┬──────────────────────┬──────────────────┐ │ │ │
│ │ │ │DAMPING MOVEMENT 694  │REDUCED BACKLASH 696  │INCIDENTAL MOTION 698│ │ │ │
│ │ │ └──────────────────────┴──────────────────────┴──────────────────┘ │ │ │
│ │ │ ┌──────────────┬──────────────┬──────────────┬──────────────────┐ │ │ │
│ │ │ │CLAMPING FORCE│SLIDE FRICTION│RESISTANCE FORCE│INCREASED RELIABILITY│
│ │ │ │     700      │     702      │     704        │       706        │ │ │ │
│ │ │ └──────────────┴──────────────┴──────────────┴──────────────────┘ │ │ │
│ │ │ ┌──────────────────────────────┬────────────────────────────────┐ │ │ │
│ │ │ │INCREASED FLUTTER SUPPRESSION 708│IMPROVED HYDRAULIC APPLICATION STABILITY 710│
│ │ │ └──────────────────────────────┴────────────────────────────────┘ │ │ │
│ │ │ ┌──────────────────────────────────────┬────────────────────────┐ │ │ │
│ │ │ │INCREASED EFFICIENT FLIGHT CONTROL ACTUATION 712│PASSIVE SOLUTION 714│
│ │ │ └──────────────────────────────────────┴────────────────────────┘ │ │ │
│ │ └─────────────────────────────────────────────────────────────────────┘ │ │
│ └─────────────────────────────────────────────────────────────────────────┘ │
└─────────────────────────────────────────────────────────────────────────────┘
```

FIG. 30

DUAL RACK AND PINION ROTATIONAL INERTER SYSTEM AND METHOD FOR DAMPING MOVEMENT OF A FLIGHT CONTROL SURFACE OF AN AIRCRAFT

CROSS-REFERENCE TO RELATED APPLICATIONS

The present application is a continuation-in-part application of and claims priority to pending U.S. patent application Ser. No. 15/159,706, filed May 19, 2016, entitled "Rotational Inerter and Method for Damping an Actuator", the content of which is incorporated herein by reference in its entirety, and the present continuation-in-part application is related to contemporaneously filed continuation-in-part, nonprovisional U.S. patent application Ser. No. 15/867,940, titled "Translational Inerter Assembly and Method for Damping Movement of a Flight Control Surface", filed on Jan. 11, 2018, the content of which is incorporated by reference in its entireties.

FIELD

The present disclosure relates to actuators and, more particularly, to a dual rack and pinion rotational inerter system and method for damping movement of a flight control surface of an aircraft.

BACKGROUND

Aircraft typically include a flight control system for directional and attitude control of the aircraft in response to commands from a flight crew or an autopilot. A flight control system may include a plurality of movable flight control surfaces such as ailerons on the wings for roll control, elevators on the horizontal tail of the empennage for pitch control, a rudder on the vertical tail of the empennage for yaw control, and other movable control surfaces. Movement of a flight control surface is typically effected by one or more actuators mechanically coupled between a support structure (e.g., a wing spar) and the flight control surface (e.g., an aileron). In many aircraft, the actuators for flight control surfaces are linear hydraulic actuators driven by one or more hydraulic systems which typically operate at a fixed working pressure.

One of the challenges facing aircraft designers is preventing the occurrence of flutter of the flight control surfaces during flight. Control surface flutter may be described as unstable aerodynamically-induced oscillations of the flight control surface, and may occur in flight control systems where the operating bandwidth of the flight control system overlaps the resonant frequency of the flight control surface. Unless damped, the oscillations may rapidly increase in amplitude with the potential for undesirable results, including exceeding the strength capability of the mounting system of the flight control surface and the actuator. Contributing to the potential for control surface flutter is elasticity in the flight control system. For example, hydraulic actuators may exhibit a linear spring response under load due to compressibility of the hydraulic fluid. The compressibility of the hydraulic fluid may be characterized by the cross-sectional area of the actuator piston, the volume of the hydraulic fluid, and the effective bulk modulus of elasticity of the hydraulic fluid.

One method of addressing control surface flutter involves designing the flight control system such that the operating bandwidth does not overlap the resonant frequency of the flight control surface, and may include limiting the inertia of the load on the actuator and/or increasing the piston cross-sectional area as a means to react the inertia load. Unfortunately, the above known methods result in an actuator system that is sized not to provide the actuator with static load-carrying capability, but rather to provide the actuator with the ability to react larger inertia as a means to avoid resonance in the operating bandwidth. As may be appreciated, limiting control surface inertia corresponds to a decrease in control surface area. A decrease in the surface area of higher inertia control surfaces of an aircraft empennage may reduce the attitude controllability of the aircraft. As may be appreciated, an increase in the piston cross-sectional area of an actuator corresponds to an increase in the size and weight of the hydraulic system components including the size and weight of the actuators, tubing, reservoirs, and other components. The increased size of the actuators may protrude further outside of the outer mold line of the aerodynamic surfaces resulting in an increase in aerodynamic drag of an aircraft. The reduced attitude controllability, increased weight of the hydraulic system, and increased aerodynamic drag may reduce safety, fuel efficiency, range, and/or payload capacity of the aircraft.

As can be seen, there exists a need in the art for a system and method for allowing the operating bandwidth of an actuator to match or encompass the resonant frequency of a movable device without oscillatory response.

In addition, flutter suppression is a known challenge for high-pressure, hydraulic, flight-control actuation. High pressure hydraulics systems face an upper limit due to aero-servo-elasticity which drives a lower limit on actuator linear stiffness. That lower limit depends on the kinematics and inertia of the flight control surface.

Known flight control systems and method for addressing flutter suppression are primarily focused on increasing linear stiffness by increasing actuator piston diameter, which may cause increased flight control system and aircraft size, weight, and power. Increased flight control system and aircraft size, weight, and power may result in increased flight fuel costs. Other known flight control systems and methods for addressing flutter suppression attempt to enhance the active control system performance by increasing the servo bandwidth to operate in the high dynamic resonant frequency range of the actuator and valve. However, such known flight control systems and methods involve the used of active control elements, such as the actuator and valve size or diameter, rather than a passive means to change the dynamics of the flight control system. The use of such active control elements may overly complicate the control elements, be less space efficient, and may be unreliable.

As can be seen, there exists a need in the art for an assembly and method to address flutter suppression and flutter critical control surface applications on aircraft, to dampen movement of flight control surfaces, and to optimize a flight control system design in terms of improved reliability, space efficiency and changing the dynamic characteristics of the hardware under control rather than complicating the flight control system elements themselves.

SUMMARY

The above-noted needs associated with actuators are specifically addressed and alleviated by the present disclosure which provides a dual rack and pinion rotational inerter system for damping movement of a flight control surface of an aircraft. The dual rack and pinion rotational inerter system comprises a flexible holding structure disposed between the flight control surface and a support structure of the aircraft.

The system further comprises a dual rack and pinion assembly held by and between the flexible holding structure. The dual rack and pinion assembly comprises a first rack, a second rack, and a pinion engaged to and between the first rack and the second rack. The system further comprises a first terminal coupled to the first rack and coupled to the flight control surface, via a pivot element, and a second terminal coupled to the second rack, and coupled to the support structure.

The system further comprises a pair of inertia wheels comprising a first inertia wheel adjacent to a first side of the flexible holding structure, and a second inertial wheel adjacent to a second side of the flexible holding structure. The system further comprises an axle element inserted through the first inertial wheel, the flexible holding structure, the pinion, and the second inertial wheel, coupling a rotational movement of the pair of inertia wheels and the pinion.

Rotation of the flight control surface causes translational movement, via the pivot element, of the first rack relative to the second rack, along a longitudinal inerter axis, which causes the rotational movement of the pinion and the pair of inertia wheels, such that the rotational movement of the pinion is resisted by the pair of inertia wheels, resulting in the dual rack and pinion rotational inerter system damping movement of the flight control surface.

Also disclosed is an aircraft comprising a flight control surface pivotably coupled to a support structure, one or more actuators configured to actuate the flight control surface, and at least one dual rack and pinion rotational inerter system for damping movement of the flight control surface of the aircraft.

The dual rack and pinion rotational inerter system comprises a flexible holding structure disposed between the flight control surface and the support structure of the aircraft. The dual rack and pinion rotational inerter system further comprises a plurality of rod bearings inserted into interior corners of the flexible holding structure. The dual rack and pinion rotational inerter system further comprises a dual rack and pinion assembly clamped by and between the flexible holding structure. The dual rack and pinion assembly comprises a first rack, a second rack, and a pinion engaged to and between the first rack and the second rack.

The dual rack and pinion rotational inerter system further comprises a first terminal coupled to the first rack and coupled to the flight control surface, via a pivot element, and a second terminal coupled to the second rack, and coupled to the support structure. The dual rack and pinion rotational inerter system further comprises a pair of inertia wheels comprising a first inertia wheel adjacent to a first side of the flexible holding structure, and a second inertial wheel adjacent to a second side of the flexible holding structure. The dual rack and pinion rotational inerter system further comprises an axle element inserted through the first inertial wheel, the flexible holding structure, the pinion, and the second inertial wheel, coupling a rotational movement of the pair of inertia wheels and the pinion.

Rotation of the flight control surface causes translational movement, via the pivot element, of the first rack relative to the second rack, along a longitudinal inerter axis, which causes the rotational movement of the pinion and the pair of inertia wheels, such that the rotational movement of the pinion is resisted by the pair of inertia wheels. This results in the dual rack and pinion rotational inerter system damping movement of the flight control surface.

Also disclosed is a method for damping movement of a flight control surface of an aircraft. The method comprises the step of installing at least one dual rack and pinion rotational inerter system between the flight control surface and a support structure of the aircraft.

The dual rack and pinion rotational inerter system comprises a flexible holding structure having a plurality of rod bearings inserted into interior corners of the flexible holding structure. The dual rack and pinion rotational inerter system further comprises a dual rack and pinion assembly clamped by and between the flexible holding structure. The dual rack and pinion assembly comprises a first rack, a second rack, and a pinion engaged to and between the first rack and the second rack.

The dual rack and pinion rotational inerter system further comprises a first terminal coupled to the first rack and coupled to the flight control surface, via a pivot element, and a second terminal coupled to the second rack, and coupled to the support structure. The dual rack and pinion rotational inerter system further comprises a pair of inertia wheels comprising a first inertia wheel adjacent to a first side of the flexible holding structure, and a second inertial wheel adjacent to a second side of the flexible holding structure. The dual rack and pinion rotational inerter system further comprises an axle element inserted through the first inertial wheel, the flexible holding structure, the pinion, and the second inertial wheel, and the axle element coupling a rotational movement of the pair of inertia wheels and the pinion.

The method further comprises the step of rotating the flight control surface using one or more actuators. The method further comprises the step of using the at least one dual rack and pinion rotational inerter to axially accelerate and pull in a translational movement along a longitudinal inerter axis, the first rack relative to the second rack, and to cause the rotational movement of the pinion and the pair of inertia wheels, such that the rotational movement of the pinion is resisted by the pair of inertia wheels and there is no incidental motion. The method further comprises the step of damping movement of the flight control surface, using the at least one dual rack and pinion rotational inerter.

The above-noted needs associated with actuators are specifically addressed and alleviated by the present disclosure which provides an apparatus including an inerter for damping an actuator. The inerter includes a first terminal and a second terminal movable relative to one another along an inerter axis and configured to be mutually exclusively coupled to a support structure and a movable device actuated by an actuator. In one example, the inerter further includes a rod coupled to and movable with the first terminal. The inerter also includes a threaded shaft coupled to and movable with the second terminal. The inerter additionally includes a flywheel having a flywheel annulus coupled to the rod. The flywheel is configured to rotate in proportion to axial acceleration of the rod relative to the threaded shaft in correspondence with actuation of the movable device by the actuator.

Also disclosed is aircraft having a flight control surface pivotably coupled to a support structure of the aircraft. The aircraft further includes a hydraulic actuator configured to actuate the flight control surface. In addition, the aircraft includes an inerter having a first terminal and a second terminal mutually exclusively coupled to the support structure and the flight control surface. The inerter additionally includes a rod movable with the first terminal, and a threaded shaft movable with the second terminal. The inerter also includes a flywheel coupled to the rod and the threaded shaft. The flywheel is configured to rotate in proportion to axial acceleration of the rod relative to the threaded shaft in correspondence with actuation of the flight control surface by the actuator.

In addition, disclosed is a method of damping an actuator. The method includes actuating, using an actuator, a movable device. In addition, the method includes axially accelerating, using an inerter coupled to the movable device, a first terminal relative to a second terminal of the inerter simultaneous with and in proportion to actuation of the movable device. Furthermore, the method includes rotationally accelerating a flywheel of the inerter in proportion to and simultaneous with the axial acceleration of the first terminal relative to the second terminal. Additionally, the method includes reducing actuator load oscillatory amplitude of the movable device and actuator in response to rotationally accelerating the flywheel.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a perspective view of an aircraft;

FIG. 4 is a top view of a portion of a wing illustrating an actuator and an inerter operatively coupled to an aileron;

FIG. 5 is a sectional view of a wing taken along line 5 of FIG. 4 and illustrating an example of a linear hydraulic actuator mechanically coupled between a wing spar and one end of an aileron;

FIG. 6 is a sectional view of the wing taken along line 6 of FIG. 4 and illustrating an example of an inerter coupled to the aileron on an end opposite the actuator;

FIG. 9 is a magnified sectional view of the flywheel taken along line 9 of FIG. 8 and illustrating a bearing rotatably coupling the flywheel annulus to the inerter rod and further illustrating the threadable engagement of the flywheel to the threaded shaft;

FIG. 10 is a sectional view of an example of an inerter integrated into an unbalanced hydraulic actuator and illustrating the inerter flywheel rotatably coupled to a piston of the hydraulic actuator;

FIG. 11 is a sectional view of an example of an inerter having flywheel protrusions for generating viscous damping within hydraulic fluid during rotation of the flywheel;

FIG. 12 is a perspective view of an example of an inerter taken along line 12 of FIG. 11 and illustrating a plurality of radially extending flywheel blades circumferentially spaced around the flywheel perimeter;

FIG. 13 is a sectional view of an example of an inerter integrated into a partially-balanced hydraulic actuator having an interior piston axially slidable within the piston rod;

FIG. 14 is a sectional view of an example of an inerter integrated into a balanced hydraulic actuator having opposing piston sides with substantially equivalent cross-sectional areas;

FIG. 17 is a sectional view of an example of an inerter integrated into a hydraulic actuator and wherein the flywheel and threaded shaft are rotatably coupled to the actuator end wall and the piston fixedly coupled to the rod;

FIG. 18 is a magnified sectional view of the flywheel and piston taken along line 18 of FIG. 17 and illustrating the flywheel annulus rotatably coupled to the actuator end wall and the piston threadably engaged to the threaded shaft in a manner such that linear translation of the rod relative to the threaded shaft causes rotation of the flywheel and threaded shaft;

FIG. 19 is a sectional view of an example of a flywheel rotatably coupled to the actuator end wall and having an electric flywheel motor including permanent magnets mounted to the flywheel perimeter and windings mounted to the housing side wall of the actuator;

FIG. 20 is a sectional view of a further example of a flywheel having an electric flywheel motor and further including a brake configured to provide dynamic braking of the flywheel;

FIG. 25 is a perspective view of an aircraft;

FIG. 26 is a top view of a wing section of a wing, taken along line 26-26 of FIG. 25, illustrating an actuator and a dual rack and pinion rotational inerter system operatively coupled between a flight control surface and a support structure;

FIG. 27 is a sectional view of the wing section, taken along line 27-27 of FIG. 26, and illustrating an example of a dual rack and pinion rotational inerter system installed between the flight control surface and the support structure;

FIG. 28 is a sectional view of the wing section, taken along line 28-28 of FIG. 26, and illustrating an example of a hydraulic actuator mechanically coupled between a wing spar and one end of an aileron;

FIG. 30 is a block diagram of a flight control system of an aircraft including one or more actuators for actuating a flight control surface, and further including a dual rack and pinion rotational inerter system for damping movement of the flight control surface.

DETAILED DESCRIPTION

Figure 1:
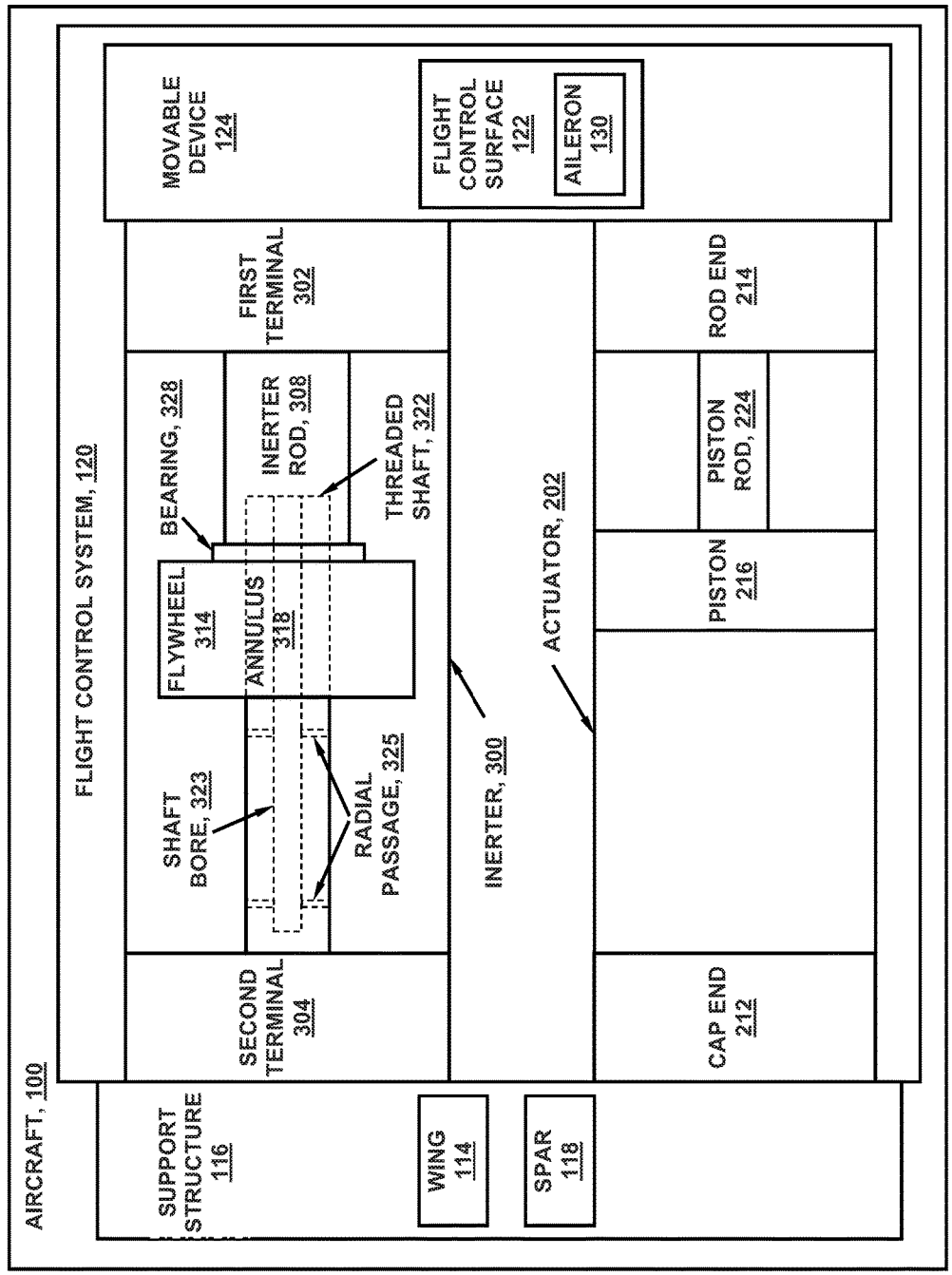
FIG. 1 is a block diagram of a flight control system of an aircraft including a hydraulic actuator for actuating a flight control surface and further including an inerter for damping the hydraulic actuator.

Referring now to the drawings wherein the showings are for purposes of illustrating various examples of the present disclosure, shown in FIG. 1 is a block diagram of a hydraulic actuator 204 coupled between a support structure 116 and a movable device 124 and configured to move or actuate the movable device 124. The block diagram advantageously includes a rotational inerter 300 for damping the actuator 202. The inerter 300 is shown coupled between the support structure 116 and the movable device 124 and is configured to improve the dynamic response of the movable device 124 during actuation by the actuator 202, as described in greater detail below. In the example shown in FIGS. 1 and 4-9, the inerter 300 is provided as a separate component from the actuator 202. However, in other examples (e.g., FIGS. 2 and 10-21) described below, the inerter 300 is integrated into the actuator 202.

The actuator 202 includes a piston 216 coupled to a piston rod 224. The piston 216 is slidable within an actuator housing 228 (e.g., a cylinder). The actuator 202 further includes a rod end 214 and a cap end 212 axially movable relative to one another in response to pressurized hydraulic fluid acting in an unbalanced manner on one or both sides of the piston 216 inside the actuator housing 228. In the example shown, the rod end 214 is coupled to the movable device 124 and the cap end 212 is coupled to the support structure 116. However, the actuator 202 may be mounted such that the rod end 214 is coupled to the support structure 116 and the cap end 212 is coupled to the movable device 124.

Referring still to FIG. 1, the inerter 300 includes a first terminal 302 and a second terminal 304 axially movable or translatable relative to one another along an inerter axis 306 (FIG. 8) in correspondence with actuation of the movable device 124 by the actuator 202. In the example shown, the first terminal 302 is coupled to the movable device 124 and the second terminal 304 is coupled to the support structure 116. However, the inerter 300 may be mounted such that the first terminal 302 is coupled to the support structure 116 and the second terminal 304 is coupled to the movable device 124. In an example not shown, the support structure to which the inerter 300 is coupled may be a different support structure than the support structure 116 to which the actuator 202 is coupled.

The inerter 300 includes an inerter rod 308 coupled to and axially movable (e.g., translatable) with the first terminal 302. The inerter rod 308 may be aligned with or parallel to the inerter axis 306. The inerter rod 308 may be hollow to define a rod bore 310. The threaded shaft 322 is coupled to and axially movable (e.g., translatable) with the second terminal 304. The threaded shaft 322 may be aligned with or parallel to the inerter axis 306. The threaded shaft 322 has a free end 324 that may be receivable within the rod bore 310. The threaded shaft 322 may be hollow or may include a shaft bore 323 open on the free end 324 of the threaded shaft 322. The threaded shaft 322 may include radial passages 325 extending radially from the shaft bore 323 to the exterior side of the threaded shaft 322 to allow fluid flow between the exterior side of the threaded shaft 322 and the shaft bore 323. The shaft bore 323 may allow fluid (e.g., hydraulic fluid—not shown) to flow from the fluid cavity at a second terminal 304 (for non-integrated inerters—FIG. 1) or cap end 212 (for integrated inerters—FIG. 2), through the shaft bore 323, and into the fluid cavity at the free end 324 (FIG. 8) of the threaded shaft 322 to allow the fluid to lubricate moving parts of the bearing 328 and/or at the flywheel annulus 318. The size (e.g., diameter) of the shaft bore 323 and the size (e.g., diameter) and quantity of the radial passages 325 may be configured to apportion fluid flow to the bearing 328 and the flywheel annulus 318.

As shown in FIG. 1, the inerter 300 includes a flywheel 314 (e.g., a spinning mass). In some examples (e.g., FIGS. 6 and 8-16), the flywheel 314 is threadably coupled to the threaded shaft 322 which converts linear motion of the threaded shaft 322 into rotational motion of the flywheel 314. The flywheel 314 is configured to rotate in proportion to axial movement of the inerter rod 308 relative to the threaded shaft 322 in correspondence with actuation of the movable device 124 by the actuator 202. In this regard, the flywheel 314 is configured to rotationally accelerate and decelerate in proportion to axial acceleration and deceleration of the inerter rod 308 (e.g., coupled to the first terminal 302) relative to the threaded shaft 322 (e.g., coupled to the second terminal 304).

Advantageously, the flywheel 314 is coupled to the inerter rod 308 at a flywheel annulus 318 and is threadably engaged to the threaded shaft 322, as shown in FIGS. 1, 8-9, and 14 and described in greater detail below. However, in other examples, the flywheel annulus 318 may be coupled to the piston 216 as shown in FIGS. 10-13 and 15-16 and described below. In still further examples, the flywheel annulus 318 may be coupled to the actuator housing 228 as shown in FIGS. 17-20 and described below.

Regardless of the component to which the flywheel 314 is coupled, the flywheel 314 may include at least one bearing 328 (e.g., a thrust bearing 328) at the flywheel annulus 318 to rotatably couple the flywheel 314 to the inerter rod 308 (FIGS. 1, 8-9, and 14), the piston 216 (FIGS. 10-13 and 15-16), or the actuator housing 228 (FIGS. 17-20). The bearing 328 allows the flywheel 314 to axially translate with the inerter rod 308 as the flywheel 314 rotates on the threads of the threaded shaft 322 in response to axial movement of the inerter rod 308 relative to the threaded shaft 322. Advantageously, by coupling the flywheel 314 to the component (i.e., the inerter rod 308, the piston 216, or the actuator housing 228) at the flywheel annulus 318 instead of at the flywheel perimeter 316, the flywheel 314 exhibits limited flexure in the axial direction during high-frequency, oscillatory, axial acceleration of the first terminal 302 relative to the second terminal 304. Such axial flexure of the flywheel mass would otherwise reduce flywheel rotational motion during high-frequency, oscillatory, axial acceleration.

Referring still to the example of FIG. 1, the support structure 116 is shown configured as a spar 118 of a wing 114 of an aircraft 100. The movable device 124 is shown as a flight control surface 122 of a flight control system 120 of the aircraft 100. The flight control surface 122 may be hingedly coupled to the rigid support structure 116 such as a wing spar 118 or other structure. The flight control surface 122 may be pivotably about a hinge axis 126. The flight control surface 122 may comprise any one of a variety of different configurations including, but not limited to, a spoiler, an aileron, an elevator 112, an elevon, a flaperon, a rudder 108, a high-lift device such as a leading edge slat, a trailing edge flap, or any other type of movable device 124.

The actuator 202 provides positive force to move the flight control surface 122 to a commanded position in response to a command input from the flight crew or an autopilot. The inerter 300 provides for control and damping of displacements of the flight control surface 122. One or more inerters 300 may be included in a flight control system 120. In one example, the one or more inerters 300 may be configured to suppress or prevent control surface flutter as may be aerodynamically-induced at a resonant frequency of the flight control surface 122. For example, the presently-disclosed inerter 300 may be configured to reduce actuator load oscillatory amplitude at resonance (e.g., at a resonant frequency) of up to approximately 20 Hz (e.g., ±5 Hz) which may correspond to the flutter frequency of a flight control surface 122 of an aircraft 100. Additionally or alternatively, the inerter 300 may provide additional functionality for improving the dynamic response of a movable device 124, such as increasing the actuation rate of the movable device 124 and/or preventing position overshoot of a commanded position of the movable device 124, as described in greater detail below.

In one example, the inerter 300 may be configured such that rotation of the flywheel 314 reduces actuator load oscillatory amplitude at resonance of the coupled actuator 202 and movable device 124 by at least approximately 10 percent relative to the actuator load oscillatory amplitude that would otherwise occur using the same actuator 202 without an inerter 300. Advantageously, the presently-disclosed inerter 300 permits the operating bandwidth of the actuator 202 to encompass or match the resonant frequency of the coupled movable device 124 and actuator 202 without the potential for oscillatory response, without the potential for exceeding the strength capability of the mounting system (not shown) of the flight control surface 122 and actuator 202, and/or without the potential for flight control surface 122 deflections that could aerodynamically destabilize the aircraft 100.

The presently-disclosed examples of the inerter 300 allow for a reduction in the overall size and weight of an actuator 202 system without the potential for oscillatory response. More specifically, the inerter 300 allows for a reduction in the inertial load on the actuator 202 which, in turn, allows for a reduction in piston cross-sectional area of the actuator 202 and a decrease in the size and weight of other hydraulic system components including reservoirs, tubing diameter, accumulators, pumps, and other components. In this regard, the inerter 300 increases the power density for a hydraulic actuator system in any application where dynamic response is limited by piston cross-sectional area or load inertia. The presently-disclosed inerter 300 examples may be implemented with hydraulic actuators 204 configured to be operated at a working pressure of at least 5000 psi. For example, the inerter 300 examples may be implemented with hydraulic actuators 204 operated at a working pressure of approximately 3000 psi and, in some examples, the hydraulic actuators 204 may be operated at a working pressure of approximately 8000 psi. A relatively high working pressure of a hydraulic actuator 204 may facilitate a reduction in total flow of hydraulic fluid through the hydraulic system (e.g., flight control system 120) which may enable a reduction in the volumetric requirement for hydraulic fluid reservoirs and accumulators.

In the case of an aircraft 100, the reduced size of the actuators 202 may reduce the amount by which such actuators 202 protrude outside of the outer mold line (not shown) of the aircraft 100 with a resulting decrease in aerodynamic drag. Even further, the presently-disclosed inerter examples may allow for a reduction in the amount of off-take power from the aircraft propulsion units (e.g., gas-turbine engines) which may provide the potential for using higher bypass ratio gas turbine engines such as in commercial aircraft applications. The decrease in the size of the hydraulic system, the reduction in aerodynamic drag, and/or the reduction in off-take power may translate to an increase in aircraft performance including, but not limited to, increased fuel efficiency, range, and/or payload capacity.

Although the presently-disclosed inerter examples are described in the context of a linear hydraulic actuator 204, the inerter 300 may be implemented in other types of actuators 202 including, but not limited to, a rotary hydraulic actuator, an electro-hydraulic actuator (e.g., rotary or linear), a mechanical actuator, an electro-mechanical actuator, and other types of actuators. In one example (see FIG. 21), the electro-mechanical actuator 242 may be a linear electro-mechanical actuator having a threaded shaft 322 coupled to a movable device 124. As described in greater detail below with reference to FIG. 21, the linear electro-mechanical actuator 242 may include an electric actuator motor 244 for causing axial motion of a threaded shaft 322. A flywheel 314 may be threadably engaged to the threaded shaft 322 and may be configured to rotationally accelerate and decelerate in proportion to axial acceleration and deceleration of the threaded shaft 322 during actuation of the movable device 124 by the linear electro-mechanical actuator 242.

It should also be noted that although the presently-disclosed inerter examples are described in the context of an aircraft flight control system 120, any one of the inerters 300 may be implemented in any type of open-loop or closed-loop control system for use in any one of a variety of different applications in any industry, without limitation. In this regard, the presently-disclosed inerters 300 may be implemented in any vehicular application or non-vehicular application. For example, an inerter 300 may be implemented in any marine, ground, air, and/or space application, and in any vehicular or non-vehicular system, subsystem, assembly, subassembly, structure, building, machine, and application that uses an actuator to actuate a movable device.

In some examples, an inerter 300 may be implemented for damping movement of a movable device configured to control the direction of travel of a vehicle. For example, an inerter may be implemented for damping movement of aerodynamic control surfaces of an air vehicle, hydrodynamic control surfaces of a marine vessel, thrust directors including thrust-vectoring nozzles of an aircraft or a launch vehicle (e.g., a rocket), or any other type of mechanical device that influences the direction of travel of a vehicle and which may be susceptible to external vibratory forces. In a specific example of a wheeled vehicle configured to move over land, any one of the presently-disclosed inerter examples may be implemented in a steering system to control or avoid wheel shimmy, such as may occur in a steerable wheel of an aircraft landing gear such as a nose landing gear.

Figure 2:
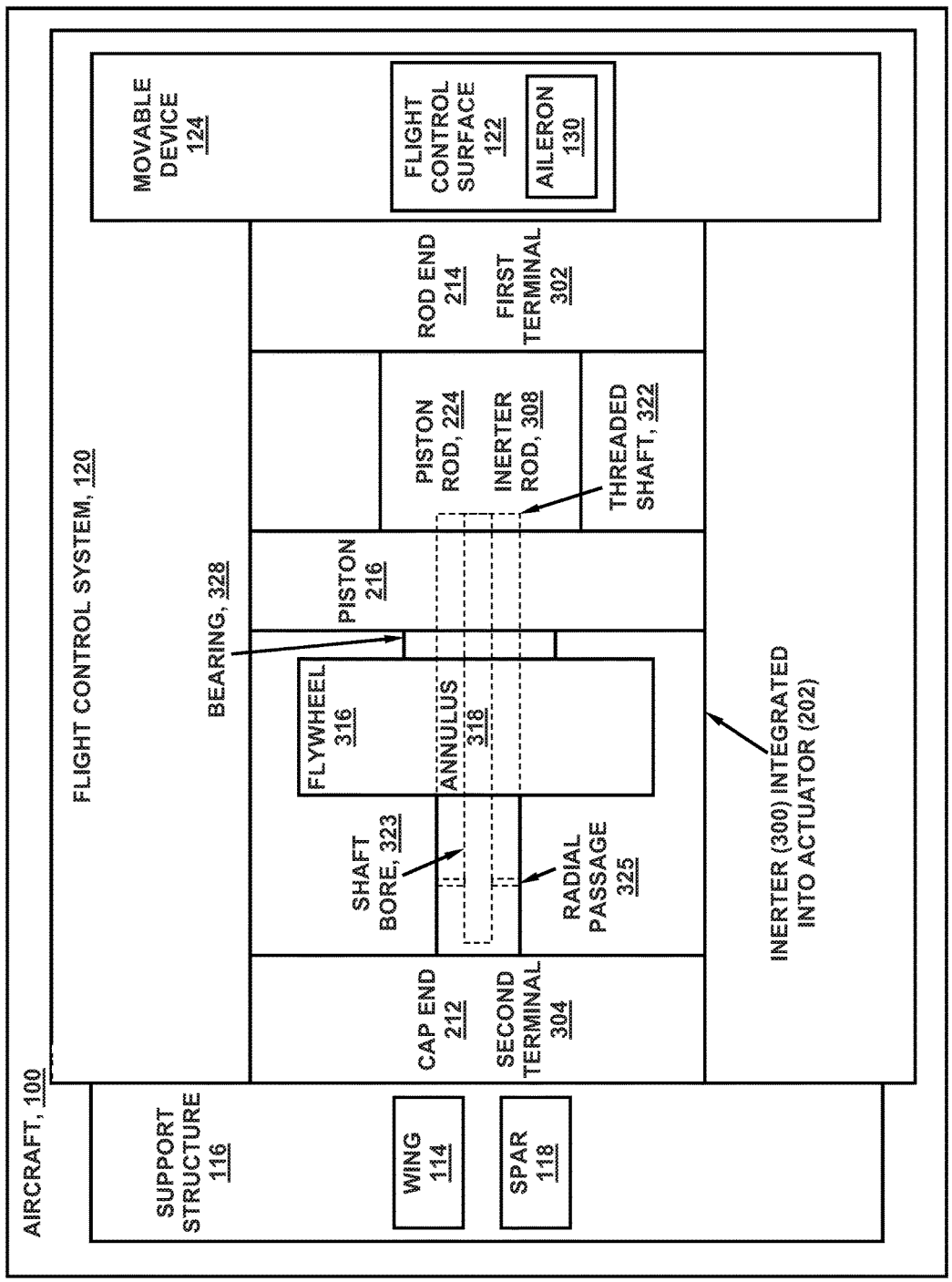
FIG. 2 is a block diagram of an example of an inerter integrated into a hydraulic actuator.

FIG. 2 is a block diagram of an example of an inerter 300 integrated into a hydraulic actuator 204 coupled between a support structure 116 and a flight control surface 122 of a flight control system 120 of an aircraft 100. In the example shown, the actuator 202 is a linear hydraulic actuator 204 having a piston 216 coupled to a rod (e.g., piston rod 224) and axially slidable within a housing (not shown). In the example shown, the flywheel 314 of the inerter 300 is rotatably coupled to the piston 216 at the flywheel annulus 318. The flywheel 314 is threadably coupled to the threaded shaft 322 and configured to rotationally accelerate in proportion to axial acceleration of the piston 216 and rod relative to the threaded shaft 322. However, as mentioned above, the flywheel 314 may be rotatably coupled to the piston 216 (e.g., FIGS. 10-16) or the flywheel 314 may be rotatably coupled to the cap end 212 (e.g., FIGS. 17-20) or rod end 214 of the actuator housing 228.

As mentioned above, the threaded shaft 322 may include a shaft bore 323 open on the free end 324 and having radial passages 325 to allow fluid (e.g., hydraulic fluid) to flow from the cap end chamber 236 at the cap end 212), through the shaft bore 323, and out of the free end 324 of the threaded shaft 322 to allow the fluid to lubricate moving parts of the bearing 328 and/or the flywheel annulus 318. The shaft bore 323 and radial passages 325 may be included in any one of the inerter 300 examples disclosed herein.

In the present disclosure, for examples wherein the inerter 300 is integrated into the actuator 202, the rod end 214 or cap end 212 of the actuator 202 functions as the first terminal 302 of the inerter 300, and the remaining rod end 214 or cap end 212 of the actuator 202 functions as the second terminal 304 of the inerter 300. In this regard, the terms "first terminal" and "second terminal" are non-respectively used interchangeably with the terms "rod end" and "cap end." In addition, for examples where the inerter 300 is integrated into the actuator 202, the term "rod" is used interchangeably with the terms "piston rod" and "inerter rod." Similarly, for examples where the inerter 300 is integrated into the actuator 202, the term "housing" is used interchangeably with the terms "actuator housing" and "inerter housing."

FIG. 3 is a perspective view of an aircraft 100 having one or more inerters 300 for control and/or damping of one or more actuators 202. The aircraft 100 may include a fuselage 102 and a pair of wings 114 extending outwardly from the fuselage 102. The aircraft 100 may include a pair of propulsion units (e.g., gas turbine engines). As mentioned above, each wing 114 may include one or more movable devices 124 configured as flight control surfaces 122 which may be actuated by an actuator 202 damped and/or assisted by an inerter 300. Such flight control surfaces 122 on the wings 114 may include, but are not limited to, spoilers, ailerons, and one or more high-lift devices such as a leading edge slats and/or trailing edge flaps. At the aft end of the fuselage 102, the empennage 104 may include one or more horizontal tails 110 and a vertical tail 106, any one or more of which may include flight control surfaces 122 such as an elevator 112, a rudder 108, or other types of movable devices 124 that may be actuated by an actuator 202 damped and/or assisted by an inerter 300.

FIG. 4 is a top view of a portion of the wing 114 of FIG. 3 illustrating an aileron actuated by a hydraulic actuator 204 located on one end of the aileron and having an inerter 300 located on an opposite and the aileron 130. The aileron 130 may be hingedly coupled to a fixed support structure 116 of the wing 114 such as a spar 118. In FIG. 4, the hydraulic actuator 204 and the inerter 300 are provided as separate components and may each be coupled between the support structure 116 (e.g., the spar 118) and the aileron 130.

FIG. 5 is a sectional view of the wing 114 of FIG. 4 showing an example of a linear hydraulic actuator 204 mechanically coupled between the wing spar 118 and one end of the aileron 130. In the example shown, the rod end 214 of the hydraulic actuator 204 is coupled to a bellcrank 128. The bellcrank 128 is hingedly coupled to the aileron in a manner such that linear actuation of the hydraulic actuator 204 causes pivoting of the aileron about the hinge axis 126. The cap end 212 of the hydraulic actuator 204 is coupled to the wing spar 118.

FIG. 6 is a sectional view of the wing 114 of FIG. 4 and showing an example of an inerter 300 coupled between the wing spar 118 and the aileron 130. As mentioned above, the inerter 300 is located on an end of the aileron opposite the hydraulic actuator 204. The first terminal 302 of the inerter 300 is coupled to a bellcrank 128. The second terminal 304 of the inerter 300 is coupled to the wing spar 118. Due to the hydraulic actuator 204 and the inerter 300 being coupled to the same movable device 124 (i.e., the aileron 130), relative axial acceleration of the cap end 212 and rod end 214 of the actuator 202 causes proportional axial acceleration of the first terminal 302 and second terminal 304 of the inerter 300 resulting in rotational acceleration of the flywheel 314.

Figure 7:
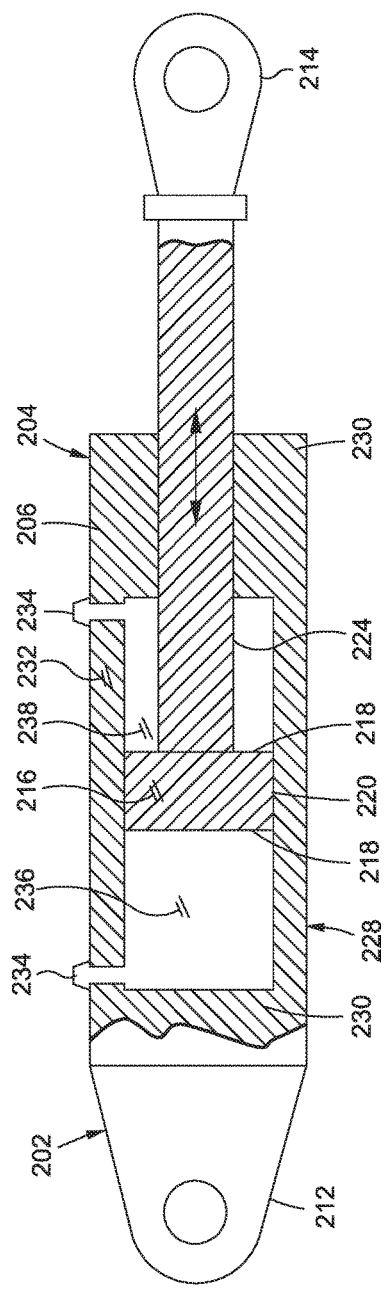
FIG. 7 is a sectional view of an example of a linear hydraulic actuator having a piston axially slidable within an actuator housing.

FIG. 7 is a partially cutaway sectional view of an example of a double-acting hydraulic actuator 204 having a cap end 212 and a rod end 214 axially movable relative to one another during actuation of the movable device 124. As mentioned above, the rod end 214 and the cap end 212 may be mutually exclusively coupled to the support structure 116 and the movable device 124. For example, the rod end 214 may be coupled to the support structure 116 and the cap end 212 may be coupled to the movable device 124, or the rod end 214 may be coupled to the movable device 124 and the cap end 212 may be coupled to the support structure 116.

In FIG. 7, the piston 216 is coupled to a free end 324 of the piston rod 224 and is axially slidable within the actuator housing 228. The piston 216 divides the actuator housing 228 into a cap end chamber 236 and a rod end chamber 238. The actuator housing 228 of the double-acting hydraulic actuator 204 includes a pair of fluid ports 234 through which pressurized hydraulic fluid enters and leaves the cap end chamber 236 and the rod end chamber 238 chambers for moving the piston 216 within the actuator housing 228. In any of the presently-disclosed examples, the hydraulic actuator 204 may also be configured as a single-acting actuator (not shown) wherein the actuator housing 228 contains a single fluid port 234 for receiving pressurized hydraulic fluid in the actuator housing 228 as a means to move the piston 216 along one direction within the actuator housing 228, and optionally include a biasing member (e.g., a spring—not shown) for moving the piston 216 in an opposite direction.

Figure 8:
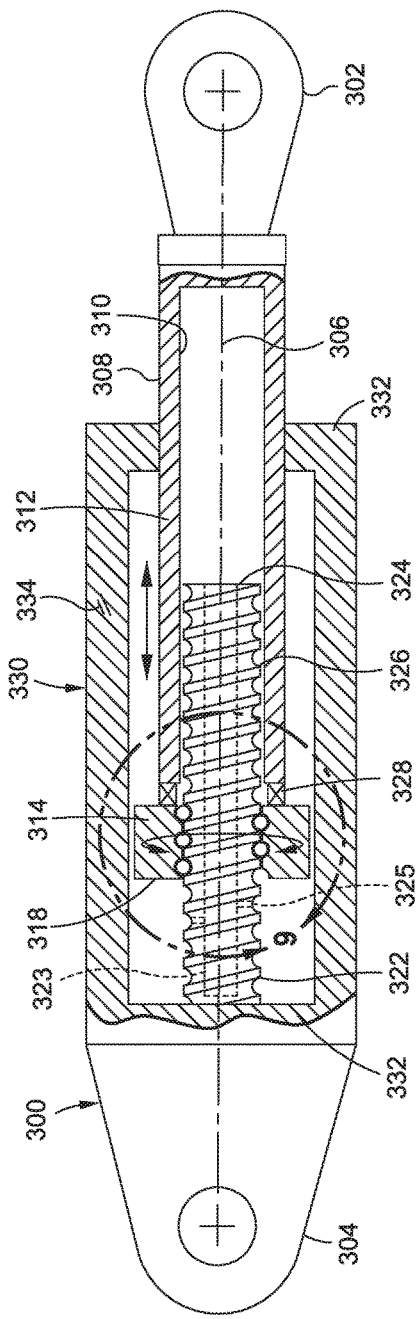
FIG. 8 is a sectional view of an example of an inerter having a rod coupled to a first terminal and a threaded shaft coupled to a second terminal and including a flywheel threadably engaged to the threaded shaft and configured to rotate in proportion to axial acceleration of the rod and first terminal relative to the threaded shaft and second terminal.

FIG. 8 is a partially cutaway sectional view of an example of an inerter 300 having an inerter housing 330 containing the flywheel 314 and having an inerter side wall 334 and opposing inerter end walls 332. One inerter end wall 332 may include a housing bore through which the inerter rod 308 extends and terminates at the first terminal 302. The inerter 300 includes a threaded shaft 322 coupled to the inerter end wall 332 located at the second terminal 304. In the example of FIG. 8, the flywheel 314 is coupled to an end of the inerter rod 308 and threadably engaged to the threaded shaft 322. The flywheel 314 rotates in proportion to axial acceleration of the inerter rod 308 and first terminal 302 relative to the threaded shaft 322 and second terminal 304.

FIG. 9 is a magnified sectional view of FIG. 8 showing the flywheel 314 coupled to the inerter rod 308 at the flywheel annulus 318. The flywheel annulus 318 is also threadably engaged to the threaded shaft 322. In the example shown, the threaded shaft 322 is configured as a ball screw 326 having helical grooves for receiving ball bearings which couple similarly-configured helical grooves in the flywheel annulus 318 to the ball screw 326 with minimal friction. Although not shown, the flywheel annulus 318 may include a ball nut for circulating the ball bearings coupling the flywheel 314 to the ball screw 326. In another example not shown, the threaded shaft 322 may comprise a lead screw having threads to which the flywheel annulus 318 are directly engaged. As may be appreciated, the flywheel 314 may be configured for engagement to any one of a variety of different types of configurations of threaded shafts, and is not limited to the ball screw 326 example illustrated in FIG. 9.

Also shown in FIG. 9 is an example of a bearing 328 for coupling the flywheel annulus 318 to the inerter rod 308 such that the inerter rod 308 and flywheel 314 may translate in unison as the flywheel 314 rotates due to threadable engagement with the threaded shaft 322. Although the bearing 328 is shown as a ball bearing, the bearing 328 may be provided in any one a variety of different configurations capable of axially coupling the flywheel 314 to the inerter rod 308 with a minimal amount of axial free play. For example, the bearing 328 may be configured as a roller bearing (not shown). In still further examples, the flywheel 314 may be coupled to the inerter rod 308 without a bearing while still allowing the flywheel 314 to rotate during translation of the inerter rod 308 and flywheel 314 relative to the threaded shaft 322.

FIG. 10 is a sectional view of an example of an inerter 300 integrated into a hydraulic actuator 204 having a housing containing a piston 216. The actuator 202 is a double-acting actuator including a pair of fluid ports 234 for receiving pressurized hydraulic fluid in a cap end chamber 236 and a rod end chamber 238 located on opposite sides of the piston 216. The actuator 202 is an unbalanced actuator 206 wherein one of the piston sides 218 has a greater cross-sectional area than the opposite piston side 218. The piston 216 may include a piston 216 seal (e.g., an O-ring seal—not shown) extending around the piston perimeter 220 for sealing the piston perimeter 220 to the actuator side wall 232.

As mentioned above, for examples where the inerter 300 is integrated into an actuator 202, the rod end 214 or the cap end 212 of the actuator 202 functions as the first terminal 302 of the inerter 300, and the remaining rod end 214 or the cap end 212 of the actuator 202 functions as the second terminal 304 of the inerter 300. In the example shown, the flywheel 314 is mounted in the cap end chamber 236 and is rotatably coupled to the piston 216 at the flywheel annulus 318. The flywheel 314 is threadably engaged to the threaded shaft 322 which passes through the piston 216 and extends into the rod bore 310. The flywheel 314 is configured to rotationally accelerate in proportion to axial acceleration of the piston 216 and piston rod 224 relative to the threaded shaft 322.

FIG. 11 shows an example of an inerter 300 having flywheel protrusions 320 for generating viscous damping during rotation of the flywheel 314 when the flywheel 314 is immersed in hydraulic fluid. The flywheel protrusions 320 generate or increase the viscous damping capability of the inerter 300 during rotation of the flywheel 314, and thereby increase the damping capability of the inerter 300.

FIG. 12 is a perspective view of an example of an inerter 300 having a plurality of radially extending flywheel blades circumferentially spaced around the flywheel perimeter 316. During rotation of the flywheel 314, the flywheel blades may generate viscous damping capability and add to the inerting capability of the inerter 300. Although FIG. 12 illustrates the flywheel protrusions 320 as radially-extending flywheel blades, the flywheel 314 may be provided with flywheel protrusions 320 extending from any portion of the flywheel 314 including one or both of the opposing sides of the flywheel 314. In addition, the flywheel protrusions 320 may be provided in any geometric size, shape or configuration, without limitation, and are not limited to flywheel blades.

FIG. 13 is a sectional view of an example of an inerter 300 integrated into a hydraulic actuator 204 configured as a partially-balanced actuator 208. The partially-balanced actuator 208 includes an interior piston 226 coupled to a free end 324 of the threaded shaft 322. The interior piston 226 may be axially slidable within the rod bore 310 and may be rotatably coupled to the end of the threaded shaft 322 such that the interior piston 226 is non-rotatable relative to the rod bore 310 during axial movement of the piston rod 224 relative to the threaded shaft 322. Although not shown, the perimeter of the interior piston 226 may be sealed (e.g., via an O-ring) to the rod wall 312 of the rod bore 310. The inclusion of the interior piston 226 may reduce the total volume of hydraulic fluid required to fill the cap end chamber 236 during extension of the piston rod 224 relative to the increased volume of hydraulic fluid required to fill the cap end chamber 236 for examples (e.g., FIG. 8) lacking an interior piston 226.

FIG. 14 is a partially cutaway sectional view of an example of an inerter 300 integrated into a hydraulic actuator 204 configured as a balanced actuator 210 having opposing piston sides 218 with substantially equivalent cross-sectional areas. The housing may include a separator wall 240 separating the portion of the housing containing the flywheel 314 from the portion of the housing containing the piston 216. A cap end chamber 236 is located on one of the piston sides 218 and the rod end chamber 238 is located on the opposite piston side 218. The piston 216 may be mounted on the piston rod 224. In FIG. 14, one end of the piston rod 224 extends through the actuator end wall 230 and terminates at the rod end 214 (e.g., the first terminal 302). An opposite end of the piston rod 224 extends through the separator wall 240. The flywheel 314 is rotatably coupled to the piston rod 224 in a manner as described above.

Figure 15:
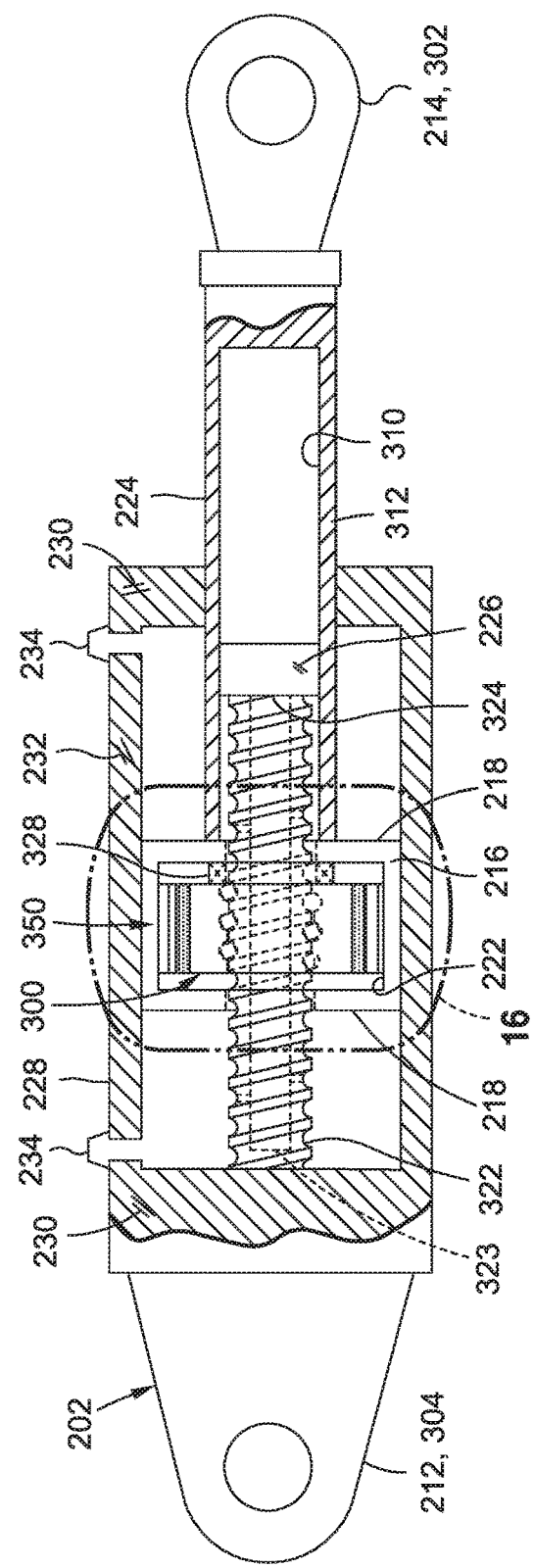
FIG. 15 is a sectional view of an example of an inerter integrated into a hydraulic actuator and wherein the flywheel is rotatably housed within the piston of the hydraulic actuator and including an electric flywheel motor and a brake for actively controlling rotation of the flywheel.

FIG. 15 is a partially cutaway sectional view of an example of an inerter 300 having an electric flywheel motor 350 integrated into a hydraulic actuator 204. The flywheel motor 350 may facilitate active control of flywheel 314 rotation using electromotive force from the integrated flywheel motor 350. Active control may include using the flywheel motor 350 to apply a torque to the flywheel 314 to resist or aid the torque that is generated by the flywheel 314 due to axial acceleration of the first terminal 302 relative to the second terminal 304. The flywheel motor 350 may be configured to provide active damping and/or active braking of the actuator 202 and the load inertia.

Figure 16:
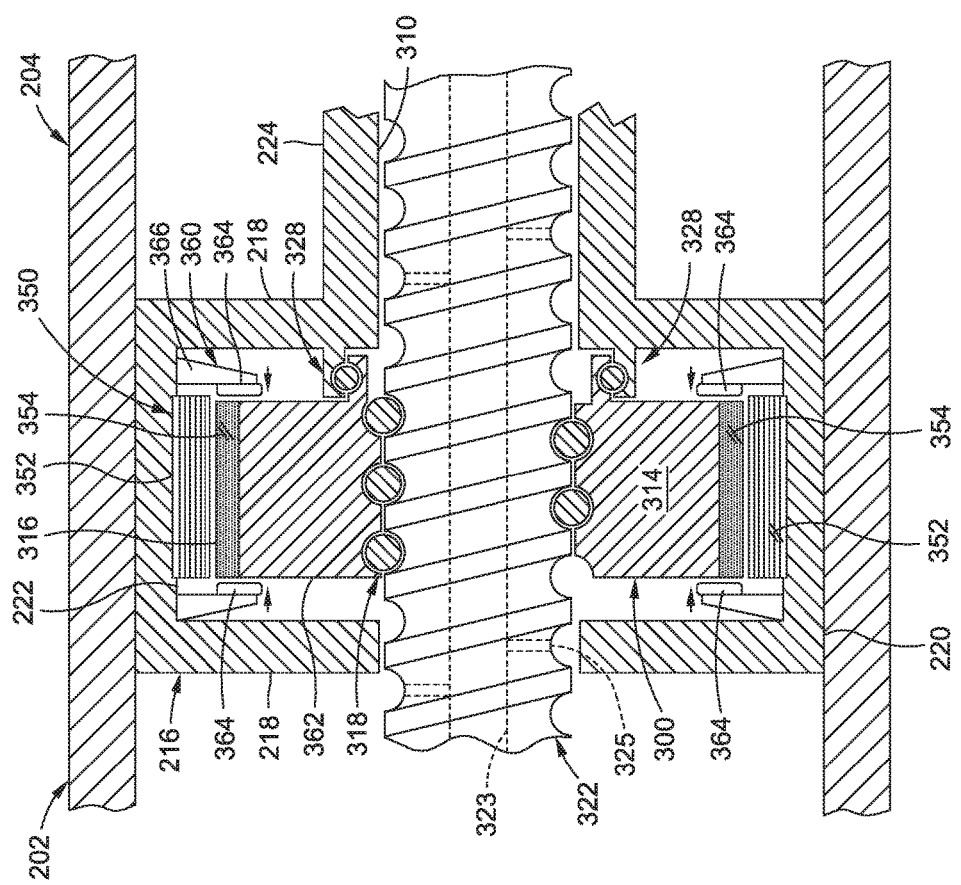
FIG. 16 is a magnified sectional view of the flywheel and piston taken along line 16 of FIG. 15 and illustrating the electric flywheel motor having permanent magnets mounted to the flywheel perimeter and windings mounted to the piston inner wall.

FIG. 16 is a magnified sectional view of FIG. 15 showing the flywheel 314 rotatably coupled to and contained within a generally hollow piston 216 which is actually slidable within the actuator housing 230. Also shown in the flywheel motor 350 incorporated into the flywheel 314 and the piston 216 and configured to actively control rotation of the flywheel 314 in correspondence with relative axial movement of the rod and threaded shaft 322. The flywheel motor 350 may be operated in a manner to accelerate and/or decelerate the flywheel 314 by applying a torque to the flywheel 314 either in correspondence with (e.g., the same direction as) or in opposition to the direction of rotation of the flywheel 314. In this manner, the flywheel motor 350 may apply a torque to the flywheel 314 to resist or aid the flywheel torque generated due to axial acceleration of the first terminal 302 relative to the second terminal 304.

In the example of FIG. 16, the flywheel motor 350 is a permanent magnet direct-current (DC) motor having one or more permanent magnets 354 mounted to the flywheel 314. For example, a plurality of permanent magnets 354 may be circumferentially spaced around the flywheel perimeter 316. In addition, the flywheel motor 350 may include a plurality of windings 352 mounted to the piston 216. In one example, a plurality of windings 352 may be circumferentially spaced around the piston inner wall 222 (e.g., FIGS. 15-16). In another example, a plurality of windings 352 may be circumferentially spaced around the side wall 232 of the housing (e.g., FIGS. 19-20) as described below. In other examples, the flywheel motor 350 may be a brushless DC motor or some other motor configuration, and is not limited to a permanent magnet DC motor configuration as shown in FIGS. 15-16 and 19-20. In an example not shown, a linear position sensor may be included with the actuator 202 to sense the linear position of the piston 216 and generate a signal representative of the linear piston position for commutating the flywheel motor 350 in correspondence with the piston position.

As mentioned above, the flywheel motor 350 in FIGS. 15-16 may be configured to assist or aid in rotating the flywheel 314 for a commanded direction of motion of the movable device 124. For example, the flywheel motor 350 may provide a torque to accelerate the flywheel 314 at the start of motion of the movable device 124 toward a commanded position. The torque applied to the flywheel 314 by the flywheel motor 350 may be approximately equal in magnitude to the torque required to rotationally accelerate the flywheel 314 due to axial acceleration of the threaded shaft 322 relative to the rod. By using the flywheel motor 350 to remove the torque required to rotationally accelerate the flywheel 314, the piston 216 may move more quickly to a commanded position than if the flywheel motor 350 did not accelerate the flywheel 314. In this manner, the flywheel motor 350 may allow faster responsiveness of a movable device 124 than a conventional actuator 202. The level of damping provided by an inerter 300 having active control of the flywheel 314 may be greater than the damping that is feasible in a closed-loop control system without active control due to the risk of control system instability. Although FIGS. 15-16 illustrate a flywheel motor 350 incorporated into an inerter 300 integrated with an actuator 202, a flywheel motor 350 may be incorporated into an inerter 300 that is a separate component from the actuator 202 (e.g., FIGS. 4-8).

In a further example of active control, the flywheel motor 350 may be operated in a manner to provide a torque to decelerate the flywheel 314 as the movable device 124 approaches a commanded position. In this regard, the flywheel motor 350 may be operated as a brake to oppose the flywheel torque generated by the axial deceleration of the threaded shaft 322 relative to the piston rod 224. Actively controlling flywheel 314 rotation in this manner may prevent or limit position overshoot of the movable device 124 and thereby increase the stability of the movable device 124. In such an arrangement, the actuator 202 and inerter 300 may be configured with a failure mode that ensures that without active motor control, the actuator 202 is capable of exhibiting a desired damped response in a manner preventing underdamping of the movable device 124. An inerter 300 having a flywheel motor 350 for active control may be connected to the movable device 124 without being part of the actuator 202 such that in the event of a disconnect of the actuator 202 from the movable device 124 or in the event of a failure of the actuator 202 to hold the load of the movable device 124, the flywheel motor 350 may be operated in a manner preventing underdamped movement of the movable device 124 for the given failure mode.

Referring still to FIG. 16, in another example of active control, the flywheel motor 350 may include a brake 360 configured to provide dynamic braking of the flywheel 314. In this regard, the brake 360 may be operated in a manner to decelerate the flywheel 314 or to increase existing deceleration of the flywheel 314. For examples that include a flywheel motor 350, the brake 360 may be operated in a manner to increase existing deceleration of the flywheel 314 caused by rotational drag of the flywheel motor 350. In addition, the flywheel motor 350 may be operated in a manner to oppose disturbances (e.g., undesirable motion) of the actuator 202.

In the example of FIG. 16, the brake 360 may be configured as a disc brake having brake pads 364. The flywheel 314 may function as a brake rotor against which the brake pads 364 may be frictionally engaged during braking. In other examples not shown, a separate brake rotor may be provided which may be directly or indirectly coupled to the flywheel 314. In the example shown, a hydraulic brake cylinder (not shown) may be included to actuate the brake pads 364 into frictional engagement with one or both of the opposing axial faces 362 (e.g., planar faces) of the flywheel 314 for decelerating the flywheel 314. Preferably, the brake 360 may include at least two pairs of opposing brake pads 364 located on diametrically opposing sides of the brake rotor. Each pair of brake pads 364 may be held in position by a bracket 366. Although the brake 360 is described and illustrated as a disc brake, the inerter 300 may incorporate any one or more different types of brakes such as a drum brake or any other type of brake capable of decelerating the flywheel 314.

Referring to FIG. 17, shown is a partially cutaway sectional view of another example of an inerter 300 integrated into a hydraulic actuator 204. The flywheel 314 is rotatably coupled or attached to the actuator end wall 230 which may be coupled to the second terminal 304. The piston 216 is fixedly coupled or attached to the piston rod 224 which extends from the piston 216 through the actuator end wall 230 and is coupled to the first terminal 302. In an alternative example not shown, the flywheel 314 may be rotatably coupled to the actuator end wall 230 which is attached to the first terminal 302, and the piston rod 224 may be coupled to the second terminal 304.

FIG. 18 is a magnified sectional view of FIG. 17 illustrating the flywheel annulus 318 rotatably coupled by a bearing 328 to the actuator end wall 230. The threaded shaft 322 is fixedly coupled to the flywheel 314 and is rotatable in unison with the flywheel 314. As mentioned above, the piston 216 is fixedly coupled to the piston rod 224 and threadably engaged to the threaded shaft 322 in a manner such that linear translation of the piston rod 224 relative to the threaded shaft 322 causes rotation of the flywheel 314 and threaded shaft 322 in unison. As indicated above, axial movement of the threaded shaft 322 relative to the piston rod 224 may be in correspondence with actuation of the movable device 124 by the actuator 202.

FIG. 19 illustrates an example of a flywheel 314 rotatably coupled to the actuator end wall 230 and incorporating a flywheel motor 350 for active control of the rotation of the flywheel 314 in a manner as described above. The flywheel motor 350 may include permanent magnets 354 mounted to the flywheel perimeter 316. For example, as described above with regard to FIG. 16, a plurality of permanent magnets 354 may be circumferentially spaced around the flywheel perimeter 316. FIG. 19 also shows a plurality of windings 352 circumferentially spaced around the actuator side wall 232 of the actuator housing 228.

FIG. 20 illustrates an example of a flywheel 314 including a brake 360 configured to provide dynamic braking of the flywheel 314. In the example shown, the brake 360 is configured as a disc brake having one or more pairs of brake pads 364 for frictionally engaging opposing axial faces 362 of the flywheel 314. The brake 360 in FIG. 20 may be configured and operated similar to the arrangement illustrated in FIG. 16 and described above.

Figure 21:
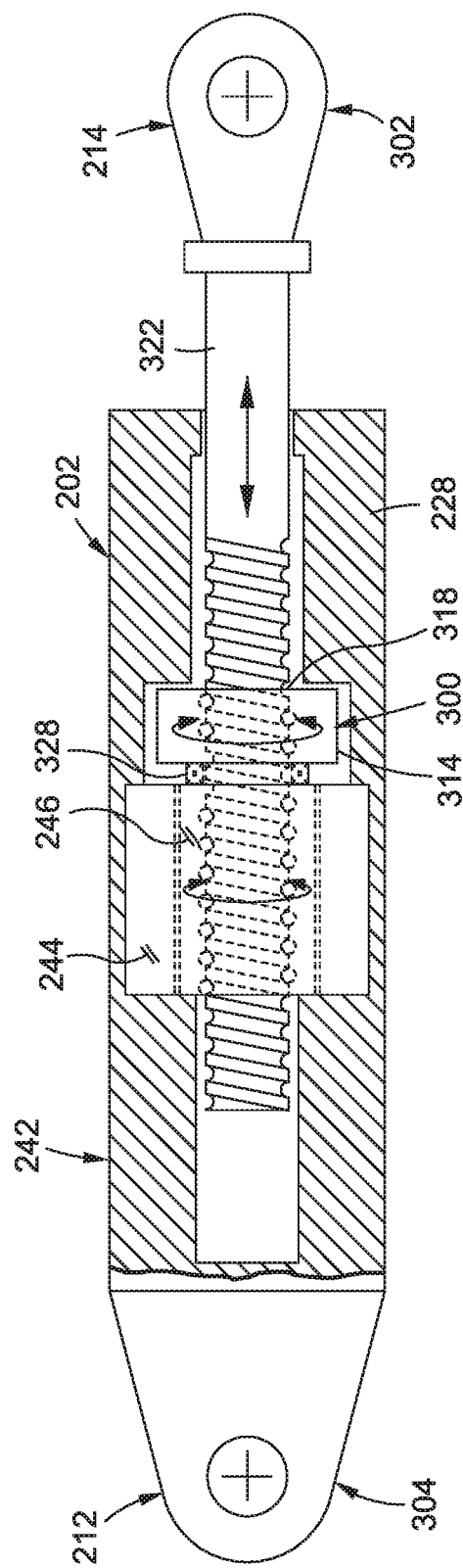
FIG. 21 is a sectional view of an example of an inerter integrated into a linear electro-mechanical actuator and illustrating the flywheel rotatably coupled to an actuator motor and threadably engaged to a threaded shaft.

FIG. 21 illustrates an example of an inerter 300 integrated into a linear electro-mechanical actuator 242. The electro-mechanical actuator 242 may extend between a support structure 116 (FIG. 2) and a movable device 124 (FIG. 2). The electro-mechanical actuator 242 may include an electric actuator motor 244 supported by the actuator housing 228. The first terminal 302 may be coupled to a movable device 124. The electro-mechanical actuator 242 may include a second terminal 304 which may be coupled to a support structure 116. Alternatively, the first terminal 302 may be coupled to the support structure 116 and the second terminal 304 may be coupled to the movable device 124.

The electro-mechanical actuator 242 may include a threaded shaft 322 (e.g., an Acme-threaded shaft, a ball screw, etc.) extending through the actuator motor 244 and terminating at the first terminal 302. The actuator motor 244 may be operably coupled to the threaded shaft 322 by a motor-shaft coupler 246 which may be threadably engaged to the threaded shaft 322. Operation of the actuator motor 244 may cause axial motion of the threaded shaft 322 for actuating the movable device 124. In this regard, the threaded shaft 322 may axially move in proportion (e.g., in magnitude and direction) to angular displacement of the actuator motor 244. A flywheel 314 may be threadably engaged to the threaded shaft 322. In addition, the flywheel annulus 318 may be rotatably coupled to the actuator motor 244 via a bearing 328 such that axial acceleration of the threaded shaft 322 causes rotational acceleration of the flywheel 314. The flywheel 314 may be configured to rotationally accelerate and decelerate in proportion to axial acceleration and deceleration of the threaded shaft 322 (e.g., relative to the actuator motor 244) during actuation of the movable device 124.

In this regard, rotation of the flywheel 314 during actuation of the electro-mechanical actuator 242 of FIG. 21 may provide any one or more of the advantages described herein for improving the dynamic response of the movable device 124 during actuation by the electro-mechanical actuator 242. For example, the flywheel 314 may reduce actuator load oscillatory amplitude at resonance of the coupled electro-mechanical actuator 242/movable device 124. In addition, although not shown in FIG. 21, a flywheel motor 350 (e.g., FIG. 16) and/or a dynamic brake 360 (FIG. 16) may optionally be included with the flywheel 314 to allow for active control of the rotation of the flywheel 314 using any one or more of the flywheel control techniques described herein.

Figure 22:
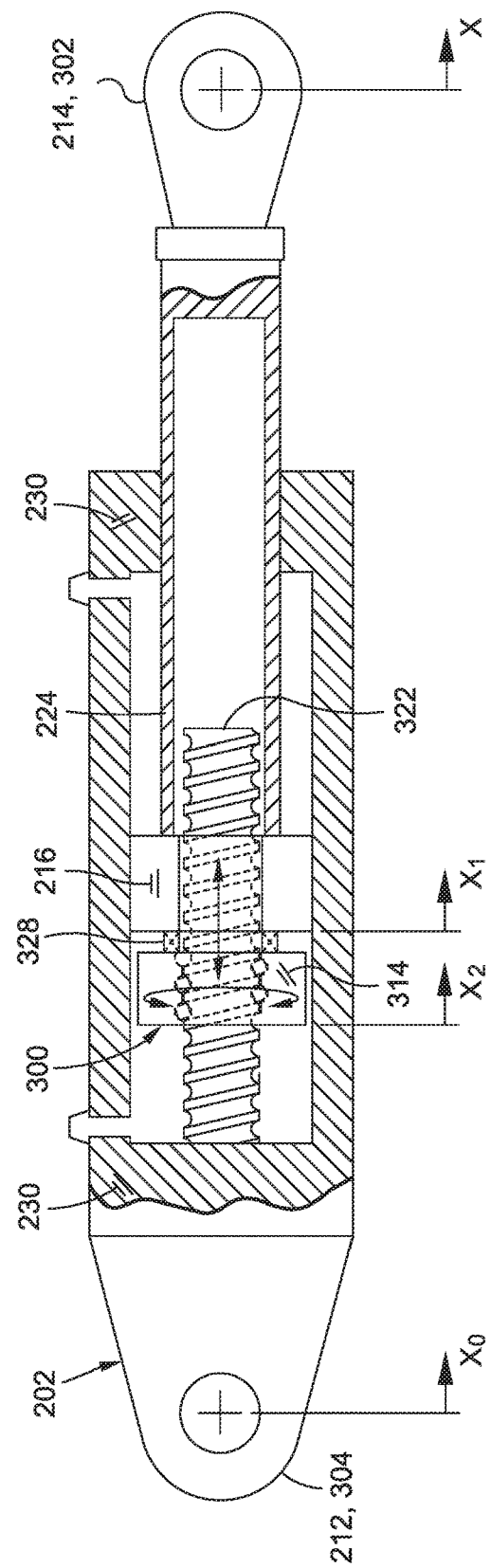
FIG. 22 is a sectional view of an example of an inerter integrated into a hydraulic actuator and illustrating the notations x, $x_0$, $x_1$, and $x_2$ respectively denoting reference points for translation of the rod end, the cap end, the piston, and the flywheel wherein the notations are used in the derivation of a transfer function characterizing the response of an actuator having an integrated inerter.

FIG. 22 is a sectional view of an example of an inerter 300 integrated into a hydraulic actuator 204 as described above and illustrated in FIG. 10. FIG. 22 includes the notations x, $x_0$, $x_1$, and $x_2$ respectively denoting reference points for translation of the rod end 214, the cap end 212, the piston 216, and the flywheel 314. The notations x, $x_0$, $x_1$, and $x_2$ are parameters that are used in a below-described derivation of a transfer function $$\frac{X(s)}{F(s)}$$

(Equation 220) mathematically characterizing the response of the apparatus of FIG. 22. Table 1 includes a listing of the parameters used in the derivation of the transfer function. Included with each listed parameter is an indication of the physical type of the parameter and a brief description of the parameter.

TABLE 1

| Parameter | Physical type | Description |
|---|---|---|
| F | force | actuator reacted force (newton) |
| $F_1$ | force | piston reacted force (newton) |
| $F_2$ | force | flywheel reacted force (newton) |
| $F_3$ | force | flywheel to piston compliance force (newton) |
| $T_2$ | torque | flywheel acceleration torque (newton-meter) |
| $\dot{x}$ | translation | actuator rod end translation reference (meter) |
| $x_1, \dot{x}_1, \ddot{x}_1$ | translation | piston translation reference (meter) |
| $x_2, \dot{x}_2, \ddot{x}_2$ | translation | flywheel translation transformed from rotation (meter) |
| $x_0, \dot{x}_0, \ddot{x}_0$ | translation | actuator cap end translation reference (meter) |
| $\theta, \dot{\theta}, \ddot{\theta}$ | rotation | flywheel rotation reference (radian) |
| J | mass moment of inertia | flywheel inertia in rotation (kilogram-meter$^2$) |
| B | damping coefficient | flywheel torque resisting $\dot{\theta}$ (newton-meter/radian/s) |
| Z | stiffness | flywheel rotational stiffness (radian/newton-meter) |
| M | mass | actuator reacted inertia at rod end (kilogram) |
| C | damping coefficient | actuator force resisting $\dot{x}$ (newton/meter/s) |
| K | stiffness | actuator stiffness (meter/newton) |
| r | thread rate | revolutions per translation (radian/meter) |
| $\omega_n$ | natural frequency | $2^{nd}$ order model characteristic (radian/second) |

TABLE 1-continued

| Parameter | Physical type | Description |
| --- | --- | --- |
| $\zeta$ | damping factor | $2^{nd}$ order model characteristic (no unit) |
| c | constant | zero offset to a common reference |

Equations 100 to 210 inclusive are the assumptions behind the derivation of the transfer function of Equation 220. Referring to the example apparatus of FIG. 22, the total reacted force F (e.g., at the rod end 214) may be computed as the sum of the piston 216 reacted force $F_1$ and the flywheel 314 reacted force $F_2$ as shown in Equation 100, wherein the sign of $F_1$ and $F_2$ are the same from a disturbance rejection sense:

$$F = F_1 + F_2 \quad \text{(Equation 100)}$$

The torque $T_2$ developed by the flywheel 314 may be determined using Equation 110 as the sum of the product of the flywheel rotational inertia J and flywheel rotational acceleration $\ddot{\theta}$ and the product of a flywheel damping coefficient B and the flywheel rotational velocity $\dot{\theta}$:

$$T_2 = J\ddot{\theta} + B\dot{\theta} \quad \text{(Equation 110)}$$

The flywheel reacted force $F_2$ may be computed using equation 120 as the product of the flywheel torque $T_2$ and the thread rate r (e.g., thread pitch) of the threaded shaft 322. The thread rate may be described as the linear distance of travel of the flywheel 314 per revolution:

$$F_2 = r(J\ddot{\theta} + B\dot{\theta}) \quad \text{(Equation 120)}$$

The rotation of the flywheel 314 may be characterized by the flywheel angular displacement or rotational angle $\theta$, rotational velocity $\dot{\theta}$, and rotational acceleration $\ddot{\theta}$, as respectively represented by Equations 130, 140, and 150. The flywheel rotational angle $\theta$ is the product of the thread rate r and the linear distance of flywheel translation $x_2$ as represented by Equation 130. The parameter c is a constant representing a linear offset relative to a common reference. The flywheel rotational velocity $\dot{\theta}$ is the product of the thread rate r and the linear velocity $\dot{x}_2$ of the flywheel 314 as represented by Equation 140. The flywheel rotational acceleration $\ddot{\theta}$ is the product of the thread rate r and the linear acceleration $\ddot{x}_2$ of the flywheel 314 as represented by Equation 150.

$$\theta + c = rx_2 \quad \text{(Equation 130)}$$

$$\dot{\theta} = r\dot{x}_2 \quad \text{(Equation 140)}$$

$$\ddot{\theta} = r\ddot{x}_2 \quad \text{(Equation 150)}$$

A flywheel 314 to piston 216 compliance force $F_3$ may be computed using Equation 160 as the product of the flywheel rotational stiffness Z and the difference between flywheel translation $x_2$ and piston translation $x_1$. For the example apparatus of FIG. 22 wherein the inerter (e.g., the flywheel 314) is integrated into the actuator 202, the flywheel 314 moves with the piston 216 such that the flywheel translation $x_2$ and the piston translation $x_1$ are the same, as indicated below in Equation 190. In this regard, the piston compliance force $F_3$ is zero (0) due to the assumption that $x_2 = x_1$ as indicated below in Equation 190.

$$F_3 = Z(x_2 - x_1) \quad \text{(Equation 160)}$$

Substituting Equations 140 and 150 for flywheel velocity $\dot{\theta}$ and flywheel acceleration $\ddot{\theta}$ into Equation 120, the flywheel reacted force $F_2$ may be expressed as follows:

$$F_2 = r^2(J\ddot{x}_2 + B\dot{x}_2) \quad \text{(Equation 170)}$$

The piston reacted force $F_1$ may be computed as the sum of the product of the actuator (e.g., the piston) reacted inertia M at the rod end 214 and the piston acceleration $\ddot{x}_1$, the product of the actuator (e.g., the piston) resisting force C and the piston velocity $\dot{x}$, and the product of the actuator stiffness K and the piston displacement $x_1$, as shown in Equation 180:

$$F_1 = M\ddot{x}_1 + C\dot{x}_1 + Kx_1 \quad \text{(Equation 180)}$$

As mentioned above, for the example shown in FIG. 22 wherein the inerter (e.g., the flywheel 314 and threaded shaft 322) is integrated into the actuator 202 such that the flywheel 314 and the piston 216 move in unison, the flywheel translation $x_2$ and the piston translation $x_1$ are the same as represented by Equation 190. In addition the rod end 214 and the piston 216 move in unison as represented by Equation 200. The cap end 212 at $x_0$ is assumed to be fixed (e.g., non-translating) as represented by Equation 210.

$$x_2 = x_1 \quad \text{(Equation 190)}$$

$$\dot{x}_1 = \dot{x} \quad \text{(Equation 200)}$$

$$\ddot{x}_0 = \dot{x}_0 = x_0 = 0 \quad \text{(Equation 210)}$$

Performing a Laplace transform on a differential equation (not shown) representing the natural frequency of the example apparatus shown in FIG. 22, the resulting transfer function $$\frac{X(s)}{F(s)}$$

is expressed as shown in Equation 220 wherein X(s) represent the response of the apparatus of FIG. 22 and F(s) represents the input to the apparatus:

$$\frac{X(s)}{F(s)} = \frac{\frac{1}{r^2 J + M}}{s^2 + \frac{r^2 B + C}{r^2 J + M} s + \frac{K}{r^2 J + M}} \quad \text{(Equation 220)}$$

The natural frequency $\omega_n$ of oscillation of the example apparatus of FIG. 22 may be expressed as shown in Equation 230 wherein K is the actuator stiffness, r is the thread rate, and J is the flywheel rotational inertia, as described above.

$$\omega_n = \left(\frac{K}{r^2 J + M}\right)^{1/2} \quad \text{(Equation 230)}$$

Equation 240 represents the damping factor $\zeta$ of the example apparatus of FIG. 22 which characterizes the decay in oscillatory response to the input (e.g., flutter of a flight control surface).

$$\zeta = \frac{r^2 B + C}{2(K(r^2 J + M))^{1/2}} \quad \text{(Equation 240)}$$

Figure 23:
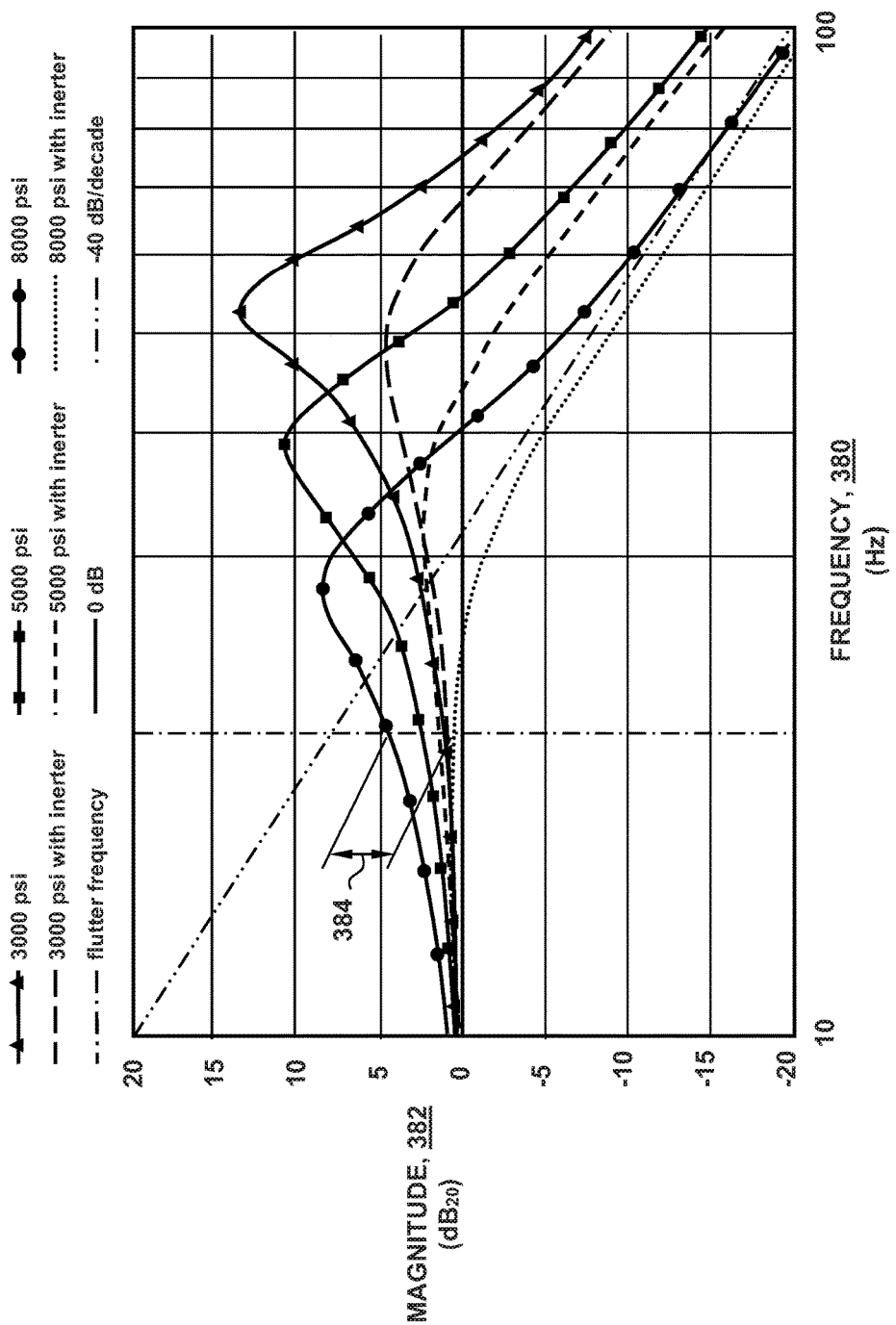
FIG. 23 is a graph plotting frequency vs. magnitude (e.g., amplitude) for an actuator operating under a working pressure of 3000 psi, 5000 psi, and 8000 psi, and illustrating a reduction in amplitude for the actuator damped by an inerter relative to the amplitude of the actuator undamped by an inerter.

FIG. 23 is a graph plotting frequency 380 vs. magnitude 382 (amplitude) of the oscillatory response to a dynamic load for an actuator 202 operating under three (3) different working pressures (3000 psi, 5000 psi, and 8000 psi). The vertical centerline represents a flutter frequency of 20 Hz corresponding to the dynamic load. The plots of FIG. 23 illustrate the reduction in response amplitude 384 provided by the actuator 202 with integrated inerter 300 of FIG. 22, relative to the response amplitude for the same actuator operating without an inerter. The reduction in response amplitude represents an optimization based on setting the response amplitude at the flutter frequency for the actuator 202 operating at 8000 psi with an inerter 300 equal to the response amplitude at the flutter frequency for the actuator 202 operating at 3000 psi without the inerter 300, and optimizing the thread pitch r of the threaded shaft 322, the flywheel rotational inertia J, and the damping factor $\zeta$ (Equation 240). For the actuator 202 operating at 8000 psi, the inerter 300 facilitates a reduction in response amplitude 384 of almost 5 dB at the flutter frequency of 20 Hz.

Figure 24:
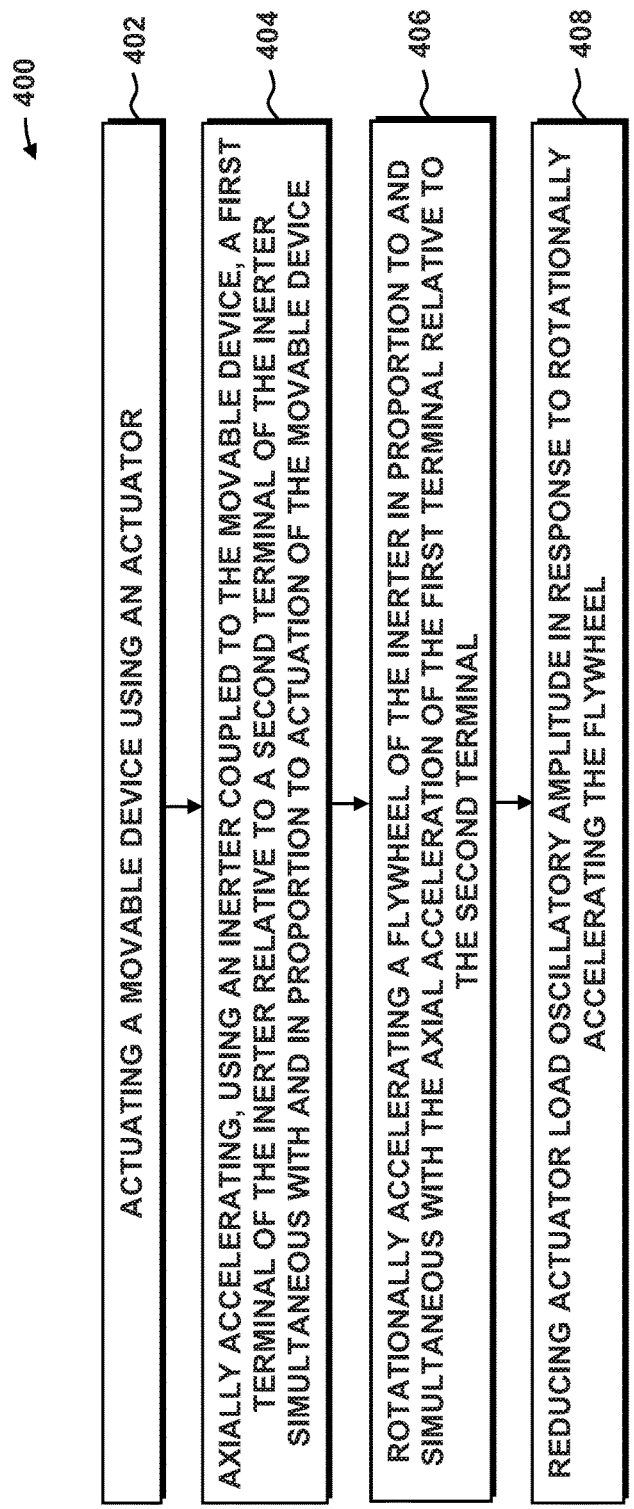
FIG. 24 is a flowchart having one or more operations that may be included in method of damping an actuator using an inerter.

FIG. 24 is a flowchart having one or more operations that may be included in a method 400 of damping an actuator 202 using an inerter 300. As mentioned above, the damping of the actuator 202 may comprise reducing actuator load oscillatory amplitude using inerter 300. As indicated above, in some examples, the inerter 300 may be a separate component from the actuator 202 and coupled to the same movable device 124 as the actuator 202 (e.g., FIGS. 1 and 4-9). In other examples, the inerter 300 may be integrated into the actuator 202 (e.g., FIGS. 2 and 10-22).

Step 402 of the method 400 includes actuating the movable device 124 using an actuator 202. In the example of a flight control system 120 of an aircraft 100, the method may include using a linear actuator such as a linear hydraulic actuator 204 or a linear electro-mechanical actuator 242. For example, FIGS. 4-6 illustrate a linear hydraulic actuator 204 configured to actuate an aileron 130 pivotably mounted to a wing 114 of an aircraft 100. However, as mentioned above, the movable device 124 may be any type of movable device that may be actuated by an actuator 202.

Step 404 of the method 400 includes axially accelerating, using an inerter 300 coupled to the movable device 124, the first terminal 302 of the inerter 300 relative to the second terminal 304 of the inerter 300. As indicated above, the inerter 300 may be coupled between the support structure 116 and the movable device 124 (e.g., FIGS. 4 and 6). For example, the first terminal 302 may be coupled to the movable device 124 and the second terminal 304 may be coupled to the support structure 116, or the first terminal 302 may be coupled to the support structure 116 and the second terminal 304 may be coupled to the movable device 124. Alternatively, the inerter 300 may be integrated into the actuator 202 (e.g., FIGS. 10-21) which may be coupled between the support structure 116 and the movable device 124. In such examples, as mentioned above, the rod end 214 or the cap end 212 of the actuator 202 functions as (e.g., is one and the same as) the first terminal 302 of the inerter 300, and the remaining rod end 214 or cap end 212 of the actuator 202 functions as (e.g., is one and the same as) the second terminal 304 of the inerter 300.

Step 406 of the method 400 includes rotationally accelerating the flywheel 314 simultaneously with the axial acceleration of the first terminal 302 relative to the second terminal 304. Because the inerter 300 and the actuator 202 are coupled to the same movable device 124 (e.g., FIGS. 1 and 4-9) or because the inerter 300 is integrated into the actuator 202 (e.g., FIGS. 2 and 10-21), the axial acceleration of the first terminal 302 relative to the second terminal 304 is simultaneous with and in proportion to the actuation of the movable device 124 by the actuator 202. In this regard, the flywheel 314 rotationally accelerates and decelerates in proportion to the axial acceleration and deceleration of the first terminal 302 relative to the second terminal 304 in correspondence with the actuation of the movable device 124 by the actuator 202.

Step 408 of the method 400 includes damping the movement of the actuator 202 in response to rotating the flywheel 314. In one example, the method may include reducing actuator load oscillatory amplitude of the movable device 124 in response to rotationally accelerating the flywheel 314. Regardless of whether the inerter 300 is a separate component from the actuator 202 or the inerter 300 is integrated into the actuator 202, the method may include rotationally accelerating the flywheel 314 in a manner reducing actuator load oscillatory amplitude at resonance of the movable device 124 coupled to the actuator 202. In one example, the method may include reducing actuator load oscillatory amplitude by at least 50% relative to the oscillatory amplitude for the movable device 124 actuated by the same actuator but without the inerter, as mentioned above. The inerter 300 may be configured to reduce actuator load oscillatory amplitude at a resonant frequency of up to approximately 20 Hz (e.g., ±5 Hz). The movable device 124 may be a flight control surface 122 (e.g., a hydraulically-actuated aileron 130) of an aircraft 100 and the resonance (e.g., the resonant frequency) may correspond to flutter of the flight control surface 122 as induced by aerodynamic forces acting on the flight control surface 122.

As mentioned above, in examples where the inerter 300 is integrated into the actuator 202, the flywheel 314 may include a plurality of flywheel protrusions 320 (e.g., flywheel blades—see FIGS. 11-12) extending outwardly from the flywheel 314. The flywheel 314 and the flywheel protrusions 320 may be immersed in hydraulic fluid contained within the cap end chamber 236. In such examples, the method may include rotating the flywheel 314 within the hydraulic fluid and generating or increasing viscous damping of the actuator 202 movement in response to rotating the flywheel 314 in correspondence with the actuation of the movable device 124. The viscous damping may contribute toward the damping provided by the rotational inertia of the flywheel 314.

In still other examples, the method may include actively controlling the rotation of the flywheel 314 in correspondence with relative axial movement of the piston rod 224 and threaded shaft 322. For example, the inerter 300 may include or incorporate an electric flywheel motor 350 as described above in the examples illustrated in FIGS. 15-16 and 19-20. In some examples, as mentioned above, the actuator 202 may include a linear position sensor (not shown) configured to sense the linear position of the piston 216 within the actuator 202 and generate a signal representative of the piston position. The method may include commutating the flywheel motor 350 in correspondence with the linear position of the piston 216 as represented by the signal generated by the position sensor.

Active control of the flywheel 314 rotation may include accelerating and/or decelerating the flywheel 314 using the flywheel motor 350. For example, the flywheel motor 350 may be operated in a manner to apply a torque to the flywheel 314 in correspondence with or in the direction of rotation of the flywheel 314. In this regard, the flywheel motor 350 may assist a commanded direction of motion of the actuator 202. In some examples, active control of flywheel rotation may include accelerating the flywheel 314 during initiation of actuation by the actuator 202 of the movable device 124 toward a commanded position. In this regard, the flywheel motor 350 may rotationally accelerate the flywheel 314 at the start of axial acceleration of the first terminal 302 relative to second terminal 304 by an amount at least partially or completely eliminating the force generated at the first terminal 302 and second terminal 304 due to actuation of the movable device 124 by the actuator 202. By using the flywheel motor 350 to rotationally accelerate the flywheel 314 at the start of axial acceleration, the force required to axially move the first terminal 302 relative to the second terminal 304 may be reduced or eliminated which may increase the speed at which the actuator 202 moves the movable device 124 toward a commanded position.

Alternatively, the flywheel motor 350 may be operated in a manner to apply a torque to the flywheel 314 in a direction opposite the rotation of the flywheel 314. In this regard, the application of motor-generated torque in a direction opposite the rotation of the flywheel 314 may resist the torque generated by the relative axial acceleration of the first terminal 302 and second terminal 304. In this regard, active control by the flywheel motor 350 may oppose the terminal-developed torque at the end of actuator 202 motion when the commanded position is reached. In this manner, the step of actively controlling rotation of the flywheel 314 may include using the flywheel motor 350 to dynamically brake or decelerate the flywheel 314 as the actuator 202 approaches a commanded position to prevent position overshoot.

In a further example, active control of flywheel 314 rotation may include using a brake 360 (e.g., FIGS. 16 and 20) to decelerate the flywheel 314 as the actuator 202 approaches a commanded position of the movable device 124 to prevent position overshoot of the commanded position. The method may additionally include dynamically braking the rotation of the flywheel 314 such as to oppose disturbances (e.g., undesirable motion) of the actuator 202. The step of dynamically braking (e.g., decelerating or reducing rotational speed) of the flywheel 314 may be performed using a brake 360 operatively engageable to the flywheel 314 (e.g., FIGS. 16 and 20) or operatively engageable to a brake rotor (not shown) that may be fixedly coupled to the flywheel 314. Alternatively or additionally, the step of dynamically braking the flywheel 314 may be performed using rotational drag generated by the flywheel motor 350 as described above.

Now referring to FIG. 25, FIG. 25 is a perspective view of an aircraft 100 having one or more dual rack and pinion rotational inerter systems 500 (see FIGS. 26-30) for damping movement 694 (see FIG. 30) of the flight control surface 122 of the aircraft 100. The aircraft 100 may include the fuselage 102 and the pair of wings 114 extending outwardly from the fuselage 102. The aircraft 100 may include a pair of propulsion units 115 (e.g., gas turbine engines). As mentioned above, each wing 114 may include one or more movable devices 124 configured as flight control surfaces 122 of the flight control system 120, where the flight control surfaces 122 may be actuated by one or more actuators 202 (see FIG. 26). The flight control surface 122 (see FIGS. 25, 26) may be hingedly coupled to a support structure 116 (see FIGS. 25, 26) that is rigid, such as the wing 114, including a wing portion support structure 117 (see FIG. 26), such as the wing spar 118 (see FIG. 26), or such as another suitable support structure.

Such flight control surfaces 122 (see FIG. 25) on the wings 114 (see FIG. 25) may include, but are not limited to, spoilers, ailerons 130 (see FIG. 25), and one or more high-lift devices, such as a leading edge slats and/or trailing edge flaps. At the aft end of the fuselage 102 (see FIG. 25), the empennage 104 (see FIG. 25) may include one or more horizontal tails 110 (see FIG. 25) and the vertical tail 106 (see FIG. 25), any one or more of which may include flight control surfaces 122 (see FIG. 25) such as the elevator 112 (see FIG. 25), the rudder 108 (see FIG. 25), or other types of movable devices 124 (see FIG. 25) that may be actuated by one or more actuators 202 (see FIG. 26).

Now referring to FIG. 26, FIG. 26 is a top view of a wing section 114a of a wing 114, taken along line 26-26 of FIG. 25, illustrating an actuator 202 and a dual rack and pinion rotational inerter system 500 operatively coupled between a flight control surface 122, in the form of an aileron 130, and a support structure 116, such as in the form of a wing spar 118 or a wing portion support structure 117. FIG. 26 shows the flight control system 120 comprising the dual rack and pinion rotational inerter system 500, and the movable device 124, such as the flight control surface 122 in the form of aileron 130. As shown in FIG. 26, the flight control surface 122 may be hingedly coupled to the support structure 116 such as in the form of wing 114, including the wing portion support structure 117, the wing spar 118, or such as another suitable support structure. The flight control surface 122 (see FIG. 26) may be pivotable or rotatable about a hinge axis 126 (see FIGS. 27-28). The flight control surface 122 preferably comprises the aileron 130, and the support structure 116 preferably comprises the wing 114, the wing portion support structure 117, the wing spar 118, or another suitable support structure.

As shown in FIG. 26, the flight control surface 122, such as the aileron 130, comprises a first end 132 and a second end 134. As further shown in FIG. 26, the dual rack and pinion rotational inerter system 500 is attached to the first end 132 of the flight control surface 122, such as the aileron 130. As further shown in FIG. 26, the dual rack and pinion rotational inerter system 500 may be fixedly attached to the support structure 116. The flight control surface 122 (see FIG. 26), such as in the form of aileron 130 (see FIG. 26), may be actuated by one or more actuators 202 (see FIG. 26) located on one or both ends of the flight control surface 122 (see FIG. 26), such as the aileron 130 (see FIG. 26). In FIG. 26, the actuator 202 and the dual rack and pinion rotational inerter system 500 are provided as separate components and may each be coupled between the support structure 116, such as the wing portion support structure 117, the wing spar 118, or another suitable support structure, and the flight control surface 122, such as the aileron 130. The dual rack and pinion rotational inerter system 500 and/or actuator 202 may be positioned anywhere along the wing spar 118 and the aileron 130 for desired and advantageous structural strength, rigidity, aircraft weight, and/or installation cost. In particular, the dual rack and pinion rotational inerter system 500 may be applied to any flight control surface that comprises a flutter critical surface.

Now referring to FIG. 27, FIG. 27 is a sectional view of the wing section 114a of the wing 114, taken along line 27-27 of FIG. 26, and illustrating an example of a dual rack and pinion rotational inerter system 500 installed between the movable device 124, such as the flight control surface 122, for example, the aileron 130, and the support structure 116, such as the wing spar 118. FIG. 27 shows a hinge axis 126 of the movable device 124, such as the flight control surface 122, for example, the aileron 130. The movable device 124, such as the flight control surface 122, for example, the aileron 130 is attached or coupled to a pivot element 127, such as in the form of a bellcrank 128. Alternatively, the pivot element 127 may comprise a horn element 136 (see FIG. 30) and a bearing element 138 (see FIG. 30), or another suitable pivot element 127. The pivot element 127 connects the movable device 124, such as the flight control surface 122, for example, the aileron 130 to a first terminal 502, such as a spherical bearing 574, of the dual rack and pinion rotational inerter system 500.

As shown in FIG. 27, the dual rack and pinion rotational inerter system 500 comprises a flexible holding structure 506 disposed between the movable device 124, such as the flight control surface 122, for example, the aileron 130, and the support structure 116 of the aircraft 100 (see FIG. 25). The flexible holding structure 506 (see FIG. 27) may comprise a clamping holding structure 506a (see FIG. 27), may comprise a thin section flexure holding structure 506b (see FIG. 29A), or may comprise another suitable flexible holding structure 506 (see FIG. 27).

As shown in FIG. 27, the dual rack and pinion rotational inerter system 500 further comprises a dual rack and pinion assembly 550 held or clamped by and between the flexible holding structure 506. The dual rack and pinion assembly 550 (see FIG. 27) comprises dual racks 552 (see FIG. 27) positioned opposite each other and substantially housed within and held or clamped by the flexible holding structure 506 (see FIG. 27). The racks 552 (see FIG. 27) comprise a first rack 552a (see FIG. 27) and a second rack 552b (see FIG. 27), each of the first rack 552a and the second rack 552b having a plurality of teeth 570 (see FIG. 27).

As shown in FIG. 27, the dual rack and pinion assembly 550 further comprises a pinion 596, such as in the form of a pinion gear 596a, engaged to and between the first rack 552a and the second rack 552b. As further shown in FIG. 27, the pinion 596, such as in the form of the pinion gear 596a, has a plurality of gear teeth 602 configured to engage the teeth 570 of the first rack 552a and the second rack 552b, and has a through opening 604. The through opening 604 (see FIGS. 27, 29A) may have a circle shaped cross section 606a (see FIG. 27), may have a square shaped cross section 606b (see FIG. 29A), or may have another suitable geometric shaped cross-section.

As used herein, "dual rack and pinion" means a type of linear actuator using a circular gear called a pinion to engage two linear gear bars called racks, where rotational motion applied to the pinion causes the racks to move relative to each other and relative to the pinion, thus translating the rotational motion of the pinion into linear motion.

As shown in FIG. 27, the dual rack and pinion rotational inerter system 500 further comprises the first terminal 502 coupled to the first rack 552a and coupled to the flight control surface 122, via the pivot element 127, and a second terminal 503 coupled to the second rack 552b, and coupled to the support structure 116. The first terminal 502 (see FIG. 27) preferably comprises a spherical bearing 574, such as in the form of a first spherical bearing 574a, and the second terminal 503 preferably comprises a spherical bearing 574, such as in the form of a second spherical bearing 574b. Each of the spherical bearings 574 comprises a rack attachment portion 580 and a spherical ball bearing portion 582 having a ball bearing 590. As shown in FIG. 27, the first rack 552a is attached to the first terminal 502, such as in the form of first spherical bearing 574a, and the second rack 552b is attached to the second terminal 503, such as in the form of a second spherical bearing 574b.

As shown in FIG. 27, the dual rack and pinion rotational inerter system 500 further comprises a pair of inertia wheels 660 comprising a first inertia wheel 660a aligned opposite to a second inertial wheel 660b. The inertia wheels 660 (see FIG. 27) are each respectively positioned adjacent to opposite exterior sides (e.g., a first side 539a (see FIG. 29C) and a second side 539b (see FIG. 29C)) of the flexible holding structure 506. As shown in FIG. 27, the dual rack and pinion rotational inerter system 500 further comprises an axle element 612 inserted continuously through the first inertial wheel 660a, through the flexible holding structure 506, through the pinion 596, and through the second inertial wheel 660b.

Rotation of the flight control surface 122 (see FIG. 27) causes translational movement 610 (see FIG. 30), via the pivot element 127 (see FIG. 27), of the first rack 552a (see FIG. 27) relative to the second rack 552b (see FIG. 27), along the longitudinal inerter axis 504 (see FIG. 27), which causes the rotational movement 611 (see FIG. 30) of the pinion 596 (see FIG. 27) and the pair of inertia wheels 660 (see FIG. 27), such that the rotational movement 611 of the pinion 596 is resisted by the pair of inertia wheels 660 and there is no incidental motion 698 (see FIG. 30). This results in the dual rack and pinion rotational inerter system 500 (see FIG. 27) damping movement 694 (see FIG. 30) of the flight control surface 122.

The motion of the pinion 596 (see FIG. 27) is resisted by the inertial wheels 660 (see FIG. 27), such that the change of orientation of the racks 552 (see FIG. 27) are only in relation to the longitudinal inerter axis 504 (see FIG. 27) by inducing a resistance force 704 (see FIG. 30) to the rotation of the first terminal 502 (see FIG. 27) connected to the flight control surface 122 (see FIGS. 27, 30) of the aircraft 100 (see FIGS. 25, 30). The resistance force 704 (see FIG. 30) is resisted by the inertial wheels 660 (see FIGS. 27, 30) with the through hole 666 (see FIG. 29A) having the square shaped cross-section 668a (see FIG. 30) and with the axle element 612 (see FIG. 27) having the central rectangular portion 618 (see FIG. 29A) having the square shaped cross-section 626 (see FIG. 29A). Damping movement 694 (see FIG. 30) of the flight control surface 122 (see FIG. 27) preferably provides increased flutter suppression 708 (see FIG. 30) of the flight control surface 122. This preferably results in an improved hydraulic application stability 710 (see FIG. 30) and an increased efficient flight control actuation 712 (see FIG. 30). The dual rack and pinion rotational inerter system 500 (see FIGS. 27, 30) of the aircraft 100 (see FIG. 30) provides a passive solution 714 (see FIG. 30), that is, the dual rack and pinion rotational inerter system 500 uses a passive means to change the dynamics of the flight control system 120 (see FIG. 30) instead of active control elements, such as one or more actuators 202 (see FIG. 30) and valve size or diameter of hydraulic actuators 204 (see FIG. 28).

Now referring to FIG. 28, FIG. 28 is a sectional view of the wing section 114a of a wing 114, taken along line 28-28 of FIG. 26, and illustrating an example of the actuator 202, such as in the form of a hydraulic actuator 204, mechanically coupled between the support structure 116, such as the wing spar 118, and the movable device 124, such as the flight control surface 122, for example, the aileron 130. FIG. 28 shows the hinge axis 126 of the movable device 124, such as the flight control surface 122, for example, the aileron 130. The movable device 124, such as the flight control surface 122, for example, the aileron 130 is attached or coupled to the pivot element 127, such as in the form of bellcrank 128. Alternatively, the pivot element 127 may comprise the horn element 136 (see FIG. 30) and the bearing element 138 (see FIG. 30), or another suitable pivot element 127. The pivot element 127 connects the movable device 124, such as the flight control surface 122, for example, the aileron 130 to a rod end 214 of the actuator 202, such as the hydraulic actuator 204.

FIG. 28 further shows an example of the actuator 202, such as in the form of a hydraulic actuator 204 that is linear, and that is mechanically coupled between the support structure 116, such as the wing spar 118, and one end of the movable device 124, such as the flight control surface 122, for example, the aileron 130. As shown in FIG. 28, the actuator 202, such as in the form of hydraulic actuator 204, includes a piston 216 coupled to a piston rod 224. The piston 216 (see FIG. 28) is slidable within an actuator housing 228 (see FIG. 7) (e.g., a cylinder). The actuator 202 (see FIG. 28), such as in the form of hydraulic actuator 204 (see FIG. 28), further includes the rod end 214 (see FIG. 28) and a cap end 212 (see FIG. 28) axially movable relative to one another in response to pressurized hydraulic fluid acting in an unbalanced manner on one or both sides of the piston 216 (see FIG. 28) inside the actuator housing 228 (see FIG. 7). In the example shown in FIG. 28, the rod end 214 of the actuator 202, such as the hydraulic actuator 204, is coupled to the bellcrank 128. The bellcrank 128 (see FIG. 28) is hingedly coupled to the flight control surface 122 (see FIG. 28), such as the aileron 130 (see FIG. 28), in a manner such that linear actuation of the hydraulic actuator 204 (see FIG. 28) causes pivoting of the flight control surface 122, such as the aileron 130, about the hinge axis 126 (see FIG. 28). Alternatively, instead of the bellcrank 128, the horn element 136 (see FIG. 30) and bearing element 138 (see FIG. 30) may be used as a connection between the rod end 214 of the actuator 202 and the flight control surface 122. The cap end 212 (see FIG. 28) of the actuator 202 (see FIG. 28), such as the hydraulic actuator 204 (see FIG. 28), is coupled to the wing spar 118 (see FIG. 28).

Figure 29A:
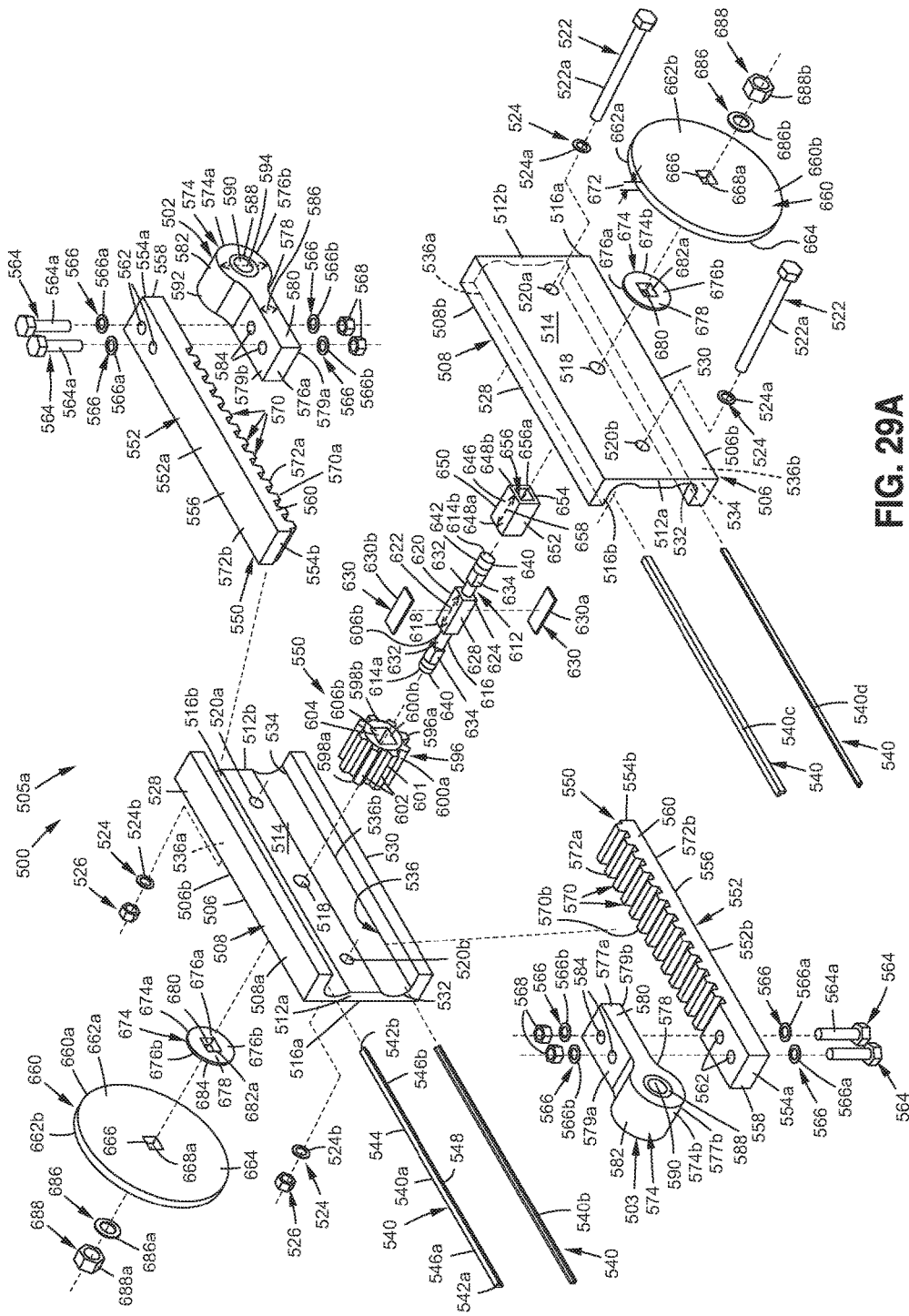
FIG. 29A is an exploded perspective view of an example of a dual rack and pinion rotational inerter system of the disclosure in a disassembled position.

Now referring to FIG. 29A, FIG. 29A is an exploded perspective view of an example of a dual rack and pinion rotational inerter system 500 of the disclosure, in a disassembled position 505a. As shown in FIG. 29A, the dual rack and pinion rotational inerter system 500 comprises a flexible holding structure 506 configured to be disposed between the movable device 124 (see FIG. 27), such as the flight control surface 122 (see FIG. 27), for example, the aileron 130 (see FIG. 27), and the support structure 116 (see FIG. 27) of the aircraft 100 (see FIG. 25). The flexible holding structure 506 (see FIG. 29A) may be in the form of a clamping holding structure 506a (see FIG. 27), a thin section flexure holding structure 506b (see FIG. 29A), or may comprise another suitable flexible holding structure 506 (see FIG. 27). The flexible holding structure 506 (see FIGS. 29A, 30) may comprise a two-piece flexible holding structure 506c (see FIG. 30) comprised of two pieces 508 (see FIG. 29A), including a first piece 508a (see FIG. 29A) configured for attachment to, and attached to upon assembly, a second piece 508b (see FIG. 29A). Preferably, the first piece 508a (see FIG. 29A) is a mirror image 509 (see FIG. 30) of the second piece 508b (see FIG. 29A). In one version, the two-piece flexible holding structure 506c (see FIG. 30) may be comprised of mirror image plates 510 (see FIG. 30). Each mirror image plate 510 (see FIG. 30) may comprise a forged plate 510a (see FIG. 30), an extruded plate 510b (see FIG. 30), or another suitable type of plate.

As shown in FIG. 29A, each of the two pieces 508, such as the first piece 508a and the second piece 508b, comprises a first end 512a, a second end 512b, and a body 514 formed therebetween. The first end 512a (see FIG. 29A) and the second end 512b (see FIG. 29A) have cut-out portions 532 shaped to accommodate racks 552 (see FIG. 29A) of the dual rack and pinion assembly 550 (see FIG. 29A). As further shown in FIG. 29A, As shown in FIG. 29A, each of the two pieces 508, such as the first piece 508a and the second piece 508b, comprises an exterior 516a, an interior 516b, a top side 528, and a bottom side 530. The interior 516b (see FIG. 29A) includes interior corners 534 (see FIG. 29A) and interior longitudinal edges 536 (see FIG. 29A) configured to receive and retain each of a plurality of rod bearings 540 (see FIG. 29A).

As shown in FIG. 29A, each of the two pieces 508, such as the first piece 508a and the second piece 508b, comprises a primary through opening 518 (see FIGS. 29A, 30) positioned centrally through the body 514 of each piece 508, and configured to receive, and receiving, the axle element 612. As shown in FIG. 29A, each of the two pieces 508, such as the first piece 508a and the second piece 508b, further comprises a first secondary through opening 520a configured to receive, and receiving, a fastener 522, such as in the form of a bolt 522a, or another suitable fastener, and a second secondary through opening 520b configured to receive, and receiving, another fastener 522, such as in the form of a bolt 522a, or another suitable fastener. Each of the fasteners 522 (see FIG. 29A), such as the bolts 522a (see FIG. 29A), may be inserted through and coupled to a washer 524 (see FIG. 29A), such as a first washer 524a (see FIG. 29A), which is preferably positioned against the exterior 516a (see FIG. 29A) of the second piece 508b (see FIG. 29A). Each of the fasteners 522 (see FIG. 29A), such as the bolts 522a (see FIG. 29A), may be further inserted through and coupled to a washer 524 (see FIG. 29A), such as a second washer 524b (see FIG. 29A), which is preferably positioned against the exterior 516a (see FIG. 29A) of the first piece 508a (see FIG. 29A), and further inserted through and coupled to a nut 526 (see FIG. 29A).

Figure 29B:
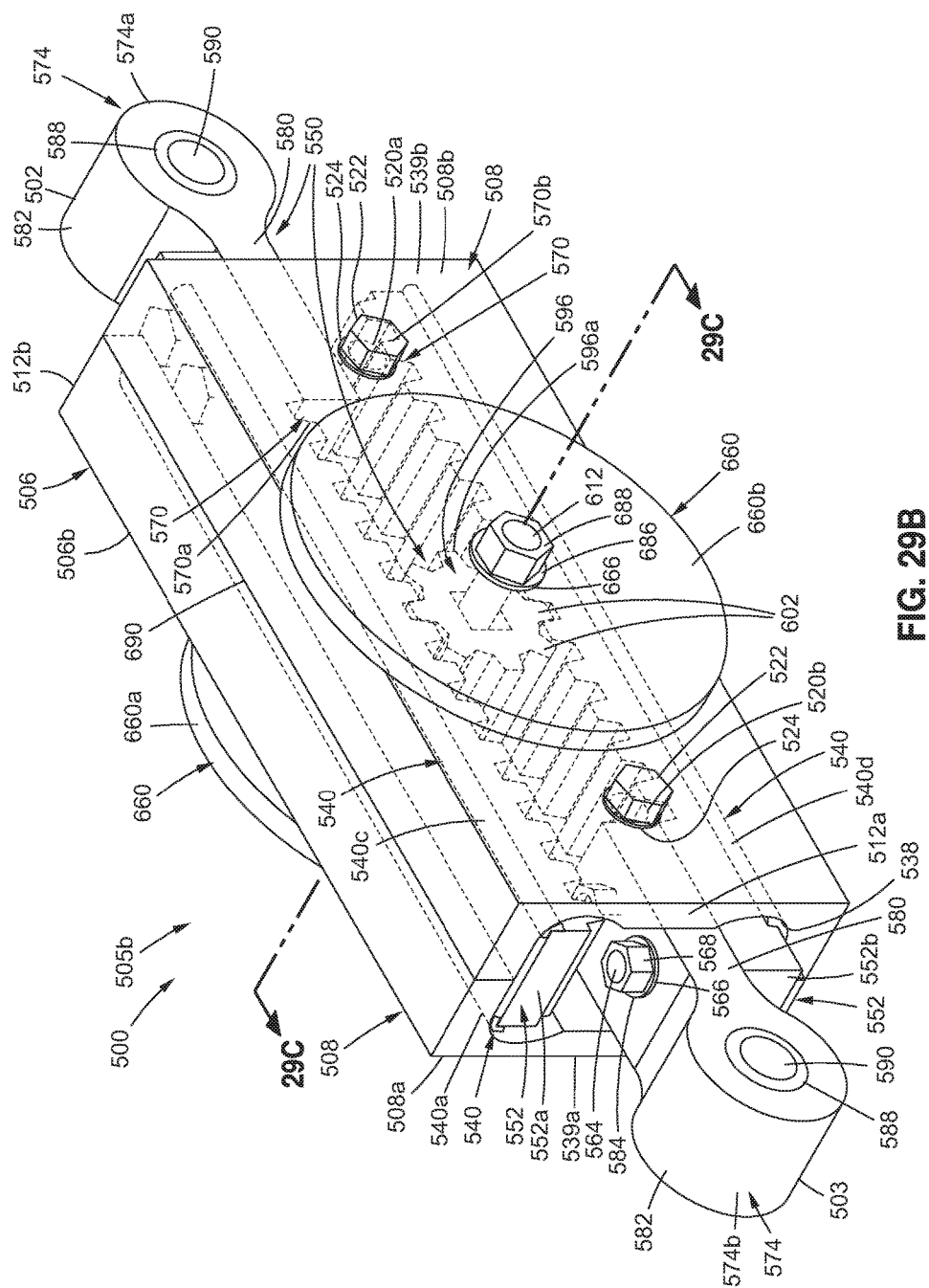
FIG. 29B is a perspective view of the dual rack and pinion rotational inerter system of FIG. 29A in an assembled position.

The flexible holding structure 506 (see FIGS. 29A-29C) further has an end through opening 538 (see FIGS. 29A-29C) formed through the first ends 512a (see FIGS. 29A-29B) and the second ends 512b (see FIGS. 29A-29B), when the two pieces 508 (see FIGS. 29A-29B) of the flexible holding structure 506 are joined together in an assembled position 505b (see FIG. 29B).

As shown in FIG. 29A, the dual rack and pinion rotational inerter system 500 further comprises a plurality of rod bearings 540 inserted into the interior corners 534 and along the interior longitudinal edges 536 of the flexible holding structure 506. As shown in FIG. 29A, a rod bearing 540, such as a first rod bearing 540a, may be installed at and along an upper interior longitudinal edge 536a of the first piece 508a of the flexible holding structure 506, and a rod bearing 540, such as a second rod bearing 540b, may be installed at and along a lower interior longitudinal edge 536b of the first piece 508a of the flexible holding structure 506.

As further shown in FIG. 29A, a rod bearing 540, such as a third rod bearing 540c, may be installed at and along an upper interior longitudinal edge 536a of the second piece 508b of the flexible holding structure 506, and a rod bearing 540, such as a fourth rod bearing 540d, may be installed at and along a lower interior longitudinal edge 536b of the second piece 508b of the flexible holding structure 506.

Each rod bearing 540 (see FIG. 29A) comprises a first end 542a (see FIG. 29A), a second end 542b (see FIG. 29A), a longitudinal body 544 (see FIG. 29A) formed between the first end 542a and the second end 542b, exterior sides 546a (see FIG. 29A), and interior sides 546b (see FIG. 29A). Each rod bearing 540 (see FIG. 29A) further comprises a linear slide track 548 (see FIG. 29A) formed along an interior side 546b (see FIG. 29A) to facilitate translation of the racks 552 (see FIG. 29A) along the rod bearings 540 (see FIG. 29A) and through the flexible holding structure 506 (see FIG. 29A).

As shown in FIG. 29A, the dual rack and pinion rotational inerter system 500 further comprises a dual rack and pinion assembly 550 held or clamped by and between the flexible holding structure 506. As further shown in FIG. 29A, the dual rack and pinion assembly 550 comprises racks 552, such as the first rack 552a and the second rack 552b, and comprises the pinion 596, such as the pinion gear 596a, engaged to and between the first rack 552a and the second rack 552b.

As shown in FIG. 29A, each of the racks 552, such as the first rack 552a and the second rack 552b, comprises a first end 554a, a second end 554b, and a longitudinal body 556 formed between the first end 554a and the second end 554b. As further shown in FIG. 29A, the longitudinal body 556 of each of the racks 552, such as the first rack 552a and the second rack 552b, comprises a spherical bearing attachment portion 558 and a linear gear portion 560, and an interior side 572a and an exterior side 572b.

The spherical bearing attachment portion 558 comprises one or more fastener holes 562 configured to receive, and receiving, one or more fasteners 564, such as in the form of bolts 564a, or another suitable fastener. Each of the fasteners 564 (see FIG. 29A), such as the bolts 564a (see FIG. 29A), may be inserted through and coupled to a washer 566 (see FIG. 29A), such as a first washer 566a (see FIG. 29A), which is preferably positioned against the exterior side 572b (see FIG. 29A) of the racks 552 (see FIG. 29A). Each of the fasteners 564 (see FIG. 29A), such as the bolts 564a (see FIG. 29A), may be further inserted through and coupled to a washer 566 (see FIG. 29A), such as a second washer 566b (see FIG. 29A), which is preferably positioned against an exterior side 579a (see FIG. 29A) of a spherical bearing 574 (see FIG. 29A), and further inserted through and coupled to a nut 568 (see FIG. 29A).

The linear gear portion 560 (see FIG. 29A) of each rack 552 comprises a plurality of teeth 570 projecting from the interior side 572a of the rack 552. As shown in FIG. 29A, the first rack 552a has a first plurality of teeth 570a, and the second rack 552b has a second plurality of teeth 570b. The first rack 552a (see FIGS. 29A-29B) is preferably positioned opposite to the second rack 552b (see FIGS. 29A-29B), with the first plurality of teeth 570a (see FIGS. 29A-29B) on the first rack 552a facing opposite the second plurality of teeth 570b (see FIGS. 29A-29B) on the second rack 552b.

As shown in FIG. 29A, the dual rack and pinion assembly 550 further comprises the pinion 596, such as in the form of the pinion gear 596a, or another suitable pinion. As shown in FIG. 29A, the pinion 596, such as the pinion gear 596a, comprises a first face 598a, a second face 598b, an exterior 600a, an interior 600b, a body 601, and a plurality of gear teeth 602 formed on and projecting from the exterior 600a of the pinion 596. As further shown in FIG. 29A, the pinion 596, such as the pinion gear 596a, has a through opening 604 having a square shaped cross-section 606b. Alternatively, the through opening 604 may have a circle shaped cross-section 606a (see FIGS. 27, 30), or another geometric shaped cross-section. The pinion 596 (see FIG. 29A), such as the pinion gear 596a (see FIG. 29A), is configured to be engaged to, and is engaged to, and positioned between, the first rack 552a (see FIG. 29A) and the second rack 552b (see FIG. 29A). As shown in FIG. 29B, preferably, the gear teeth 602 of the pinion 596 engage with the first plurality of teeth 570a on the first rack 552a and engage with the second plurality of teeth 570b on the second rack 552b. As shown in FIG. 30, the pinion 596 has a thickness 608 and a diameter 610.

As shown in FIG. 29A, the dual rack and pinion rotational inerter system 500 further comprises the first terminal 502 configured to be coupled to the first rack 552a, and comprises the second terminal 503 configured to be coupled to the second rack 552b. The first terminal 502 and the second terminal 503 preferably comprise spherical bearings 574, such as in the form of spherical ball bearing rods 575 (see FIG. 30). The first terminal 502 (see FIG. 29A) preferably comprises a spherical bearing 574 (see FIG. 29A), such as in the form of a first spherical bearing 574a (see FIG. 29A), and the second terminal 503 (see FIG. 29A) preferably comprises a spherical bearing 574, such as in the form of a second spherical bearing 574b (see FIG. 29A). As shown in FIG. 29A, the first spherical bearing 574a has a first end 576a, a second end 576b, and a body 578 formed between the first end 576a and the second end 576b. As further shown in FIG. 29A, the second spherical bearing 574b has a first end 577a, a second end 577b, and a body 578 formed between the first end 577a and the second end 577b. Each of the spherical bearings 574 (see FIG. 29A) has an exterior side 579a (see FIG. 29A), an interior side 579b (see FIG. 29A), a rack attachment portion 580 (see FIG. 29A), and a spherical ball bearing portion 582 (see FIG. 29A).

The rack attachment portion 580 (see FIG. 29A) of each spherical bearing 574 (see FIG. 29A) has one or more fastener holes 584 (see FIG. 29A) configured to receive, and receiving, the one or more fasteners 564 (see FIG. 29A), such as in the form of bolts 564a (see FIG. 29A), or another suitable fastener. Each of the fasteners 564 (see FIG. 29A), such as the bolts 564a (see FIG. 29A), may be inserted through the spherical bearing attachment portions 558 (see FIG. 29A) of the racks 552 (see FIG. 29A) and through the rack attachment portions 580 (see FIG. 29A) of the spherical bearings 574 (see FIG. 29A) to attach the respective spherical bearings 574 (see FIG. 29A) to the respective racks 552 (see FIG. 29A). As shown in FIG. 29A, each rack attachment portion 580 has thickness 586.

As further shown in FIG. 29A, each spherical ball bearing portion 582 has an interior opening 588 that preferably houses or retains one or more ball bearings 590. The spherical ball bearing portion 582 (see FIG. 29A) preferably has a spherical shape 592 (see FIG. 29A) and a diameter 594 (see FIG. 29A). Preferably, the diameter 594 of the spherical ball bearing portion 582 is greater than the thickness 586 of the rack attachment portion 580 for each spherical bearing 574.

As shown in FIG. 29A, the dual rack and pinion rotational inerter system 500 further comprises a pair of inertia wheels 660 comprising a first inertia wheel 660a and a second inertial wheel 660b. As further shown in FIG. 29A, each of the pair of inertia wheels 660 has a first interior face 662a, a second exterior face 662b, a body 664, and a through opening 666. The through opening 666 (see FIG. 29A) may have a square shaped cross-section 668a (see FIGS. 29A, 30), a circle shaped cross-section 668b (see FIG. 30), or another suitable geometric shaped cross-section. The through opening 666 (see FIG. 29A) of each inertia wheel 660 (see FIG. 29A) may have a smooth interior, or may have a spline interior 670 (see FIG. 30) that corresponds to a mating spline portion that may be formed on the axle element 612 (see FIG. 29A). As used herein, "spline" means ridges or teeth on a surface that mesh with grooves in a mating or corresponding piece and transfer torque to it, maintaining the angular correspondence between them. Each inertia wheels 660 (see FIG. 29A) has a thickness 672 (see FIG. 29A).

As shown in FIG. 29A, the dual rack and pinion rotational inerter system 500 further comprises the axle element 612. The axle element 612 (see FIG. 29A) is configured to be inserted through, and is inserted through, the first inertial wheel 660*a* (see FIG. 29A), the flexible holding structure 506 (see FIG. 29A), the pinion 596 (see FIG. 29A), and the second inertial wheel 660*b* (see FIG. 29A). The axle element 612 (see FIG. 29A) couples a rotational movement 611 (see FIG. 30) of the pair of inertia wheels 660 (see FIG. 29A) and the pinion 596 (see FIG. 29A).

As shown in FIG. 29A, the axle element 612 has a first end 614*a*, a second end 614*b*, and a body 616 formed between the first end 614*a* and the second end 614*b*. As further shown in FIG. 29A, the body 616 of the axle element 612 comprises a central rectangular portion 618, a cylindrical portion 632 attached to each end 624 of the central rectangular portion 618, a square portion 634 attached to each end 633 (see FIG. 29C) of each cylindrical portion 632, and a cylindrical threaded end portion 640 attached to each end 638 (see FIG. 29C) of each square portion 634. As shown in FIG. 29A, the central rectangular portion 618 has sides 620, for example, four sides 620, each with a side surface 628 and a length 622. The central rectangular portion 618 (see FIG. 29A) further has ends 624 (see FIG. 29A), for example, two ends 624. The central rectangular portion 618 (see FIG. 29A) preferably has a square shaped cross-section 626 (see FIGS. 29A, 30).

One or more shims 630 (see FIG. 29A), such as shim stock, may be applied to one or more side surfaces 628 (see FIG. 29A) of the central rectangular portion 618 (see FIG. 29A) prior to applying a sleeve element 646 (see FIG. 29A), discussed below. FIG. 29A shows shims 630 comprising a first shim 630*a* and a second shim 630*b* configured to be applied to side surfaces 628.

Preferably, the cylindrical portions 632 (see FIG. 29A) of the axle element 612 each have a circle shaped cross-section 631 (see FIG. 30). Preferably, the square portions 634 (see FIG. 29A) of the axle element 612 each have a square shaped cross-section 638 (see FIG. 30). Preferably, the cylindrical threaded end portions 640 (see FIG. 29A) of the axle element 612 each have a circle shaped cross-section 644 (see FIG. 30). As shown in FIG. 29A, the cylindrical threaded end portions 640 have exterior threads 642 for threaded engagement with axle cylindrical threaded end portion nuts 688, such as first axle cylindrical threaded end portion nut 688*a* and second axle cylindrical threaded end portion nut 688*b*.

The axle element 612 (see FIGS. 29A, 30) controls a clamping force 700 (see FIG. 30) of the flexible holding structure 506 (see FIGS. 29A, 30), and controls a slide friction 702 of the inertia wheels 660 (see FIGS. 29A, 30). To prevent or minimize deflection of the flexible holding structure 506, the clamping force 700 (see FIG. 30) may be applied both through the axle element 612 (see FIGS. 29A, 30) and through the one or more fasteners 522 (see FIG. 29A), such as bolts 522*a* (see FIG. 29A) inserted through the flexible holding structure 506 (see FIG. 29A).

As shown in FIG. 29A, the dual rack and pinion rotational inerter system 500 may further comprise a sleeve element 646 configured to be slipped or applied over the central rectangular portion 618 of the axle element 612. As shown in FIG. 29A, the sleeve element 646 comprises a first end 648*a*, a second end 648*b*, and a body 650 formed between the first end 648*a* and the second end 648*b*. As shown in FIG. 29A, the sleeve element 646 further comprises sides 652, for example, four sides 652, each having a length 658, and further comprises ends 654, for example, two ends 654. As further shown in FIG. 29A, the sleeve element 646 has a through opening 656, such as in the form of a square shaped through opening 656*a*. If the sleeve element 646 is used, the sleeve element 646 is preferably applied or slipped over the central rectangular portion 618 and over the shims 630, if the shims 630 are used, prior to the axle element 612 being inserted through the pinion 596. Preferably, the thickness 608 (see FIG. 30) of the pinion (see FIG. 30) is equal to, or substantially equal to, the length 658 (see FIG. 29A) of the sleeve element 646 (see FIG. 29A). If no sleeve element 646 is present, preferably the thickness 608 (see FIG. 30) of the pinion (see FIG. 30) is equal to, or substantially equal to, the length 622 (see FIG. 29A) of the central rectangular portion 618 (see FIG. 29A).

As shown in FIG. 29A, the dual rack and pinion rotational inerter system 500 may further comprise one or more axle square portion washers 674, such as a first axle square portion washer 674*a* and a second axle square portion washer 674*b* for engagement with and coupling to each square portion 634 of the axle element 612. As shown in FIG. 29A, each axle square portion washer 674 comprises an interior face 676*a*, an exterior face 676*b*, a body 678 formed between the interior face 676*a* and the exterior face 676*b*, and a through opening 680 formed through the body 678, and preferably through the center of the body 678. The through opening 680 (see FIG. 29A) may have a square shaped cross-section 682*a* (see FIG. 29A, 30), a circle shaped cross-section 682*b* (see FIG. 30), or another suitable geometric shaped cross-section. Each axle square portion washer 674 (see FIG. 29A) has a thickness 684 (see FIG. 29A).

As shown in FIG. 29A, the dual rack and pinion rotational inerter system 500 may further comprise one or more axle cylindrical threaded end portion washers 686, such as a first axle cylindrical threaded end portion washer 686*a* and a second first axle cylindrical threaded end portion washer 686*b*, configured for engagement with and coupling to each cylindrical threaded end portion 640 of the axle element 612.

As shown in FIG. 29A, the dual rack and pinion rotational inerter system 500 may further comprise one or more axle cylindrical threaded end portion nuts 688, such as a first axle cylindrical threaded end portion nut 688*a* and a second axle cylindrical threaded end portion nut 688*b*, configured for engagement with and coupling to each cylindrical threaded end portion 640 of the axle element 612.

Now referring to FIG. 29B, FIG. 29B is a perspective view of the dual rack and pinion rotational inerter system 500 of FIG. 29A in an assembled position 505*b*. As shown in FIG. 29B, the dual rack and pinion rotational inerter system 500 comprises the flexible holding structure 506, such as in the form of thin section flexure holding structure 506*b*. The flexible holding structure 506 (see FIG. 29B) comprises two pieces 508 (see FIG. 29B), including the first piece 508*a* (see FIG. 29B) attached to the second piece 508*b* (see FIG. 29B). FIG. 29B shows an attachment seam 690 where the two pieces 508 are joined together. Preferably, the first piece 508*a* (see FIG. 29B) is a mirror image 509 (see FIG. 30) of the second piece 508*b* (see FIG. 29B). FIG. 29B shows the first end 512*a*, the second end 512*b*, the first side 539*a*, the second side 539*b*, and the end through opening 538 of the flexible holding structure 506.

FIG. 29B shows the first secondary through opening 520*a* and the second secondary through opening 520*b* with the fastener 522 inserted through each of the first secondary through opening 520*a* and the second secondary through opening 520*b*. FIG. 29B further shows the plurality of rod bearings 540 installed in the interior of the flexible holding structure 506. For example, FIG. 29B shows the first rod bearing 540*a*, the third rod bearing 540*c*, and the fourth rod bearing 540*d*.

FIG. 29B shows the dual rack and pinion assembly 550 held or clamped by and between the flexible holding structure 506. As shown in FIG. 29B, the dual rack and pinion assembly 550 comprises the racks 552, such as the first rack 552*a* and the second rack 552*b*, and comprises the pinion 596, such as the pinion gear 596*a*, engaged to and between the first rack 552*a* and the second rack 552*b*. FIG. 29B shows the first plurality of teeth 570*a* of the first rack 552*a* facing opposite the second plurality of teeth 570*b* of the second rack 552*b*. FIG. 29B further shows the gear teeth 602 of the pinion 596 engaged with the first plurality of teeth 570*a* on the first rack 552*a* and engaged with the second plurality of teeth 570*b* on the second rack 552*b*.

As shown in FIG. 29B, the dual rack and pinion rotational inerter system 500 further comprises the first terminal 502 coupled to the first rack 552*a*, and comprises the second terminal 503 coupled to the second rack 552*b*. The first terminal 502 (see FIG. 29B) and the second terminal 503 (see FIG. 29B) comprise spherical bearings 574 (see FIG. 29B), such as in the form of the first spherical bearing 574*a* (see FIG. 29B) and the second spherical bearing 574*b* (see FIG. 29B). Each of the spherical bearings 574 (see FIG. 29B) has the rack attachment portion 580 (see FIG. 29B) and the spherical ball bearing portion 582 (see FIG. 29B). The rack attachment portion 580 (see FIG. 29B) of each spherical bearing 574 (see FIG. 29B) has one or more fastener holes 584 (see FIG. 29B). FIG. 29B shows the fastener 564 inserted through the fastener hole 584 and inserted through the washer 566 and the nut 568. The spherical ball bearing portion 582 (see FIG. 29B) of each spherical bearing 574 (see FIG. 29B) has an interior opening 588 with one or more ball bearings 590 (see FIG. 29B).

As shown in FIG. 29B, the dual rack and pinion rotational inerter system 500 further comprises the pair of inertia wheels 660 comprising the first inertia wheel 660*a* aligned opposite the second inertial wheel 660*b*. FIG. 29B shows the through opening 666 of the inertia wheel 660*b* with the axle element 612 inserted through the through opening 666. FIG. 29B further shows the axle element 612 inserted through the axle cylindrical threaded end portion washer 686 and the axle cylindrical threaded end portion nut 688. The axle element 612 (see FIG. 29B) is also inserted through the first inertial wheel 660*a* (see FIG. 29B), the flexible holding structure 506 (see FIG. 29B), the pinion 596 (see FIG. 29B), and the second inertial wheel 660*b* (see FIG. 29B). The axle element 612 (see FIG. 29B) couples the rotational movement 611 (see FIG. 30) of the pair of inertia wheels 660 (see FIG. 29B) and the pinion 596 (see FIG. 29B).

Figure 29C:
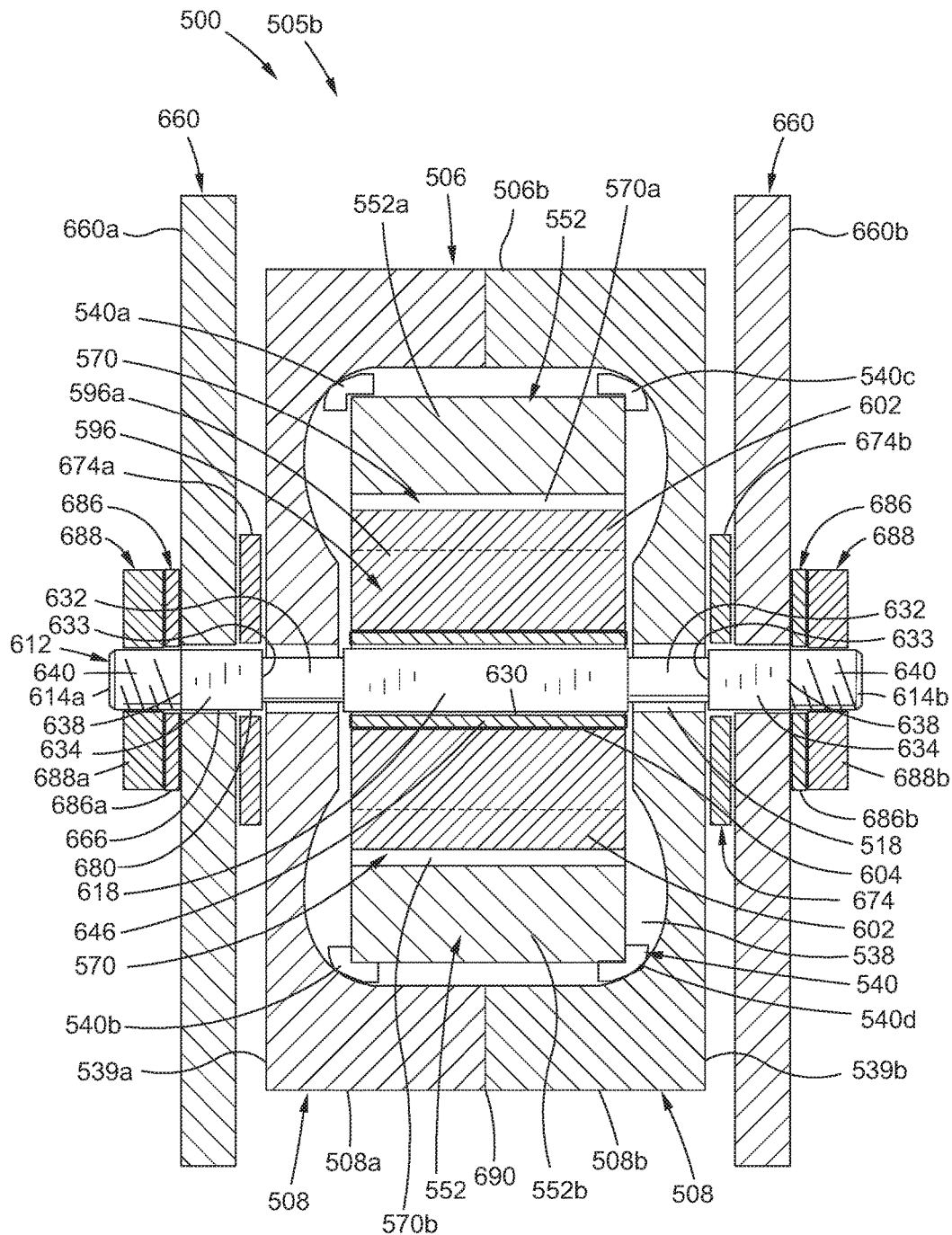
FIG. 29C is a cross-sectional view of the dual rack and pinion rotational inerter system of FIG. 29B, taken along lines 29C-29C of FIG. 29B.

Now referring to FIG. 29C, FIG. 29C is a cross-sectional view of the dual rack and pinion rotational inerter system 500 in the assembled position 505*b*, of FIG. 29B, taken along lines 29C-29C of FIG. 29B. FIG. 29C shows the dual rack and pinion rotational inerter system 500 with the flexible holding structure 506, such as in the form of thin section flexure holding structure 506*b*. FIG. 29C shows the two pieces of the flexible holding structure 506, including the first piece 508*a* attached or joined to the second piece 508*b*. FIG. 29C shows the attachment seam 690 where the two pieces 508 are joined together and shows the first side 539*a* and the second side 539*b* of the flexible holding structure 506. FIG. 29C further shows the primary through opening 518 through the first piece 508*a* and the second piece 508*b* and through which the axle element 612 is inserted through. FIG. 29C further shows the plurality of rod bearings 540, including the first rod bearing 540*a*, the second rod bearing 540*b*, the third rod bearing 540*c*, and the fourth rod bearing 540*d* installed within and at the corners of the flexible holding structure 506.

FIG. 29C shows the racks 552 of the dual rack and pinion assembly 550 (see FIG. 29B), including the first rack 552*a* and the second rack 552*b*. FIG. 29C further shows the pinion 596, such as the pinion gear 596*a*, of the dual rack and pinion assembly 550 (see FIG. 29B). The pinion 596, such as the pinion gear 596*a* has the plurality of gear teeth 602 (see FIG. 29C) engaged with and coupled between the plurality of teeth 570 (see FIG. 29C) of the first rack 552*a* and the second rack 552*b*. FIG. 29C further shows the gear teeth 602 of the pinion 596 engaged with the first plurality of teeth 570*a* on the first rack 552*a* and engaged with the second plurality of teeth 570*b* on the second rack 552*b*. FIG. 29C further shows the through opening 604 of the pinion 596 through which the axle element 612 is inserted through and through which the central rectangular portion 618 of the axle element 612 aligns with the through opening 604 of the pinion 596. FIG. 29C shows the shim 630 positioned between the central rectangular portion 618 of the axle element 612 and the sleeve element 646. FIG. 29C further shows the sleeve element 646 between the shim 630 and the pinion 596.

FIG. 29C further shows the pair of inertia wheels 660 comprising the first inertia wheel 660*a* aligned opposite the second inertial wheel 660*b*. The inertia wheels 660 (see FIG. 27) are each respectively positioned adjacent to opposite exterior sides, such as the first side 539*a* and the second side 539*b* of the flexible holding structure 506. FIG. 29C further shows the through opening 666 of the inertia wheels 660 with the axle element 612 inserted through the through opening 666. FIG. 29C further shows the axle element 612 inserted through the axle cylindrical threaded end portion nut 688, including the first axle cylindrical threaded end portion nut 688*a* and the second axle cylindrical threaded end portion nut 688*b*. FIG. 29C further shows the axle element 612 inserted through the axle cylindrical threaded end portion washer 686, including the first axle cylindrical threaded end portion washer 686*a* and the second axle cylindrical threaded end portion washer 686*b*. FIG. 29C further shows the axle element 612 inserted through the through opening 680 of the axle square portion washer 674, including the first axle square portion washer 674*a* and the second axle square portion washer 674*b*.

FIG. 29C shows the axle element 612 having the first end 614*a* and the second end 614*b* and comprising the central rectangular portion 618, the cylindrical portion 632 attached to each end 624 (see FIG. 29A) of the central rectangular portion 618, the square portion 634 attached to each end 633 of each cylindrical portion 632, and the cylindrical threaded end portion 640 attached to each end 638 of each square portion 634. As shown in FIG. 29C, the axle element 612 is also inserted continuously through the first inertial wheel 660*a*, through the flexible holding structure 506, through the pinion 596, and through the second inertial wheel 660*b*. The axle element 612 (see FIG. 29C) controls a clamping force 700 (see FIG. 30) of the flexible holding structure 506 (see FIG. 29C), and controls a slide friction 702 of the inertia wheels 660 (see FIG. 29C). the flexible holding structure 506 (see FIG. 29A). The axle element 612 (see FIG. 29C) further couples the rotational movement 611 (see FIG. 30) of the pair of inertia wheels 660 (see FIG. 29C) and the pinion 596 (see FIG. 29C).

Now referring to FIG. 30, FIG. 30 is a block diagram of a flight control system 120 of an aircraft 100, including one or more actuators 202 configured to actuate, or actuating, a movable device 124, such as a flight control surface 122, for example, an aileron 130, about a hinge axis 126, and further including at least one dual rack and pinion rotational inerter system 500 for damping movement 694 of the movable device 124, such as the flight control surface 122, for example, the aileron 130.

The aircraft 100 (see FIG. 30) comprises the flight control surface 122 (see FIG. 30) pivotably coupled to a support structure 116 (see FIG. 30). As shown in FIG. 30, the support structure 116 may comprise a wing 114, a wing portion support structure 117, a wing spar 118, or another suitable support structure 116. As further shown in FIG. 30, the actuator 202 comprises the cap end 212, the piston 216, the piston rod, 224, and the rod end 214. As shown in FIG. 30, the movable device 124, such as the flight control surface 122, for example, the aileron 130, may be coupled to a pivot element 127. The pivot element 127 (see FIG. 30) may comprise a bellcrank 128 (see FIG. 30), may comprise a horn element 136 (see FIG. 30) and a bearing element 138 (see FIG. 30), or may comprise another suitable pivot element 127.

As shown in FIG. 30, the aircraft 100 further comprises at least one dual rack and pinion rotational inerter system 500 for damping movement 694 of the flight control surface 122. The dual rack and pinion rotational inerter system 500 (see FIG. 30), as discussed in detail above, comprises a flexible holding structure 506 (see FIG. 30) disposed between the flight control surface 122 (see FIG. 30) and the support structure 116 (see FIG. 30) of the aircraft 100 (see FIG. 30). As shown in FIG. 30, the flexible holding structure 506 may be in the form of a clamping holding structure 506a (see also FIG. 27), a thin section flexure holding structure 506b (see also FIG. 29A), or another suitable flexible holding structure 506. The flexible holding structure 506 (see FIG. 30) may comprise a two-piece flexible holding structure 506c (see FIG. 30) comprised of two pieces 508 (see FIGS. 29A, 30), including a first piece 508a (see FIGS. 29A, 30) attached to a second piece 508b (see FIGS. 29A, 30), when the flexible holding structure 506 (see FIG. 30) is assembled, where the first piece 508a is a mirror image 509 (see FIG. 30) of the second piece 508b. In one version, the two-piece flexible holding structure 506c (see FIG. 30) may be comprised of mirror image plates 510 (see FIG. 30). Each mirror image plate 510 (see FIG. 30) may comprise a forged plate 510a (see FIG. 30), an extruded plate 510b (see FIG. 30), or another suitable type of plate.

Each of the first side 539a (see FIG. 29C) and the second side 539b (see FIG. 29C) of the flexible holding structure 506 preferably comprises a primary through opening 518 (see FIGS. 29A, 30) configured to receive, and receiving, the axle element 612. Each of the first side 539a (see FIG. 29C) and the second side 539b (see FIG. 29C) of the flexible holding structure 506 preferably further comprises a first secondary through opening 520a (see FIG. 29A) configured to receive, and receiving, a fastener 522 (see FIG. 29A), such as in the form of a bolt 522a (see FIG. 29A), or another suitable fastener. Each of the first side 539a (see FIG. 29C) and the second side 539b (see FIG. 29C) of the flexible holding structure 506 preferably further comprises a second secondary through opening 520b (see FIG. 29A) configured to receive, and receiving, a fastener 522 (see FIG. 29A), such as in the form of a bolt 522a (see FIG. 29A), or another suitable fastener. The flexible holding structure 506 (see FIGS. 29A, 30) further has an end through opening 538 (see FIGS. 29B, 29C, 30) formed through the first end 512a (see FIG. 29B) and the second end 512b (see FIG. 29B), when the flexible holding structure 506 is assembled.

The dual rack and pinion rotational inerter system 500 (see FIGS. 29A, 30) preferably further comprises the plurality of rod bearings 540 (see FIGS. 29A, 30) configured to be inserted into, and inserted along, interior corners 534 (see FIG. 29A) of the flexible holding structure 506 (see FIGS. 29A, 30). The rod bearings 540 (see FIGS. 29A, 30) aid in preventing or minimizing flexing of the two pieces 508 (see FIG. 30) of the flexible holding structure 506 (see FIG. 30) when load is applied to the flexible holding structure 506, and aid in further drawing the racks 552 (see FIG. 30) up against the pinion 596 (see FIG. 30) of the dual rack and pinion assembly 550 (see FIG. 30).

As shown in FIG. 30, the dual rack and pinion rotational inerter system 500 further comprises the dual rack and pinion assembly 550, discussed in detail above, which is clamped or held, by and between, the flexible holding structure 506. The dual rack and pinion assembly 550 (see FIG. 30) comprises the plurality of racks 552 (see FIG. 30), such as in the form of the first rack 552a (see FIG. 30) and the second rack 552b (see FIG. 30). As shown in FIG. 29A, the first rack 552a is preferably positioned opposite to the second rack 552b, with the first plurality of teeth 570a on the first rack 552a facing opposite the second plurality of teeth 570b on the second rack 552b. Each rack 552 (see FIG. 30) of the dual rack and pinion assembly 550 (see FIG. 30) preferably comprises the spherical bearing attachment portion 558 (see FIG. 30) and the linear gear portion 560 (see FIG. 30) having the plurality of teeth 570 (see FIG. 30).

The dual rack and pinion assembly 550 (see FIG. 30) further comprises the pinion 596 (see FIG. 30), such as in the form of the pinion gear 596a (see FIG. 30), having a plurality of gear teeth 602 (see FIG. 30) formed on the exterior 600a (see FIG. 29A) of the pinion 596. The pinion 596 (see FIG. 30), such as the pinion gear 596a (see FIG. 30), is configured to be engaged to, and is engaged to, and positioned between, the first rack 552a (see FIG. 30) and the second rack 552b (see FIG. 30). As shown in FIG. 29B, preferably, the gear teeth 602 of the pinion 596 engage with the first plurality of teeth 570a on the first rack 552a facing opposite the second plurality of teeth 570b on the second rack 552b. As shown in FIG. 30, the pinion 596 has a thickness 608 and a diameter 610. Preferably, the thickness 608 (see FIG. 30) of the pinion (see FIG. 30) is equal to, or substantially equal to, the length 658 (see FIG. 29A) of the sleeve element 646 (see FIG. 29A). If no sleeve element 646 is present, preferably the thickness 608 (see FIG. 30) of the pinion (see FIG. 30) is equal to, or substantially equal to, the length 622 (see FIG. 29A) of the central rectangular portion 618 (see FIG. 29A).

The dual rack and pinion rotational inerter system 500 (see FIG. 30) further comprises a first terminal 502 (see FIGS. 27, 29B) and a second terminal 503 (see FIGS. 27, 29B). The first terminal 502 and the second terminal 503 preferably comprise spherical bearings 574 (see FIG. 30), such as in the form of spherical ball bearing rods 575 (see FIG. 30). The first terminal 502 (see FIGS. 27, 29B) preferably comprises the first spherical bearing 574a (see FIGS. 27, 29B) having a first end 576a (see FIG. 29A)

coupled to the first rack 552*a* (see FIGS. 27, 29B, 30) and having a second end 576*b* (see FIG. 29A) coupled to the flight control surface 122 (see FIGS. 27, 30), via the pivot element 127 (see FIGS. 27, 30). The second terminal 503 (see FIGS. 27, 29B) preferably comprises the second spherical bearing 574*b* (see FIGS. 27, 29B) having a first end 577*a* (see FIG. 29A) coupled to the second rack 552*b* (see FIGS. 27, 29B, 30) and having a second end 577*b* (see FIG. 29A) coupled to the support structure 116 (see FIGS. 27, 30).

As shown in FIG. 30, the dual rack and pinion rotational inerter system 500 further comprises a pair of inertia wheels 660. The pair of inertia wheels 660 (see FIG. 30) preferably comprise the first inertia wheel 660*a* (see FIGS. 27, 29B) adjacent to the first side 539*a* (see FIG. 29B) of the flexible holding structure 506 (see FIG. 29B), and preferably comprises the second inertial wheel 660*b* (see FIGS. 27, 29B) adjacent to the second side 539*b* (see FIG. 29B) of the flexible holding structure 506 (see FIG. 29B). The pair of inertia wheels 660 (see FIGS. 29A, 30) each has the through opening 666 (see FIG. 29A) having one of a square shaped cross-section 668*a* (see FIGS. 29A, 30), a circle shaped cross-section 668*b* (see FIG. 30), or another suitable shape cross-section. The through opening 666 of each inertia wheel 660 may have a smooth interior or may have a spline interior 670 (see FIG. 30).

As shown in FIG. 30, the dual rack and pinion rotational inerter system 500 further comprises the axle element 612. The axle element 612 (see FIGS. 29C, 30) is configured to be inserted through, and is inserted through, the first inertial wheel 660*a* (see FIG. 29C), the flexible holding structure 506 (see FIG. 29C), the pinion 596 (see FIG. 29C), and the second inertial wheel 660*b* (see FIG. 29C). The axle element 612 (see FIG. 30) couples a rotational movement 611 (see FIG. 30) of the pair of inertia wheels 660 (see FIG. 30) and the pinion 596 (see FIG. 30). The axle element 612 (see FIGS. 29A, 30) comprises the central rectangular portion 618 (see FIGS. 29A, 30), the cylindrical portions 632 (see FIG. 29A), the square portions 634 (see FIG. 29A), and the cylindrical threaded end portions 640 (see FIG. 29A). Preferably, the central rectangular portion 618 (see FIGS. 29A, 30) has a square shaped cross-section 626 (see FIG. 30). Preferably, the cylindrical portions 632 (see FIG. 29A) each have a circle shaped cross-section 631 (see FIG. 30). Preferably, the square portions 634 (see FIG. 29A) each have a square shaped cross-section 638 (see FIG. 30). Preferably, the cylindrical threaded end portions 640 (see FIG. 29A) each have a circle shaped cross-section 644 (see FIG. 30). The axle element 612 (see FIG. 30) controls a clamping force 700 (see FIG. 30) of the flexible holding structure 506 (see FIG. 30), and controls a slide friction 702 (see FIG. 30) of the inertia wheels 660 (see FIG. 30). To prevent or minimize deflection of the flexible holding structure 506, the clamping force 700 (see FIG. 30) may be applied both through the axle element 612 (see FIG. 30) and through one or more fasteners 522 (see FIG. 29A), such as bolts 522*a* (see FIG. 29A) inserted through the flexible holding structure 506 (see FIG. 29A).

As shown in FIG. 30, the dual rack and pinion rotational inerter system 500 may further comprises a sleeve element 646 configured to surround, and surrounding, the central rectangular portion 618 of the axle element 612. Preferably, the sleeve element 646 (see FIGS. 29A, 30) has a length 658 (see FIGS. 29A, 30) that is slightly greater than the length 622 (see FIGS. 29A, 30) of the central rectangular portion 618, as the sleeve element 646 is designed to cover the central rectangular portion 618. Alternatively, the dual rack and pinion rotational inerter system 500 does not include the sleeve element 646, and the central rectangular portion 618 is not covered by the sleeve element 646. One or more shims 630 (see FIG. 29A) may be applied to one or more side surfaces 628 (see FIG. 29A) of the central rectangular portion 618 prior to covering the central rectangular portion 618 with the sleeve element 646.

Rotation of the flight control surface 122 (see FIG. 30) causes translational movement 610 (see FIG. 30), via the pivot element 127 (see FIG. 30), of the first rack 552*a* (see FIG. 30) relative to the second rack 552*b* (see FIG. 30), along the longitudinal inerter axis 504 (see FIG. 27), which causes the rotational movement 611 (see FIG. 30) of the pinion 596 (see FIG. 30) and the pair of inertia wheels 660 (see FIG. 30), such that the rotational movement 611 of the pinion 596 is resisted by the pair of inertia wheels 660 and there is no incidental motion 698 (see FIG. 30). This results in the dual rack and pinion rotational inerter system 500 (see FIG. 30) damping movement 694 (see FIG. 30) of the flight control surface 122.

The motion of the pinion 596 (see FIG. 30) is resisted by the inertial wheels 660 (see FIG. 30), such that the change of orientation of the racks 552 (see FIG. 30) are only in relation to the longitudinal inerter axis 504 (see FIG. 27) with the assembly by inducing a resistance force 704 (see FIG. 30) to the rotation of the first terminal 502 (see FIG. 27) connected to the flight control surface 122 (see FIGS. 27, 30) of the aircraft 100 (see FIG. 30). The resistance force 704 (see FIG. 30) is resisted by the inertial wheels 660 (see FIG. 30) with the through hole 666 (see FIG. 29A) having the square shaped cross-section 668*a* (see FIG. 30) and with the axle element 612 (see FIG. 30) having the central rectangular portion 618 (see FIG. 30) having the square shaped cross-section 626 (see FIG. 30).

Damping movement 694 (see FIG. 30) of the flight control surface 122 (see FIG. 30) preferably provides increased flutter suppression 708 (see FIG. 30) of the flight control surface 122. This preferably results in an improved hydraulic application stability 710 (see FIG. 30) and an increased efficient flight control actuation 712 (see FIG. 30). The dual rack and pinion rotational inerter system 500 (see FIG. 30) of the aircraft 100 (see FIG. 30) provides a passive solution 714 (see FIG. 30), that is, the dual rack and pinion rotational inerter system 500 uses a passive means to change the dynamics of the flight control system 120 (see FIG. 30) instead of active control elements, such as one or more actuators 202 (see FIG. 30) and valve size or diameter of hydraulic actuators 204 (see FIG. 28). The dual rack and pinion rotational inerter system 500 (see FIG. 30) further provides a reduced backlash 696 (see FIG. 30) and an increased reliability 706 (see FIG. 30).

Figure 31:
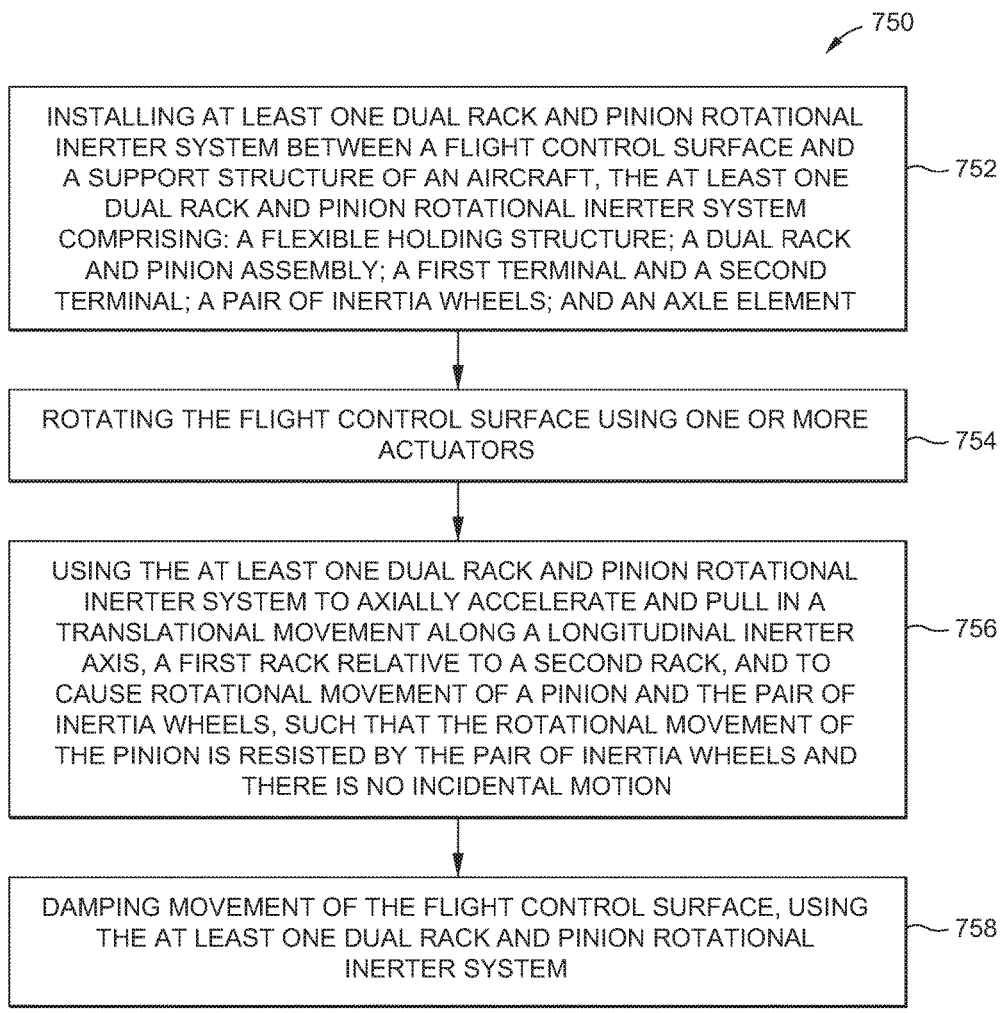
FIG. 31 is a flowchart having one or more operations that may be included in a method for damping movement of a flight control surface of an aircraft.

Now referring to FIG. 31, FIG. 31 is a flowchart having one or more operations that may be included in a method 750 for damping movement 694 (see FIG. 30) of a flight control surface 122 (see FIG. 30) of an aircraft 100 (see FIGS. 25, 30). As shown in FIG. 31, the method 750 comprises step 752 of installing at least one dual rack and pinion rotational inerter system 500 (see FIGS. 27, 29A) between the flight control surface 122 (see FIG. 27) and the support structure 116 (see FIG. 27).

As discussed in detail above, the dual rack and pinion rotational inerter system 500 (see FIGS. 27, 29A, 30) comprises a flexible holding structure 506 (see FIGS. 27, 29A) having a plurality of rod bearings 540 (see FIG. 29A) inserted into interior corners 534 (see FIG. 29A) of the flexible holding structure 506. The step 752 (see FIG. 31) of installing further comprises installing the at least one dual rack and pinion rotational inerter system 500 (see FIGS. 27, 29A, 30), where the flexible holding structure 506 (see FIGS. 27, 29A) comprises a two-piece flexible holding structure 506c (see FIG. 30) comprised of mirror image plates 510 (see FIG. 30), each mirror image plate 510 comprising one of, a forged plate 510a (see FIG. 30), an extruded plate 510b (see FIG. 30), or another suitable type of plate. The flexible holding structure 506 (see FIG. 30) may further comprises a clamping holding structure 506a (see FIG. 30), a thin section flexure holding structure 506b (see FIG. 30), or another suitable flexible holding structure 506.

The dual rack and pinion rotational inerter system 500 (see FIGS. 27, 29A, 30) further comprises a dual rack and pinion assembly 550 (see FIGS. 27, 29A) clamped or held by and between the flexible holding structure 506 (see FIGS. 27, 29A). The dual rack and pinion assembly 550 (see FIGS. 27, 29A) comprises a first rack 552a (see FIGS. 27, 29A), a second rack 552b (see FIGS. 27, 29A) opposite to and facing the first rack 552a, and a pinion 596 (see FIGS. 27, 29A) engaged to and between the first rack 552a and the second rack 552b. The step 752 (see FIG. 31) of installing further comprises installing the at least one dual rack and pinion rotational inerter system 500 (see FIGS. 27, 29A, 30), where the first rack 552a (see FIG. 29A) has a first plurality of teeth 570a (see FIG. 29A), the second rack 552b (see FIG. 29A) has a second plurality of teeth 570b (see FIG. 29A), and the pinion 596 (see FIG. 29A) has a plurality of gear teeth 602 (see FIG. 29A), such that the plurality of gear teeth 602 engage to and between the first plurality of teeth 570a and the second plurality of teeth 570b.

The dual rack and pinion rotational inerter system 500 (see FIGS. 27, 29A, 30) further comprises a first terminal 502 (see FIG. 27) coupled to the first rack 552a (see FIG. 27) and coupled to the flight control surface 122 (see FIG. 27), via a pivot element 127 (see FIG. 27). The dual rack and pinion rotational inerter system 500 (see FIGS. 27, 29A, 30) further comprises a second terminal 503 (see FIG. 27) coupled to the second rack 552b (see FIG. 27), and coupled to the support structure 116 (see FIG. 27). The step 752 (see FIG. 31) of installing further comprises installing the at least one dual rack and pinion rotational inerter system 500 (see FIGS. 27, 29A, 30), where the first terminal 502 (see FIG. 27) comprises a first spherical bearing 574a (see FIGS. 27, 29A) having a first end 576a (see FIG. 29A) coupled to the first rack 552a (see FIGS. 27, 29A), and having a second end 576b (see FIG. 29A) coupled to the flight control surface 122 (see FIG. 27), via the pivot element 127 (see FIG. 27, and where the second terminal 503 (see FIG. 27) comprises a second spherical bearing 574b (see FIG. 27) having a first end 577a (see FIG. 29A) coupled to the second rack 552b (see Figured 27, 29A), and having a second end 577b (see FIG. 29A) coupled to the support structure 116 (see FIG. 27).

The dual rack and pinion rotational inerter system 500 (see FIGS. 27, 29A, 30) further comprises a pair of inertia wheels 660 (see FIGS. 27, 29A) comprising a first inertia wheel 660a (see FIGS. 27, 29A) adjacent to a first side 539a (see FIG. 29A) of the flexible holding structure 506 (see FIGS. 27, 29A), and a second inertial wheel 660b (see FIGS. 27, 29A) adjacent to a second side 539b (see FIG. 29A) of the flexible holding structure 506.

The dual rack and pinion rotational inerter system 500 (see FIGS. 27, 29A, 30) further comprises an axle element 612 (see FIGS. 29A, 29C) inserted through the first inertial wheel 660a (see FIGS. 29A, 29C), the flexible holding structure 506 (see FIGS. 29A, 29C), the pinion 596 (see FIGS. 29A, 29C), and the second inertial wheel 660b (see FIGS. 29A, 29C). The axle element 612 (see FIGS. 29A, 29C) couples a rotational movement 611 (see FIG. 30) of the pair of inertia wheels 660 (see FIGS. 29A, 29C) and the pinion 596 (see FIGS. 29A, 29C). The step 752 (see FIG. 31) of installing further comprises installing the at least one dual rack and pinion rotational inerter system 500 (see FIGS. 27, 29A, 30), further comprising a sleeve element 646 (see FIG. 29A) surrounding a central rectangular portion 618 (see FIG. 29A) of the axle element 612 (see FIG. 29A).

As shown in FIG. 31, the method 750 further comprises step 754 of rotating the flight control surface 122 (see FIGS. 27, 30) using one or more actuators 202 (see FIGS. 27, 30). The flight control surface 122 (see FIGS. 27, 30) may comprise an aileron 130 (see FIGS. 27, 30) or another suitable flight control surface 122.

As shown in FIG. 31, the method 750 further comprises step 756 of using the at least one dual rack and pinion rotational inerter 500 (see FIGS. 27, 29A, 30) to axially accelerate and pull in a translational movement 610 (see FIG. 30) along a longitudinal inerter axis 504 (see FIG. 27), the first rack 552a (see FIGS. 27, 29A, 30) relative to the second rack 552b (see FIGS. 27, 29A, 30), and to cause the rotational movement 611 (see FIG. 30) of the pinion 596 (see FIGS. 27, 29A, 30) and the pair of inertia wheels 660 (see FIGS. 27, 29A, 30), such that the rotational movement 611 of the pinion 596 is resisted by the pair of inertia wheels 660 and there is no incidental motion 698 (see FIG. 30). The step 756 (see FIG. 31) of using the at least one dual rack and pinion rotational inerter 500 to axially accelerate and pull the first rack 552a (see FIGS. 27, 29A) relative to the second rack 552b (see FIGS. 27, 29A), further comprises controlling with the axle element 612 (see FIG. 29A) a clamping force 700 (see FIG. 30) of the flexible holding structure 506 (see FIGS. 29A, 30).

As shown in FIG. 31, the method 750 further comprises step 758 of damping movement 694 (see FIG. 30) of the flight control surface 122 (see FIGS. 27, 30), using the at least one dual rack and pinion rotational inerter system 500 (see FIGS. 27, 29A, 30). The step 758 (see FIG. 31) of damping movement 694 (see FIG. 30) of the flight control surface 122 (see FIGS. 27, 30) further comprises damping movement 694 of the flight control surface 122 to provide increased flutter suppression 708 (see FIG. 30) of the flight control surface 122. This preferably results in an improved hydraulic application stability 710 (see FIG. 30) and an increased efficient flight control actuation 712 (see FIG. 30).

Disclosed versions of the dual rack and pinion rotational inerter system 500 (see FIGS. 27, 29A-30) and method 750 (see FIG. 31) for damping movement 694 (see FIG. 30) of the flight control surface 122 (see FIGS. 27, 30) of the aircraft 100 (see FIGS. 25, 30) have numerous advantages such as, increased damping of the flight control surface 122, reduced backlash 696 (see FIG. 30), and increased reliability 706 (see FIG. 30). Increased damping suppresses flutter response of the flight control surface 122 (see FIGS. 26, 27, 30) to provide improved hydraulic application stability 710 (see FIG. 30) and enable an increased efficient flight control actuation 712 (see FIG. 30). This solution permits the addition of one or more dual rack and pinion rotational inerter systems 500 (see FIGS. 27, 29A-30) to the flight control system 120 (see FIGS. 25, 30), which changes the dynamic characteristic of the hardware under control, rather than complicating the control elements themselves.

In addition, disclosed versions of the dual rack and pinion rotational inerter system 500 (see FIGS. 27, 29A-30) and method 750 (see FIG. 31) may be used to address flutter critical control surface applications on aircraft 100 (see FIG. 25) to further optimize the dual rack and pinion rotational inerter system 500 (see FIGS. 27, 29A-30) design by enabling a two piece flexible holding structure 506 (see FIGS. 27, 29A-30) to clamp a dual rack and pinion assembly 550 (see FIGS. 27, 29A-30). When the dual rack and pinion rotational inerter system 500 is rotated at the first terminal 502 (see FIG. 27) connected to the flight control surface 122 (see FIG. 27), via the pivot element 127 (see FIG. 27), the racks 552 (see FIG. 27) are pulled at either end of the two piece flexible holding structure 506 along a longitudinal inerter axis 504 (see FIG. 27), such as the length of each rack, such that there is no incidental motion 698 (see FIG. 30) or incidental rotation. Disclosed versions of the dual rack and pinion rotational inerter system 500 (see FIGS. 27, 29A-30) and method 750 (see FIG. 31) provide minimum backlash and minimum compliance by achieving damping at a very small deflection. The dual rack and pinion rotational inerter system 500 (see FIGS. 27, 29A-30) has fewer moving parts and has different rendering of size, weight, and power (i.e., reliability), since it is a passive solution 714 (see FIG. 30). In addition, disclosed versions of the dual rack and pinion rotational inerter system 500 (see FIGS. 27, 29A-30) and method 750 (see FIG. 31) provide render damping in a non-friction manner, as there is not a thermal issue, just acceleration of the inertia wheel or wheels 660 (see FIGS. 27, 29A-30). The acceleration of the inertia wheel or wheels 660 renders damping movement 694 (see FIG. 30) of the flight control surface 122 (see FIG. 27). Because the inertia wheel or wheels 660 (see FIGS. 27, 29A-30), each have a through opening 666 (see FIG. 29A) preferably with a square shaped cross-section 668a (see FIG. 29A) through which an axle element 612 (see FIG. 29A) is inserted, damping may be achieved at a very small deflection. This is achieved by controlling the dual rack and pinion assembly 550 (see FIGS. 27, 29A-30) with the currently disclosed inertial wheels 660.

The motion of the pinion 596 (see FIG. 29A) is resisted by the inertial wheels 660 (see FIG. 29A), such that the change of orientation of the racks 552 (see FIG. 29A) are only in relation to the longitudinal inerter axis 504 (see FIG. 29A) of the dual rack and pinion rotational inerter system 500, by inducing resistance force 704 (see FIG. 30) to the rotation of the first terminal 502 (see FIG. 27) connected to the flight control surface 122 (see FIG. 27) of the aircraft 100 (see FIG. 25). The resistance force 704 (see FIG. 30) is resisted by the inertial wheel or wheels 660 (see FIG. 27), each of which comprises the axle element 612 and the square shaped cross-section 668a (see FIG. 29A) of the through opening 666 (see FIG. 29A). The two pieces 508 (see FIGS. 27, 29A) of the flexible holding structure 506 (see FIGS. 27, 29B) can flex by squeezing towards one another, and to prevent deflection, the clamping force 700 (see FIG. 30) may be applied both through the axle element 612 (see FIG. 29A) and the fasteners 522 (see FIG. 29A) through the flexible holding structure 506 (see FIG. 29A). A plurality of rod bearings 540 are preferably installed at each corner of the flexible holding structure 506 to prevent flexing, thus further drawing the racks 552 (see FIG. 29A) up against the pinion 596 (see FIG. 29A).

Moreover, disclosed versions of the dual rack and pinion rotational inerter system 500 (see FIGS. 17, 29A-30) and method 750 (see FIG. 31) permit the elimination of any stiffness constraint in sizing, which enables reduced hydraulic system and aircraft size, reduced weight, and reduced power. This solution presents a more space efficient assembly and method. Further, disclosed versions of the dual rack and pinion rotational inerter system 500 (see FIGS. 27, 29A-30) and method 750 (see FIG. 31) may improve the performance of aircraft 100 (see FIG. 25) by improving the actuation system design. Further, the dual rack and pinion rotational inerter system 500 (see FIGS. 27, 29A-30) and method 750 (see FIG. 31) is a passive solution 714 (see FIG. 30), that is, it uses a passive means to change the dynamics of the flight control system 120 (see FIG. 25) instead of the active control elements such as the actuator 202 (see FIG. 28) and valve size or diameter.

In addition, disclosed versions of the dual rack and pinion rotational inerter system 500 (see FIGS. 27, 29A-30) and method 750 (see FIG. 31) have the advantages of enabling high pressure hydraulic actuator sizing to reduce flow and weight, reducing space required by enabling smaller actuator, valve, and horn element radius, reducing required stiffness to achieve an aero-servo-elasticity goal, addressing force equalization by enabling reduced linear stiffness, increasing compliance that reduces force-fight for active-active modes, enhancing electro-hydrostatic actuator (EHA) bandwidth without increasing stiffness or heat, and reducing flight control surface resonant amplitude that reduces fatigue. Moreover, disclosed versions of the dual rack and pinion rotational inerter system 500 (see FIGS. 27, 29A-30) and method 750 (see FIG. 31) have the further advantages of enabling unanticipated kinematic action to further reduce flow and weight, reducing fatigue by eliminating amplification of torsion resonance, resolving potential electro-hydrostatic actuator (EHA) thermal issues by relaxing stiffness requirement, enabling relaxation of an electromechanical actuator (EMA) backlash requirement, including tolerances in automated sizing to evaluate required precision, using variable pressure to achieve weight reduction at comparable reliability, and sizing pressure, e.g., greater than 6000 psi (pounds per square inch) which may decrease offtake with small weight penalty, where lower offtake enables higher bypass ratio, which improves fuel efficiency. Increased flutter suppression 708 (see FIG. 30) may provide surface torsion critical damping, and reduced actuator swept volume and smaller actuators, thus providing engine power offtake and weight and power offtake reduction, where reduced power offtake enables more fuel efficient engines.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A dual rack and pinion rotational inerter system for damping movement of a flight control surface of an aircraft, the dual rack and pinion rotational inerter system comprising:

a flexible holding structure disposed between the flight control surface and a support structure of the aircraft;

a dual rack and pinion assembly held by and between the flexible holding structure, the dual rack and pinion assembly comprising a first rack, a second rack, and a pinion engaged to and between the first rack and the second rack;

a first terminal coupled to the first rack and coupled to the flight control surface, via a pivot element, and a second terminal coupled to the second rack, and coupled to the support structure;

a pair of inertia wheels comprising a first inertia wheel adjacent to a first side of the flexible holding structure, and a second inertial wheel adjacent to a second side of the flexible holding structure; and an axle element inserted through the first inertial wheel, the flexible holding structure, the pinion, and the second inertial wheel, coupling a rotational movement of the pair of inertia wheels and the pinion, wherein rotation of the flight control surface causes translational movement, via the pivot element, of the first rack relative to the second rack, along a longitudinal inerter axis, which causes the rotational movement of the pinion and the pair of inertia wheels, such that the rotational movement of the pinion is resisted by the pair of inertia wheels, resulting in the dual rack and pinion rotational inerter system damping movement of the flight control surface.

2. The system of claim 1 further comprising a plurality of rod bearings inserted into interior corners of the flexible holding structure.

3. The system of claim 1 further comprising a sleeve element surrounding a central rectangular portion of the axle element.

4. The system of claim 1 wherein the flexible holding structure comprises one of a clamping holding structure, and a thin section flexure holding structure.

5. The system of claim 1 wherein the flexible holding structure comprises a two-piece flexible holding structure comprised of a first piece attached to a second piece, wherein the first piece is a mirror image of the second piece.

6. The system of claim 1 wherein the first rack has a first plurality of teeth, the second rack has a second plurality of teeth, and the pinion has a plurality of gear teeth, such that the plurality of gear teeth engage to and between the first plurality of teeth and the second plurality of teeth.

7. The system of claim 1 wherein the first terminal comprises a first spherical bearing having a first end coupled to the first rack, and having a second end coupled to the flight control surface, via the pivot element, and further wherein the second terminal comprises a second spherical bearing having a first end coupled to the second rack, and having a second end coupled to the support structure.

8. The system of claim 1 wherein the axle element comprises a central rectangular portion, a cylindrical portion attached to each end of the central rectangular portion, a square portion attached to each end of each cylindrical portion, and a cylindrical threaded end portion attached to each end of each square portion.

9. The system of claim 1 wherein the pinion has a through opening having a square shaped cross-section, and each of the pair of inertia wheels has a through opening having a square shaped cross-section.

10. An aircraft, comprising:
a flight control surface pivotably coupled to a support structure;
one or more actuators configured to actuate the flight control surface; and
at least one dual rack and pinion rotational inerter system for damping movement of the flight control surface of the aircraft, the at least one dual rack and pinion rotational inerter system comprising:
 a flexible holding structure disposed between the flight control surface and the support structure of the aircraft;
 a plurality of rod bearings inserted into interior corners of the flexible holding structure;
 a dual rack and pinion assembly clamped by and between the flexible holding structure, the dual rack and pinion assembly comprising a first rack, a second rack, and a pinion engaged to and between the first rack and the second rack;
 a first terminal coupled to the first rack and coupled to the flight control surface, via a pivot element, and a second terminal coupled to the second rack, and coupled to the support structure;
 a pair of inertia wheels comprising a first inertia wheel adjacent to a first side of the flexible holding structure, and a second inertial wheel adjacent to a second side of the flexible holding structure; and
 an axle element inserted through the first inertial wheel, the flexible holding structure, the pinion, and the second inertial wheel, coupling a rotational movement of the pair of inertia wheels and the pinion,
 wherein rotation of the flight control surface causes translational movement, via the pivot element, of the first rack relative to the second rack, along a longitudinal inerter axis, which causes the rotational movement of the pinion and the pair of inertia wheels, such that the rotational movement of the pinion is resisted by the pair of inertia wheels, resulting in the dual rack and pinion rotational inerter system damping movement of the flight control surface.

11. The aircraft of claim 10 wherein the at least one dual rack and pinion rotational inerter system further comprises a sleeve element surrounding a central rectangular portion of the axle element.

12. The aircraft of claim 10 wherein the flexible holding structure comprises a two-piece flexible holding structure comprised of mirror image plates, each mirror image plate comprising one of, a forged plate, or an extruded plate.

13. The aircraft of claim 10 wherein the first terminal comprises a first spherical bearing having a first end coupled to the first rack, and having a second end coupled to the flight control surface, via the pivot element, and further wherein the second terminal comprises a second spherical bearing having a first end coupled to the second rack, and having a second end coupled to the support structure.

14. The aircraft of claim 10 wherein the flight control surface comprises an aileron, and the support structure comprises a wing, a wing portion support structure, or a wing spar.

15. A method for damping movement of a flight control surface of an aircraft, the method comprising the steps of:
installing at least one dual rack and pinion rotational inerter system between the flight control surface and a support structure of the aircraft; the at least one dual rack and pinion rotational inerter system comprising:
 a flexible holding structure having a plurality of rod bearings inserted into interior corners of the flexible holding structure;
 a dual rack and pinion assembly clamped by and between the flexible holding structure, the dual rack and pinion assembly comprising a first rack, a second rack, and a pinion engaged to and between the first rack and the second rack;
 a first terminal coupled to the first rack and coupled to the flight control surface, via a pivot element, and a second terminal coupled to the second rack, and coupled to the support structure;
 a pair of inertia wheels comprising a first inertia wheel adjacent to a first side of the flexible holding structure, and a second inertial wheel adjacent to a second side of the flexible holding structure; and
 an axle element inserted through the first inertial wheel, the flexible holding structure, the pinion, and the second inertial wheel, and the axle element coupling a rotational movement of the pair of inertia wheels and the pinion, rotating the flight control surface using one or more actuators;

using the at least one dual rack and pinion rotational inerter to axially accelerate and pull in a translational movement along a longitudinal inerter axis, the first rack relative to the second rack, and to cause the rotational movement of the pinion and the pair of inertia wheels, such that the rotational movement of the pinion is resisted by the pair of inertia wheels and there is no incidental motion; and damping movement of the flight control surface, using the at least one dual rack and pinion rotational inerter.

16. The method of claim 15 wherein installing comprises installing the at least one dual rack and pinion rotational inerter system, further comprising a sleeve element surrounding a central rectangular portion of the axle element.

17. The method of claim 15 wherein installing comprises installing the at least one dual rack and pinion rotational inerter system, where the first terminal comprises a first spherical bearing having a first end coupled to the first rack, and having a second end coupled to the flight control surface, via the pivot element, and where the second terminal comprises a second spherical bearing having a first end coupled to the second rack, and having a second end coupled to the support structure.

18. The method of claim 15 wherein installing comprises installing the at least one dual rack and pinion rotational inerter system, where the flexible holding structure comprises a two-piece flexible holding structure comprised of mirror image plates, each mirror image plate comprising one of, a forged plate, or an extruded plate.

19. The method of claim 15 wherein using the at least one dual rack and pinion rotational inerter to axially accelerate and pull the first rack relative to the second rack, further comprises controlling with the axle element a clamping force of the flexible holding structure.

20. The method of claim 15 wherein damping movement of the flight control surface further comprises damping movement of the flight control surface to provide increased flutter suppression of the flight control surface, resulting in an improved hydraulic application stability and an increased efficient flight control actuation.

* * * * *